(12) United States Patent
White et al.

(10) Patent No.: US 12,397,836 B2
(45) Date of Patent: *Aug. 26, 2025

(54) MODULAR FORK ASSEMBLY FOR A FORKED MATERIAL-HANDLING VEHICLE

(71) Applicant: Hyster-Yale Materials Handling, Inc., Fairview, OR (US)

(72) Inventors: Andrew White, Whitchurch (GB); Robert Dunigan, Benson, NC (US)

(73) Assignee: Hyster-Yale Materials Handling, Inc., Fairview, OR (US)

( * ) Notice: Subject to any disclaimer, the term of this patent is extended or adjusted under 35 U.S.C. 154(b) by 485 days.

This patent is subject to a terminal disclaimer.

(21) Appl. No.: 17/844,886

(22) Filed: Jun. 21, 2022

(65) Prior Publication Data

US 2022/0315087 A1  Oct. 6, 2022

Related U.S. Application Data

(63) Continuation of application No. 16/656,854, filed on Oct. 18, 2019, now Pat. No. 11,745,778, and a (Continued)

(51) Int. Cl.
  *B62B 3/06* (2006.01)
  *B65G 7/04* (2006.01)
  *B66F 9/22* (2006.01)

(52) U.S. Cl.
  CPC .......... *B62B 3/0618* (2013.01); *B62B 3/0625* (2013.01); *B62B 3/0637* (2013.01); (Continued)

(58) Field of Classification Search
  CPC ... B62B 3/0618; B62B 3/0625; B62B 3/0637; B62B 3/0612; B62B 2203/20; (Continued)

(56) References Cited

U.S. PATENT DOCUMENTS 2,575,552 A  11/1951 Glenn
2,986,225 A   5/1961 Dalny
(Continued)

FOREIGN PATENT DOCUMENTS

CN    1642844 A  *  7/2005  ........... B62B 3/0612
CN  102119086 A     7/2011
(Continued)

OTHER PUBLICATIONS

European Search Report in EP 23166446.7 (Jul. 14, 2023).
(Continued)

*Primary Examiner* — James A Shriver, II
*Assistant Examiner* — Ian Bryce Shelton
(74) *Attorney, Agent, or Firm* — Laurence & Phillips IP Law

(57) ABSTRACT

A modular fork assembly for a pallet truck includes a discrete elongate body, a discrete load wheel module, and a discrete fork tip that may be detachably connected by the same or different types of interlocking mechanisms that are adapted to inhibit sheer forces. The load wheel module includes a frame and a load wheel assembly that includes a load wheel that is operatively connected to the frame.

42 Claims, 24 Drawing Sheets

Related U.S. Application Data continuation-in-part of application No. 16/367,050, filed on Mar. 27, 2019, now Pat. No. 11,365,103.

(52) U.S. Cl.
CPC ............... B65G 7/04 (2013.01); B66F 9/22 (2013.01); *B65G 2201/0267* (2013.01)

(58) Field of Classification Search
CPC ............ B62B 2203/28; B62B 2301/25; B62B 2205/006; B62B 2301/05; B65G 7/04; B65G 2201/0267; B66F 9/22; B66F 9/12
See application file for complete search history.

(56) References Cited

U.S. PATENT DOCUMENTS

| | | | | |
|---|---|---|---|---|
| 2,993,703 | A * | 7/1961 | Paradise | B62B 3/0612 280/43.12 |
| 3,019,930 | A | 2/1962 | Allen | |
| 3,188,106 | A | 6/1965 | Ulinski | |
| 3,202,233 | A * | 8/1965 | Goodacre | B62D 51/005 91/422 |
| 3,287,024 | A | 11/1966 | Ulinski | |
| 3,850,322 | A | 11/1974 | Miles et al. | |
| 3,861,545 | A | 1/1975 | Ellerd | |
| 4,027,771 | A * | 6/1977 | Adams | B62B 3/0625 280/43.12 |
| 4,290,729 | A | 9/1981 | Cary | |
| 4,969,794 | A * | 11/1990 | Larsen | B62B 3/0618 280/43.12 |
| 5,190,435 | A | 3/1993 | Epstein | |
| 6,079,941 | A | 6/2000 | Lee | |
| 6,139,248 | A | 10/2000 | Bentgen et al. | |
| 6,730,861 | B1 | 5/2004 | Simons | |
| 7,731,206 | B2 | 6/2010 | Borrmann | |
| 8,752,846 | B1 | 6/2014 | White | |
| 8,919,472 | B2 | 12/2014 | Magens et al. | |
| 8,979,099 | B1 * | 3/2015 | Ellis | B66F 9/142 280/43.12 |
| 9,738,501 | B2 | 8/2017 | Wendt et al. | |
| 9,963,332 | B2 * | 5/2018 | Schueler | B62B 3/0618 |
| 11,235,963 | B2 * | 2/2022 | Dunigan | E06C 7/12 |
| 11,365,103 | B2 * | 6/2022 | Dunigan | B62B 3/0625 |
| 11,667,504 | B2 * | 6/2023 | Dunigan | E06C 7/12 187/237 |
| 11,673,781 | B2 * | 6/2023 | Dunigan | E06C 7/12 414/664 |
| 12,077,421 | B2 * | 9/2024 | Dunigan | B62B 3/0625 |
| 2002/0034431 | A1 | 3/2002 | Fransson | |
| 2006/0232030 | A1 * | 10/2006 | Passeri | B62B 3/0612 280/43.12 |
| 2007/0152412 | A1 | 7/2007 | Chaseateau | |
| 2009/0279994 | A1 | 11/2009 | Gramatikov | |
| 2011/0175304 | A1 * | 7/2011 | Arbogast | B62D 55/04 305/129 |
| 2014/0070506 | A1 * | 3/2014 | Sammons | B62B 3/02 29/428 |
| 2014/0159329 | A1 | 6/2014 | White | |
| 2015/0102274 | A1 * | 4/2015 | He | B66F 9/08 254/2 C |
| 2015/0336781 | A1 * | 11/2015 | Neubauer | B62B 3/0618 60/413 |
| 2015/0375978 | A1 * | 12/2015 | Dahiwal | B66F 9/12 414/785 |
| 2016/0221810 | A1 * | 8/2016 | Schueler | B62B 3/0618 |
| 2018/0009643 | A1 * | 1/2018 | Hoffman | B66F 9/24 |
| 2018/0065653 | A1 * | 3/2018 | Rusche | B21D 22/02 |
| 2018/0251145 | A1 * | 9/2018 | Dunigan | B62B 3/06 |
| 2018/0327239 | A1 | 11/2018 | Cherry et al. | |
| 2020/0156911 | A1 * | 5/2020 | Dunigan | E06C 7/12 |
| 2020/0269895 | A1 * | 8/2020 | Englert | B62B 3/0612 |
| 2020/0269896 | A1 * | 8/2020 | Kalinowski | B62B 3/0618 |
| 2020/0299118 | A1 * | 9/2020 | Kurita | B66F 9/0755 |
| 2020/0307975 | A1 * | 10/2020 | Dunigan | B66F 9/12 |
| 2022/0055878 | A1 * | 2/2022 | Dunigan | E06C 7/12 |
| 2022/0063972 | A1 * | 3/2022 | Dunigan | B66F 9/12 |
| 2022/0194767 | A1 * | 6/2022 | Dunigan | B66F 9/12 |

FOREIGN PATENT DOCUMENTS

| | | | | |
|---|---|---|---|---|
| CN | 202968023 | U | 6/2013 | |
| CN | 203449855 | U | 2/2014 | |
| CN | 104649183 | A | 5/2015 | |
| CN | 104812655 | A | 7/2015 | |
| CN | 104860231 | A | 8/2015 | |
| CN | 204607515 | U | 9/2015 | |
| CN | 204675773 | U | 9/2015 | |
| CN | 105399012 | A | 3/2016 | |
| CN | 104228454 | B | 6/2016 | |
| CN | 105752886 | A | 7/2016 | |
| CN | 106143567 | A | 11/2016 | |
| CN | 106365072 | A | 2/2017 | |
| CN | 106829807 | A | 6/2017 | |
| CN | 107215818 | A | 9/2017 | |
| CN | 107285241 | A | 10/2017 | |
| CN | 107298409 | A | 10/2017 | |
| CN | 206799098 | U | 12/2017 | |
| CN | 207330263 | U | 5/2018 | |
| CN | 108821187 | A | 11/2018 | |
| CN | 109205525 | A | 1/2019 | |
| DE | 9017430 | U1 | 5/1991 | |
| DE | 29911310 | U1 | 5/2000 | |
| DE | 19615592 | | 4/2005 | |
| DE | 102006035822 | A1 | 2/2008 | |
| DE | 202009008021 | U1 | 10/2009 | |
| DE | 102009004405 | A1 * | 7/2010 | ........... B62B 3/0625 |
| DE | 102013103200 | A1 | 10/2014 | |
| DE | 102013010656 | A1 * | 12/2014 | ........... B62B 3/0612 |
| DE | 102016107538 | A1 | 10/2017 | |
| EP | 0903277 | A2 | 3/1999 | |
| EP | 1413496 | A1 | 4/2004 | |
| EP | 1967484 | A1 | 9/2008 | |
| EP | 2020358 | A2 * | 2/2009 | ........... B62B 3/0612 |
| EP | 2020358 | A3 | 8/2011 | |
| EP | 3130523 | A1 * | 2/2017 | ........... B62B 3/0612 |
| EP | 3251918 | A1 | 12/2017 | |
| EP | 3415401 | A1 * | 12/2018 | ........... B62B 3/0612 |
| EP | 3466794 | A1 | 4/2019 | |
| ES | 2394920 | | 2/2013 | |
| FR | 1381775 | A | 12/1964 | |
| FR | 2890064 | A1 | 3/2007 | |
| FR | 2930230 | A1 | 10/2009 | |
| FR | 2941428 | B1 | 8/2012 | |
| GB | 2470236 | A | 11/2010 | |
| GB | 2494662 | A | 3/2013 | |
| IN | 201313810 | | 9/2009 | |
| JP | S5168153 | A | 6/1976 | |
| JP | S604401 | U | 1/1985 | |
| JP | 2004017791 | A | 1/2004 | |
| JP | 2004284744 | A | 10/2004 | |
| JP | 2006089006 | A | 4/2006 | |
| JP | 2012188182 | A | 10/2012 | |
| JP | 2015127188 | A | 7/2015 | |
| WO | 8204230 | A1 | 12/1982 | |
| WO | WO-9631431 | A1 * | 10/1996 | ............... B62B 3/06 |
| WO | 03068659 | A1 | 8/2003 | |
| WO | WO-2009133319 | A2 * | 11/2009 | ............. A63C 17/10 |
| WO | 2010008326 | A1 | 1/2010 | |
| WO | 2009133319 | A3 | 3/2011 | |
| WO | 2011129692 | A1 | 10/2011 | |
| WO | 2012106756 | A1 | 8/2012 | |

OTHER PUBLICATIONS

Office Action in U.S. Appl. No. 17/693,555 (Jul. 19, 2023).

European Search Report, EPO Patent Appl. No. 20163601.6-1012 (Oct. 5, 2020).

European Search Report, for Appl. No. 19 16 8663; Dec. 20, 2019.

Shin-Ichiro Nishida, Yuku Okbayashi, Sachiko Wakabayashi; "Analyses and Testing of New Mobility System for Lunar Rover"; Pro-

(56) References Cited

OTHER PUBLICATIONS ceedings of the 2011 IEEE Int'l Conf. on Robotics and Bimimetics; Dec. 7-11, 2011.
Translated CN-109205525-A (Year: 2022).
Epo, Appl. 20163601.6, Office Action (Dec. 7, 2022).
Final Office Action, U.S. Appl. No. 16/656,854 (Oct. 7, 2022).
CNIPA, Office Action, Chinese Patent Appl. 2019112560609 (Feb. 22, 2022).
Response to European Extended Search Report in European Patent Appl. 20163601.6 (Oct. 21, 2021).
Response to First Office Action in Chinese Patent Appl. 2019112560609 (May 5, 2022).
Response to Second Office Action in Chinese Patent Appl. 2019112560609 (Aug. 8, 2022).
Second Office Action in Chinese Patent Appl. 2019112560609 (May 23, 2022).

* cited by examiner

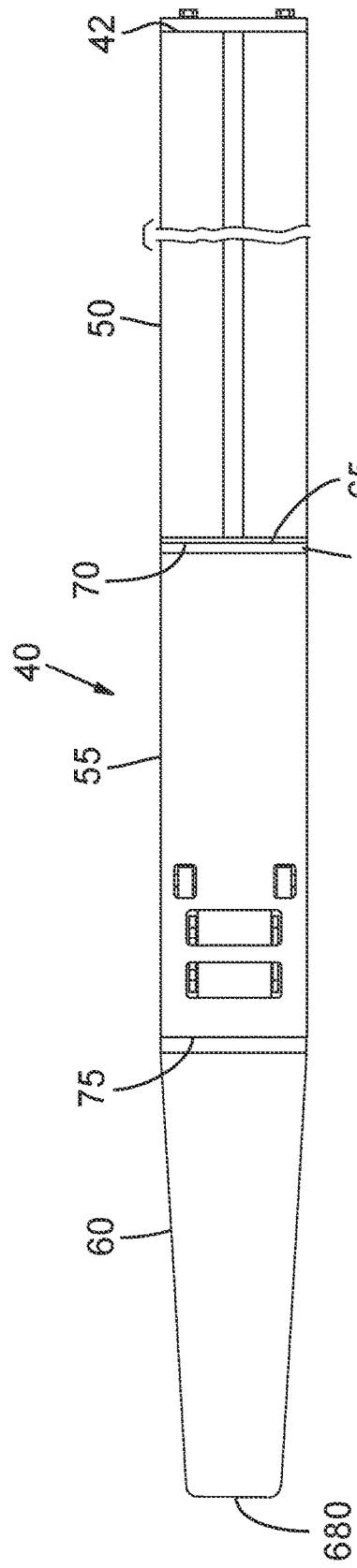
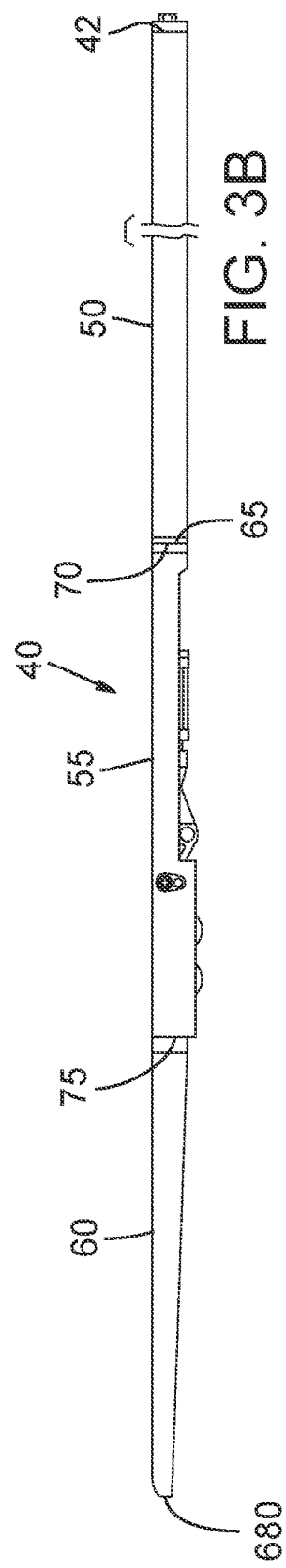
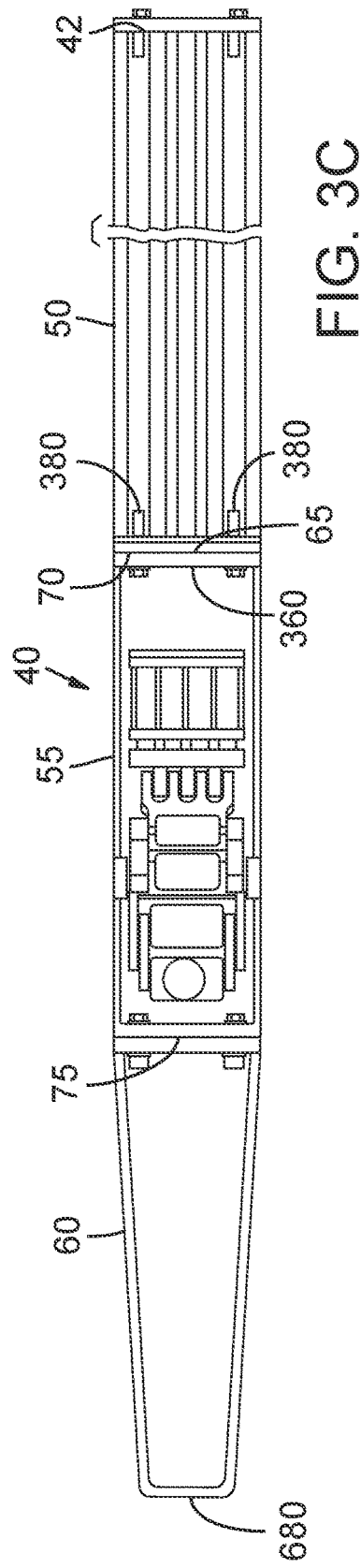

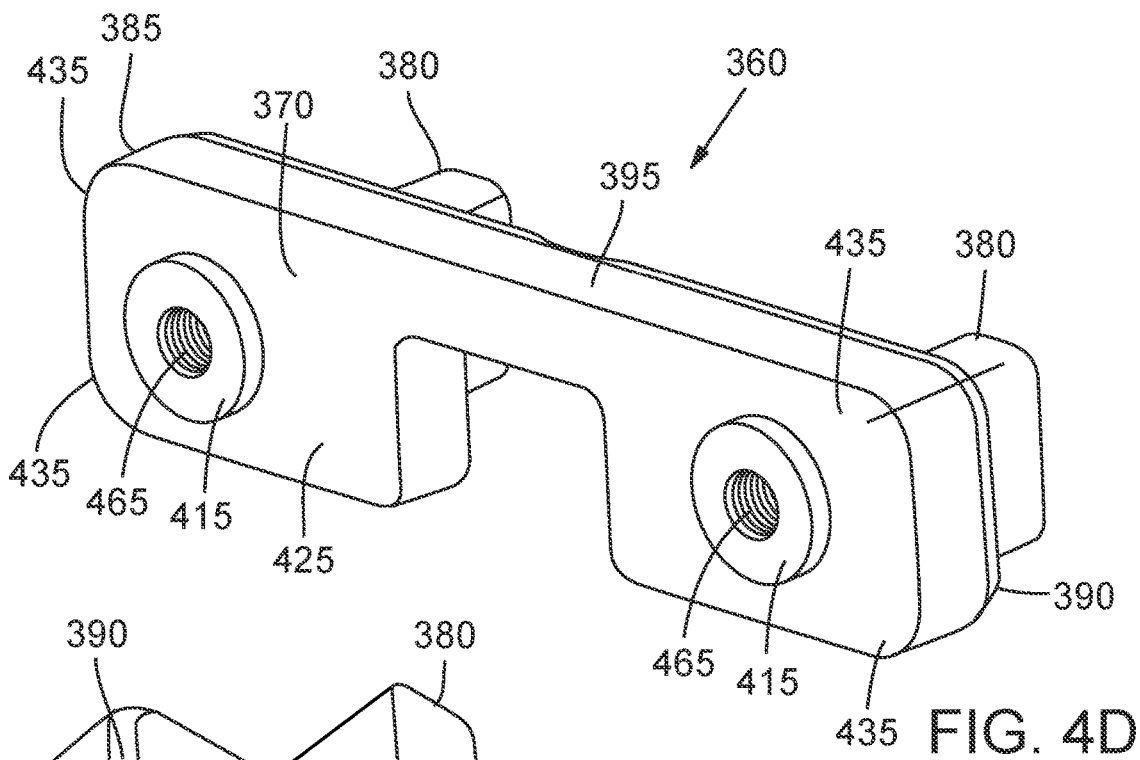
FIG. 4D
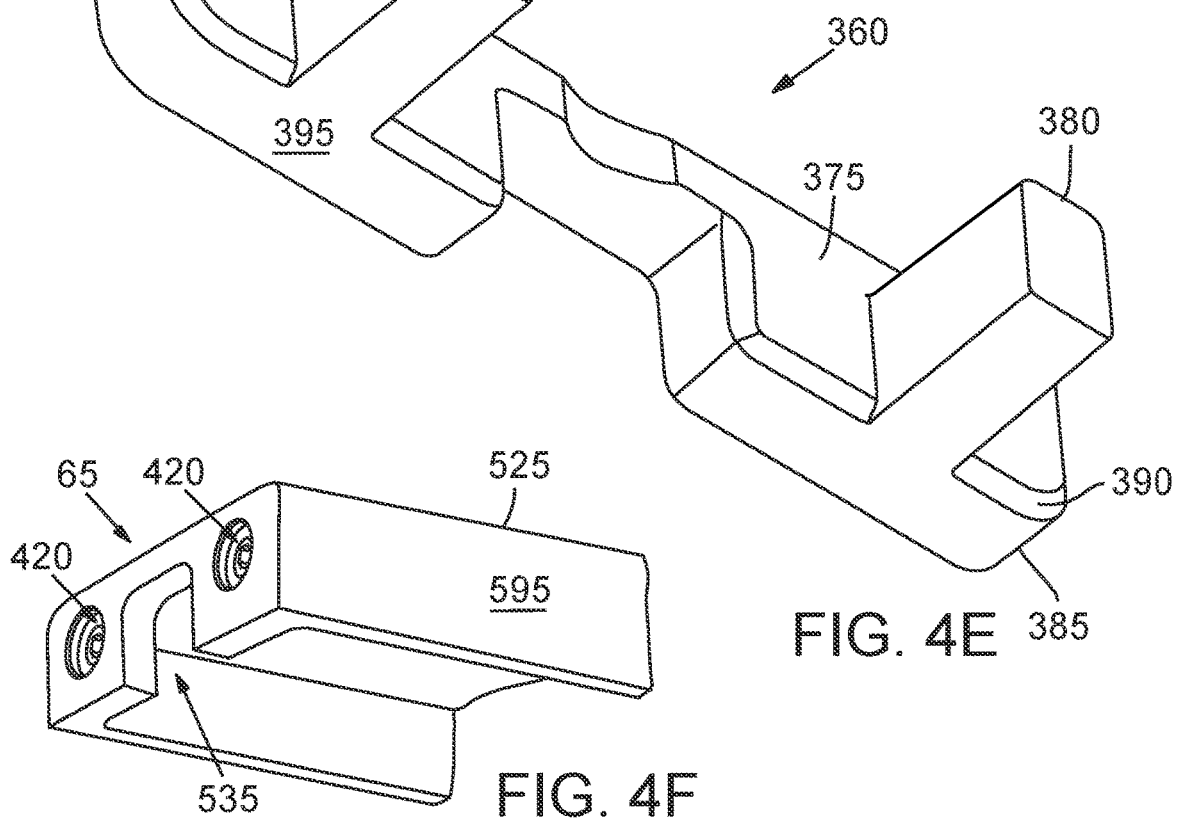
FIG. 4E
FIG. 4F

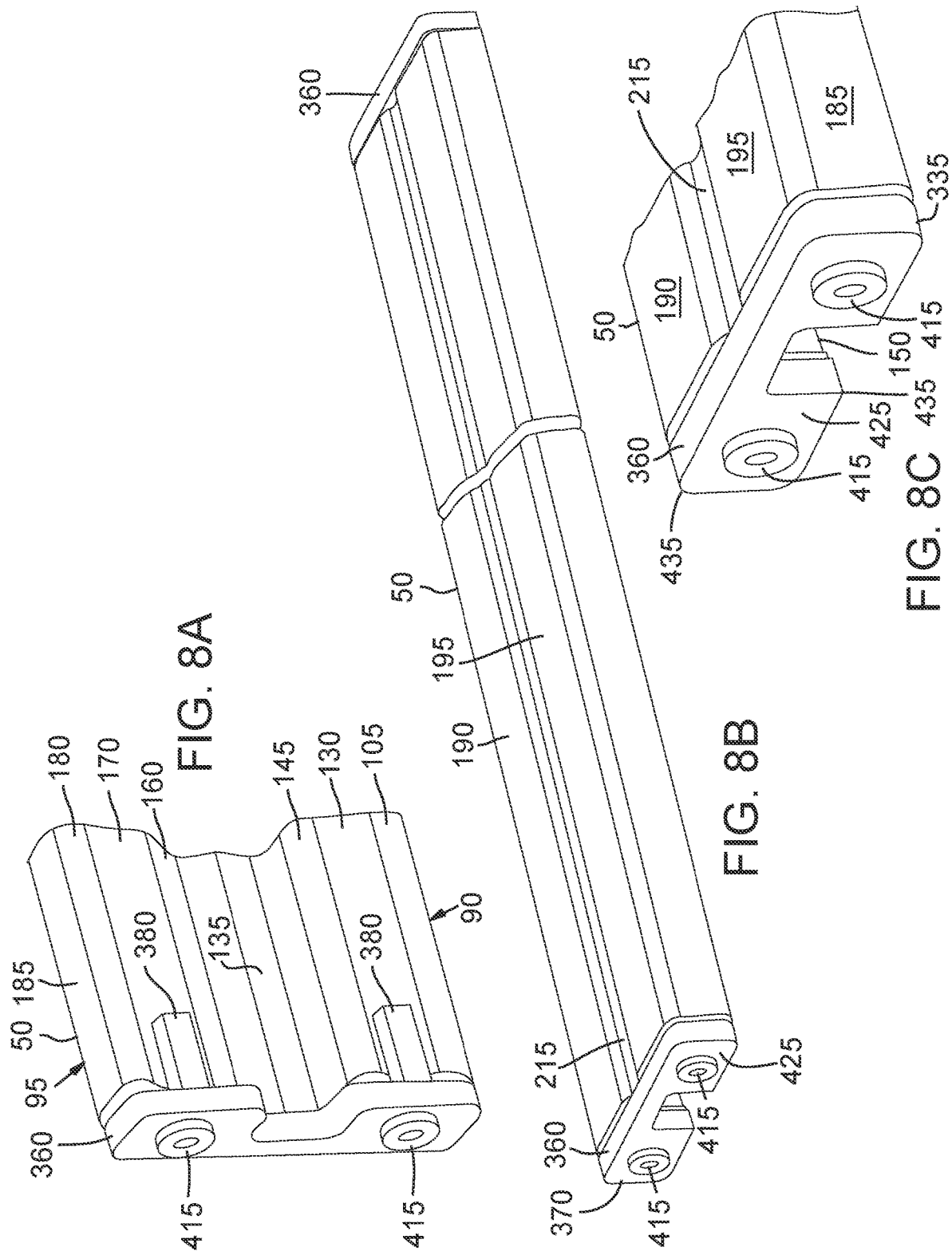

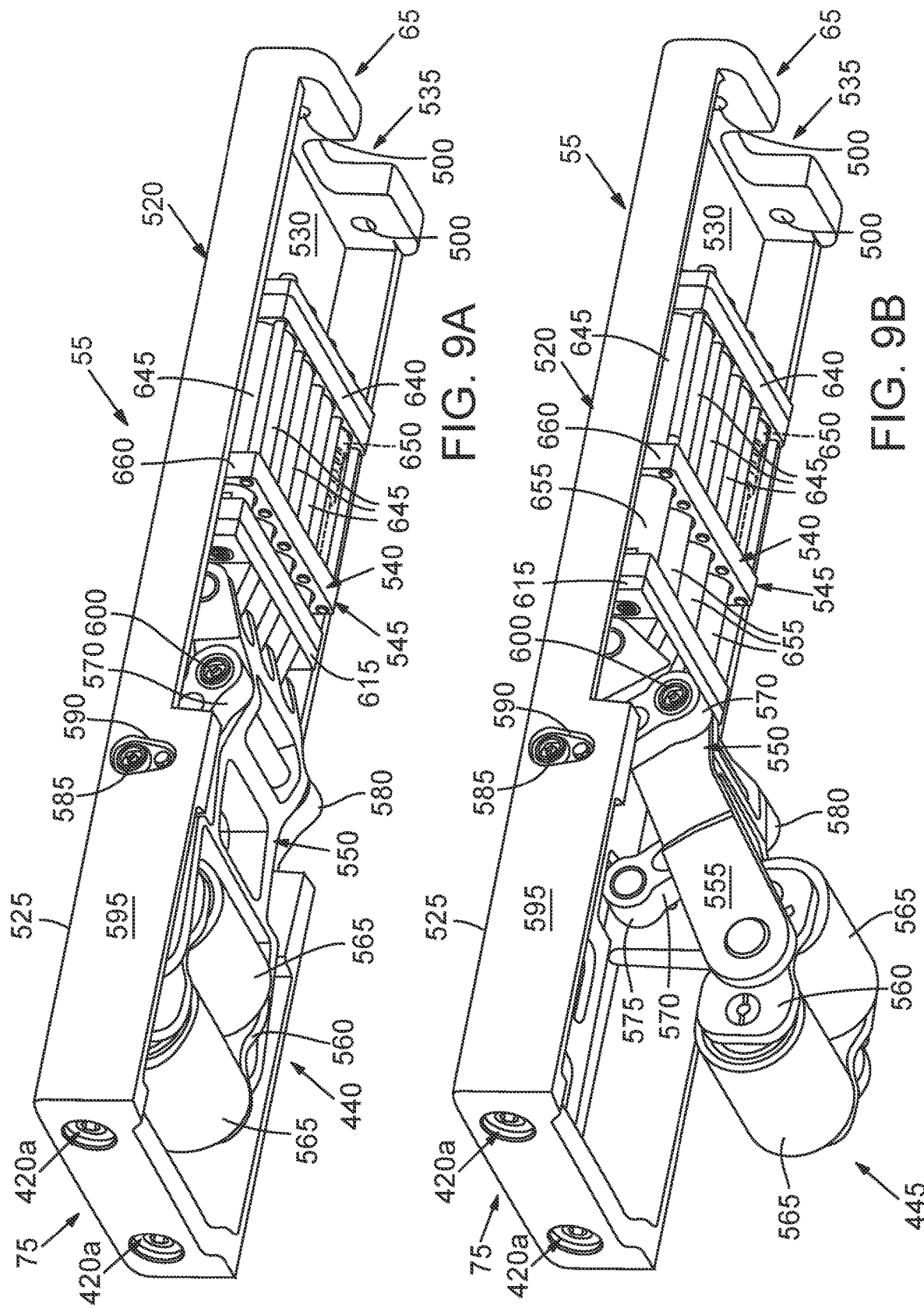

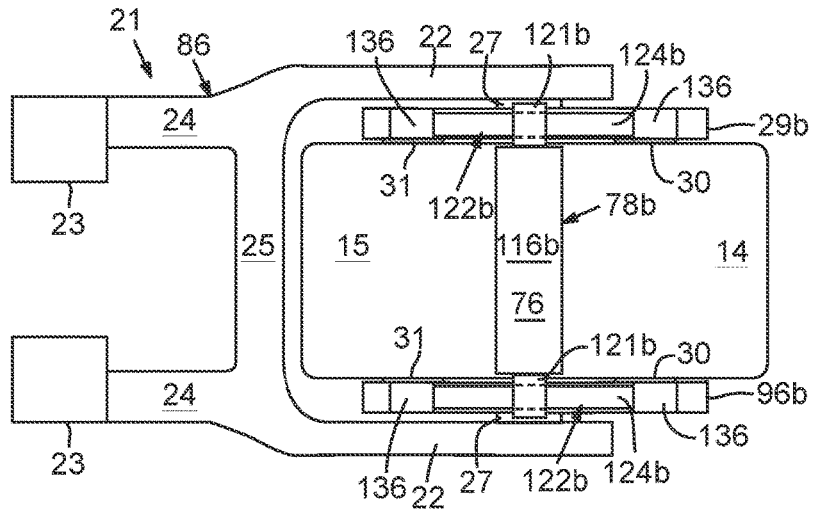
FIG. 12A
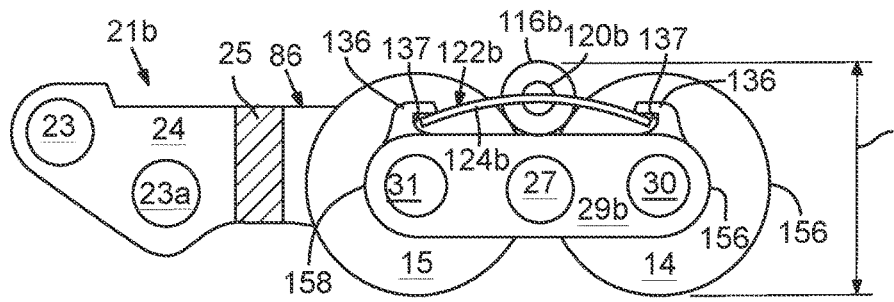
FIG. 12B
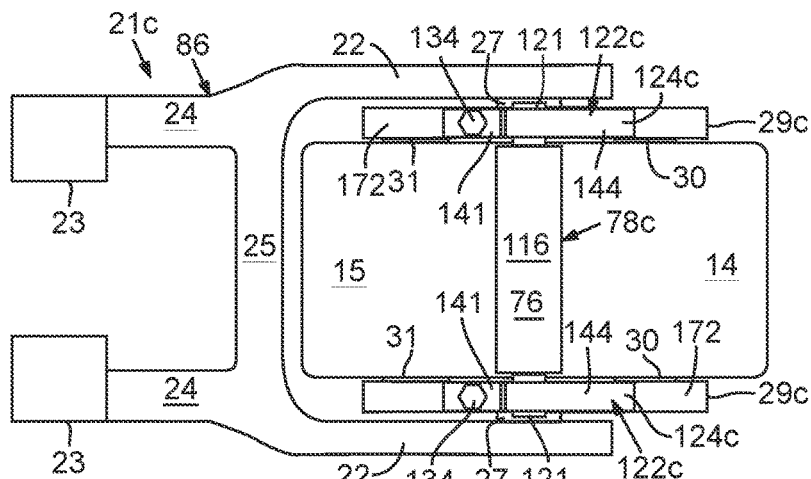
FIG. 13A
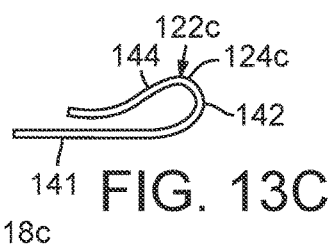
FIG. 12C
FIG. 13C
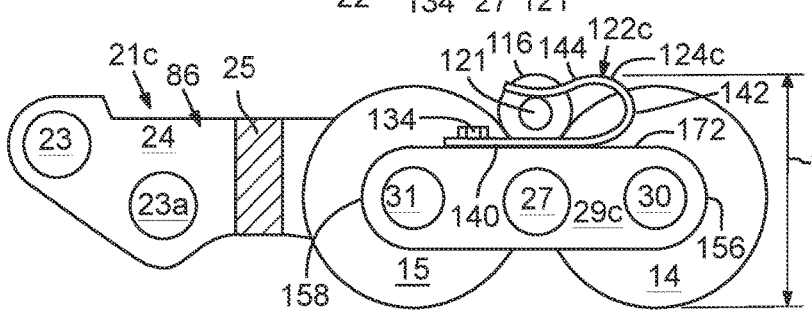
FIG. 13B

MODULAR FORK ASSEMBLY FOR A FORKED MATERIAL-HANDLING VEHICLE

CROSS REFERENCE TO RELATED APPLICATION

This application is a continuation of U.S. patent application Ser. No. 16/656,854, entitled "Load Wheel Designs for Pallet Entry," filed Oct. 18, 2019, the entire disclosure of which is incorporated by reference herein for all purposes. This application is also a continuation-in-part of U.S. patent application Ser. No. 16/367,050, entitled "Modular Fork Assembly for a Material-Handling Vehicle," filed Mar. 27, 2019, the entire disclosure of which is incorporated by reference herein for all purposes.

TECHNICAL FIELD

The field of this disclosure relates generally to forked vehicles configured to transport goods and materials. More specifically, this disclosure relates to fork assemblies for pallet trucks.

BACKGROUND INFORMATION

Material-handling vehicles, such as forked vehicles, are presented herein only by way of example to pallet trucks. Typical pallet trucks support one, two in-line, or three in-line standard size pallets. Typically, pallet trucks include lifting load forks that are welded at their rear end or heel end to a chassis or battery box. The forks typically include an elongate body welded to elongate steel tubes to provide support. The front end of the forks typically includes support rollers. A hydraulic system, which is located in proximity to the chassis or battery box, operates a lifting mechanism that moves the support rollers, and lifts the chassis or battery box and the forks together with goods, such as pallets loaded thereon. The support rollers are typically coupled to the lift mechanism by a mechanical linkage that transmits force from a hydraulic lifting cylinder to the support rollers. A valve arrangement is provided to relieve the hydraulic pressure in the lifting cylinder, thus lowering and placing the load on the floor. Steer wheels are located behind the battery box. A steering mechanism, such as a tiller, also may be provided to steer the steer wheels relative to the chassis and forks.

OVERVIEW OF DISCLOSURE

This overview is provided to introduce a selection of concepts in a simplified form that are further described in greater detail later. This overview is not intended to identify key or essential inventive concepts of the claimed subject matter, nor is it intended for limiting the scope of the claimed subject matter.

One aspect of this disclosure relates to fork assemblies that include modular detachable components.

Another aspect of this disclosure relates to load wheel modules that contain a hydraulic actuator.

In one embodiment, a fork assembly for a forked material-handling truck (e.g., pallet truck) comprises a discrete elongate body; a discrete load wheel module; a first interlocking mechanism configured for detachable connection of the elongate body to the load wheel module; a discrete fork tip; and a second interlocking mechanism configured for detachable connection of the load wheel module to the fork tip.

In some additional, alternative, or selectively cumulative embodiments, a load wheel module for a fork assembly for a forked material-handling truck (e.g., pallet truck) comprises a frame; a load wheel assembly, including a load wheel, operatively connected to the frame; and a hydraulic actuator contained within the frame and operatively connected to the load wheel assembly to lower the load wheel hydraulically.

In some additional, alternative, or selectively cumulative embodiments, an inventory of parts for a fork assembly for a forked material-handling truck (e.g., pallet truck) comprises multiple interchangeable elongate bodies; multiple interchangeable load wheel modules; multiple interchangeable fork tips; and multiple operatively identical interlocking mechanism components configured for detachable connection of any one of the elongate bodies to any one of the load wheel modules and configured for detachable connection of any one of the fork tips to any one of the load wheel modules.

In some additional, alternative, or selectively cumulative embodiments, a forked material-handling truck (e.g., pallet truck) including a fork assembly comprises a steer wheel; a chassis operatively connected to the steer wheel; and two substantially parallel forks operatively connected to and extending from the chassis and configured to hold a load for conveyance by the pallet truck as the pallet truck moves, the forks including a first fork and a second fork, wherein the first fork comprises a first elongate body, a first load wheel module, a first interlocking mechanism configured for detachable connection of the first elongate body to the first load wheel module, a first fork tip, and a second interlocking mechanism configured for detachable connection of the first load wheel module to the first fork tip, wherein the second fork comprises a second elongate body, a second load wheel module, a third interlocking mechanism configured for detachable connection of the second elongate body to the second load wheel module, a second fork tip, and a fourth interlocking mechanism configured for detachable connection of the second load wheel module to the second fork tip.

In some additional, alternative, or selectively cumulative embodiments, a method for deploying a load wheel of a forked material-handling truck (e.g., pallet truck) in response to a load wheel deployment signal comprises providing hydraulic power through a hydraulic line positioned within an elongate body of a fork assembly; employing the hydraulic power from the hydraulic line to actuate multiple pistons of an actuator positioned within a load wheel module of the fork assembly, wherein the load wheel module has a load wheel module frame that is operatively connected to the elongate body; and employing the multiple pistons to deploy the load wheel so that it is vertically spaced apart from the load wheel module frame.

In some additional, alternative, or selectively cumulative embodiments, a method of assembling a fork for a forked material-handling vehicle comprises detachably connecting a modular elongate body to a modular load wheel module; and detachably connecting the modular load wheel module to a modular fork tip.

In some additional, alternative, or selectively cumulative embodiments, a fork for a forked material-handling vehicle comprises a frame; a wheel operatively connected to the frame; and a hydraulic actuator contained within the frame and operatively connected to the wheel to lower the wheel hydraulically, the hydraulic actuator having an input for connection to a hydraulic hose running along a portion of the length of the fork from a hydraulic pressure source.

In some additional, alternative, or selectively cumulative embodiments, the first interlocking mechanism and the second interlocking mechanism are substantially identical.

In some additional, alternative, or selectively cumulative embodiments, the first interlocking mechanism and the second interlocking mechanism contain a substantially identical component.

In some additional, alternative, or selectively cumulative embodiments, the first interlocking mechanism and the second interlocking mechanism are operatively identical.

In some additional, alternative, or selectively cumulative embodiments, the first interlocking mechanism and the second interlocking mechanism are interchangeable.

In some additional, alternative, or selectively cumulative embodiments, the first interlocking mechanism and the second interlocking mechanism contain an interchangeable component.

In some additional, alternative, or selectively cumulative embodiments, the first and second load wheel modules are interchangeable, the first and second tips are interchangeable, the first and third interlocking mechanisms are operatively identical, and the second and fourth interlocking mechanisms are operatively identical.

In some additional, alternative, or selectively cumulative embodiments, the first interlocking mechanism and the second interlocking mechanism contain a reusable component.

In some additional, alternative, or selectively cumulative embodiments, at least one of the first interlocking mechanism and the second interlocking mechanism employs one or more mated pairs of internally threaded receptacles and externally threaded fasteners.

In some additional, alternative, or selectively cumulative embodiments, the externally threaded fasteners have a minimum diameter of about 12 mm.

In some additional, alternative, or selectively cumulative embodiments, at least one of the first interlocking mechanism and the second interlocking mechanism employs mated shear-resistant features, including first and second sheer-resistant features.

In some additional, alternative, or selectively cumulative embodiments, the first sheer-resistant feature includes a protruding feature and the second sheer-resistant feature includes a receiving feature.

In some additional, alternative, or selectively cumulative embodiments, the first interlocking mechanism includes a first protruding feature that is mated to a first receiving feature, wherein one of the first protruding feature and the first receiving feature is permanently connected to or associated with the elongate body, wherein a different one of the first protruding feature and the first receiving feature is permanently connected to or associate with the load wheel module.

In some additional, alternative, or selectively cumulative embodiments, the sheer-resistant features are configured to receive a fastener.

In some additional, alternative, or selectively cumulative embodiments, the first interlocking mechanism employs a first internally threaded receptacle that is mated to a first externally threaded fastener, wherein one of the first internally threaded receptacle and first externally threaded fastener is configured to connect to the elongate body, and wherein a different one of the first internally threaded receptacle and the first externally threaded fastener is configured to connect to the load wheel module.

In some additional, alternative, or selectively cumulative embodiments, both of the first protruding feature and the first receiving feature are configured to receive the first externally threaded fastener.

In some additional, alternative, or selectively cumulative embodiments, the first interlocking mechanism includes a first endcap that is attached to the elongate body and includes a first sheer-resistant body feature that is mated to a first sheer-resistant module feature of the load wheel module.

In some additional, alternative, or selectively cumulative embodiments, the first sheer-resistant body feature and the first sheer-resistant module feature are adapted to receive a fastener.

In some additional, alternative, or selectively cumulative embodiments, the first endcap is welded to the elongate body.

In some additional, alternative, or selectively cumulative embodiments, the second interlocking mechanism includes a second endcap that is attached to the fork tip and includes a second sheer-resistant attachment feature that is mated to a second sheer-resistant module feature of the load wheel module, wherein the first and second interlocking mechanisms are operatively identical.

In some additional, alternative, or selectively cumulative embodiments, the second interlocking mechanism includes a second endcap that is attached to the fork tip and includes a second sheer-resistant attachment feature that is mated to a second sheer-resistant module feature of the load wheel module.

In some additional, alternative, or selectively cumulative embodiments, the second sheer-resistant attachment feature and the second sheer-resistant module feature are adapted to receive a fastener.

In some additional, alternative, or selectively cumulative embodiments, the elongate body has a first characterizing color, wherein the load wheel module has a second characterizing color, wherein the fork tip has a third characterizing color, and wherein the first, second, and third characterizing colors are different.

In some additional, alternative, or selectively cumulative embodiments, the load wheel module has opposing ends having substantially identical sheer-resistant features.

In some additional, alternative, or selectively cumulative embodiments, the elongate body includes a channel along its length, and wherein an endcap associated with the first interlocking mechanism includes an aperture that aligns with the channel.

In some additional, alternative, or selectively cumulative embodiments, the fork tip includes a proximal connection end for attachment closest to the load wheel module, wherein the proximal end has proximal end dimensions, wherein the fork tip includes a distal end that has distal end dimensions, and wherein at least one of the distal end dimensions is smaller than a respective one of the proximal end dimensions.

In some additional, alternative, or selectively cumulative embodiments, the pallet truck comprises: a hydraulic power source; and a first hydraulic line positioned through the first elongate body, wherein the first hydraulic line transmits hydraulic fluid from the hydraulic power source to a first hydraulic actuator positioned within the first load wheel module.

In some additional, alternative, or selectively cumulative embodiments, the load wheel module comprises: a frame; a load wheel assembly, including a load wheel, operatively connected to the frame; and a hydraulic actuator contained within the frame and operatively connected to the load wheel assembly to lower the load wheel hydraulically.

In some additional, alternative, or selectively cumulative embodiments, the load wheel module comprises a frame; a load wheel assembly, including a load wheel, operatively connected to the frame; and a mechanical link operatively coupled to the load wheel assembly to lower the load wheel, wherein the mechanical link extends through the discrete elongate body.

In some additional, alternative, or selectively cumulative embodiments, the pallet truck comprises a power source and a first mechanical link positioned through the first elongate body, wherein the first mechanical link transmits force from the power source to a first load wheel mechanism positioned within the first load wheel module.

In some additional, alternative, or selectively cumulative embodiments, the pallet truck comprises: first and second elongate bodies having a first characterizing color, first and second load wheel modules having a second characterizing color, first and second fork tips having a third characterizing color, wherein the first, second, and third characterizing colors are different.

In some additional, alternative, or selectively cumulative embodiments, the hydraulic actuator includes a hydraulic line input connector operative for connecting the hydraulic actuator to a hydraulic line that transmits hydraulic fluid from a hydraulic power source.

In some additional, alternative, or selectively cumulative embodiments, hydraulic power from the hydraulic power source has a maximum pressure within the range of about 2,000 to about 4,000 psi at the hydraulic line input connector.

In some additional, alternative, or selectively cumulative embodiments, the hydraulic actuator includes multiple pistons.

In some additional, alternative, or selectively cumulative embodiments, the multiple pistons are hydraulically connected to a hydraulic manifold.

In some additional, alternative, or selectively cumulative embodiments, the hydraulic manifold is hydraulically connected to a hydraulic line input connector operative for connecting the hydraulic actuator to a hydraulic line that transmits hydraulic fluid from a hydraulic power source.

In some additional, alternative, or selectively cumulative embodiments, at least one of the pistons has a length within the range of about 0.50 inches to about 3 inches (about 1.27 to about 7.62 cm) and a stroke length within the range of about 1 to about 3 inches (about 2.54 to about 7.62 cm).

In some additional, alternative, or selectively cumulative embodiments, at least one of the pistons has a length within the range of about 1 to about 2 inches (about 2.54 to about 5.08 cm) and a stroke length within the range of about 1.5 to about 2.5 inches (about 3.81 to about 6.35 cm).

In some additional, alternative, or selectively cumulative embodiments, the hydraulic actuator includes at least three pistons.

In some additional, alternative, or selectively cumulative embodiments, the hydraulic actuator includes at least four pistons.

In some additional, alternative, or selectively cumulative embodiments, the hydraulic actuator is operable to provide maximum thrust within a range of about 66,723 newtons (about 15,000 pounds) to about 133,446 newtons (about 30,000 pounds).

In some additional, alternative, or selectively cumulative embodiments, the hydraulic actuator is operable to provide greater than about 66,723 newtons (about 15,000 pounds) of thrust.

In some additional, alternative, or selectively cumulative embodiments, the hydraulic actuator is operable to provide greater than about 88,964 newtons (about 20,000 pounds) of thrust.

In some additional, alternative, or selectively cumulative embodiments, the hydraulic actuator is operatively connected to the load wheel module frame.

In some additional, alternative, or selectively cumulative embodiments, the frame includes a fork tip-facing end and a body-facing end, and wherein the actuator is positioned closer to the body-facing end than to the fork tip-facing end.

In some additional, alternative, or selectively cumulative embodiments, the body-facing end includes an aperture adapted to accommodate a hydraulic line that transmits hydraulic fluid from a hydraulic power source to the hydraulic actuator.

In some additional, alternative, or selectively cumulative embodiments, the load wheel module comprises: a first attachment feature of a first interlocking mechanism configured for detachable connection of the body-facing end of the frame to an elongate body; and a second attachment feature of a second interlocking mechanism configured for detachable connection of the fork tip-facing end of the frame to a fork tip.

In some additional, alternative, or selectively cumulative embodiments, at least one of the first and second attachment features includes a sheer-resistant module feature that is mated to a sheer-resistant feature of the elongate body or the fork tip.

In some additional, alternative, or selectively cumulative embodiments, the sheer-resistant module feature includes one or more receiving features.

In some additional, alternative, or selectively cumulative embodiments, the load wheel module frame includes a fork tip-facing end and a body-facing end, wherein the load wheel is positioned closer to the fork tip-facing end than to the body-facing end.

In some additional, alternative, or selectively cumulative embodiments, the load wheel is one of multiple load wheels that are part of the load wheel module.

In some additional, alternative, or selectively cumulative embodiments, the hydraulic actuator and the load wheel assembly form a wheel module substructure, wherein the load wheel assembly includes a load wheel unit and a wheel carrier strut that are operatively connected to each other, and wherein the wheel carrier strut is operatively connected to hydraulic actuator and the frame.

In some additional, alternative, or selectively cumulative embodiments, the wheel carrier strut is pivotally connected to hydraulic actuator and pivotally connected to the frame, and wherein the wheel carrier strut is pivotally connected to the load wheel unit.

Selectively cumulative embodiments are embodiments that include any combination of multiple embodiments that are not mutually exclusive.

Additional aspects and advantages will be apparent from the following detailed description of example embodiments, which proceeds with reference to the accompanying drawings.

BRIEF DESCRIPTION OF THE DRAWINGS

FIG. 3A illustrates a top plan view of a fork assembly, according one embodiment.

FIG. 3B illustrates a right-side elevation view of the fork assembly shown in FIG. 3A.

FIG. 3C illustrates a bottom view of the fork assembly shown in FIG. 3A.

FIG. 4D illustrates a front right isometric view of an embodiment of an endcap.

FIG. 4E illustrates a bottom rear right isometric view of an embodiment of an endcap.

FIG. 4F illustrates a rear left bottom isometric view of a body-facing end of a load wheel module, according to one embodiment.

FIG. 8A illustrates a front right bottom isometric view of a portion of an elongate body showing an endcap, according to one embodiment.

FIG. 8B illustrates a top front right isometric view of an elongate body of a fork assembly, wherein the elongate body is attached to endcaps, according to one embodiment.

FIG. 8C illustrates a top front right enlarged isometric view of a portion of an elongate body showing an endcap, according to one embodiment.

FIG. 9A illustrates a front right bottom isometric view of a load wheel module of a fork assembly, showing an undeployed load wheel unit, according to one embodiment.

FIG. 9B illustrates a front right bottom isometric view of a load wheel module of a fork assembly, showing a deployed load wheel unit, according to one embodiment.

FIG. 12A is a top plan view of a load wheel assembly employing an alternative embodiment of a torque-coupling assembly.

FIG. 12B is a side elevation view of the load wheel assembly of FIG. 12A with a wheel carrier strut and a portion of a wheel carrier bracket removed for clarity.

FIG. 12C is a side elevation view of an idler wheel of the torque-coupling assembly shown in FIG. 12A.

FIG. 13A is a top plan view of a load wheel assembly employing another alternative embodiment of a torque-coupling assembly.

FIG. 13B is a side elevation view of the load wheel assembly of FIG. 13A with a wheel carrier strut and a portion of a wheel carrier bracket removed for clarity.

FIG. 13C shows a side elevation view of the torsion clip of FIG. 13B in one example of a relaxed shape when the torsion clip is not yet deployed over an idler axle.

DETAILED DESCRIPTION OF EMBODIMENTS

Figure 1A:
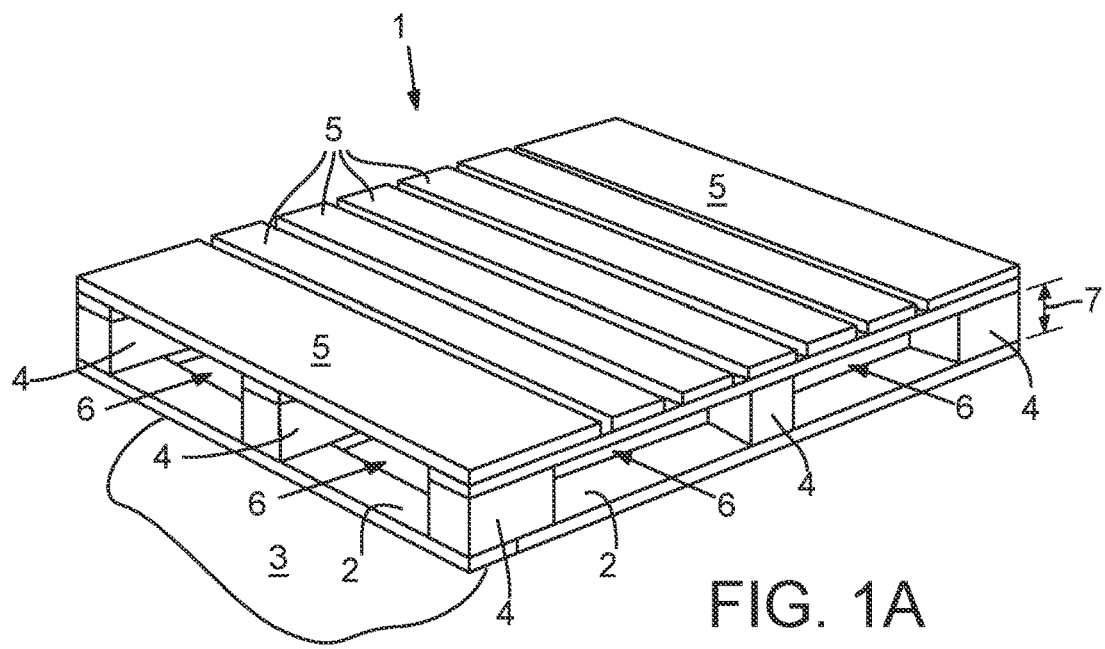
FIG. 1A is an orthogonal view of an example of a prior-art closed-bottom pallet.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

FIG. 1A is an orthogonal view of an example of a closed-bottom pallet (also called a closed pallet) 1 that is commonly used in the UK, USA, and Australia. The closed pallet 1 has one or more base boards 2 that contact a supporting surface 3, such as the floor. The base boards 2 provide the foundation for spacers 4 that support one or more upper planks 5 that support a load.

Figure 1B:
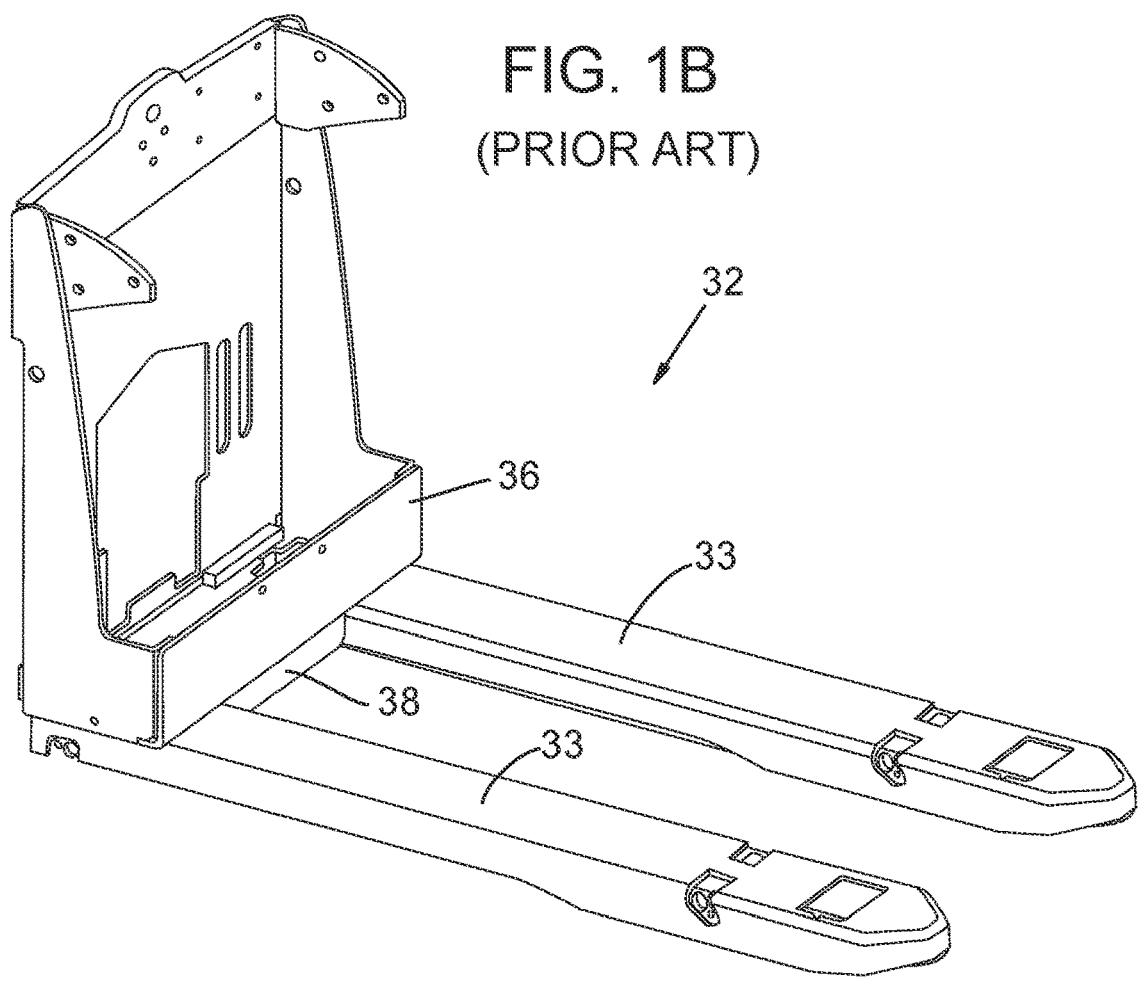
FIG. 1B illustrates a front left isometric view of a prior-art lift fork assembly, showing a pair of forks welded to a battery box.
Figure 1C:
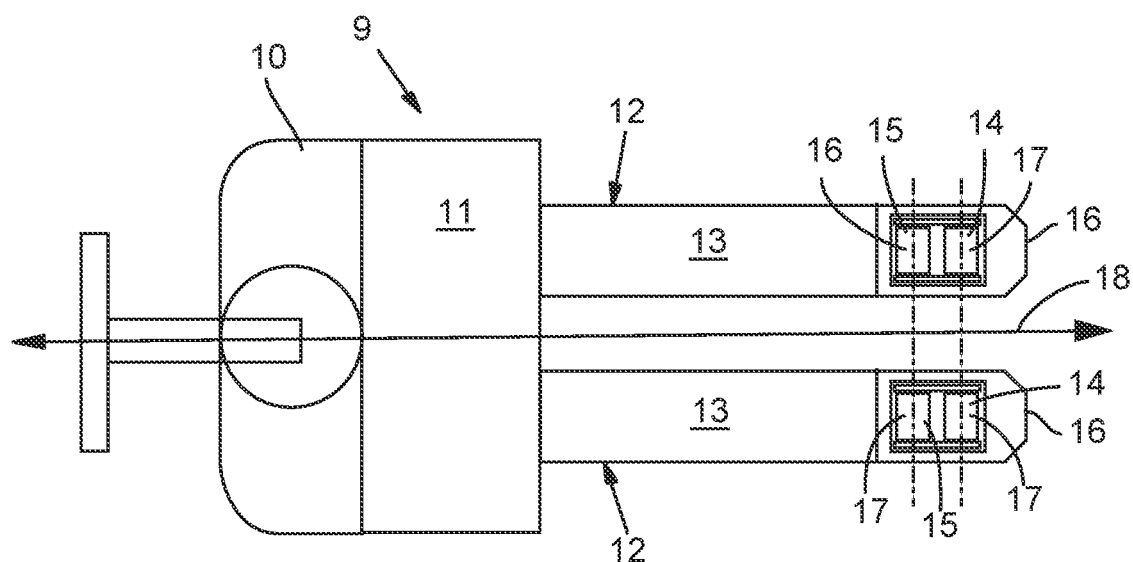
FIG. 1C is a top schematic view of a prior-art pallet truck.
Figure 1D:
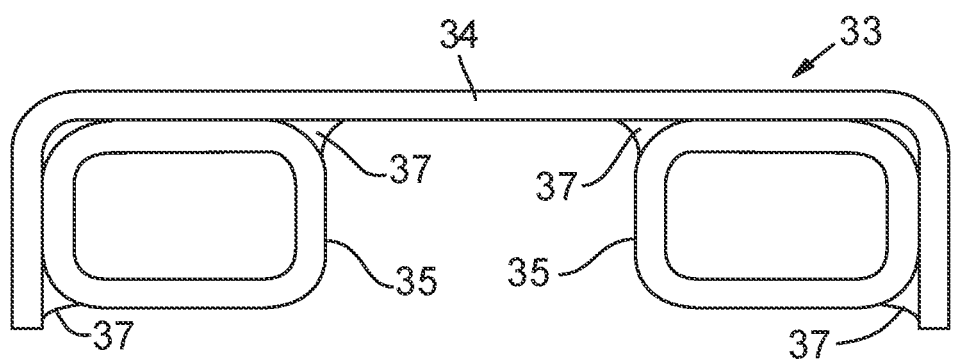
FIG. 1D illustrates a cross-sectional view of a prior-art elongate body of a lift fork.

FIG. 1B illustrates a front left isometric view of a prior-art fork and battery box assembly 32 having a pair of forks 33 welded to a battery box 36, and FIG. 1D illustrates a cross-sectional view of a prior art elongate body of a lift fork 33. As is typical with conventional pallet trucks, each of the forks 33 is made of multiple components (such as a load-bearing surface 34 and support tubes 35) connected by longitudinal welds 37 to form a unitary structure that is welded to the battery box 36 and to a torsion member 38.

FIG. 1C is a top schematic view of a prior pallet truck 9, which is an example of a forked material-handling vehicle. Pallet trucks 9, such as pedestrian pallet trucks (PPT) or rider pallet trucks (RPT), are often employed to handle pallets that are on the ground or on another horizontal surface, for example, when loading or unloading from a transport vehicle, such as a truck or shipping container. Pallet trucks 9 typically include a chassis 10 that supports or is attached to a battery box 11. The chassis 10 or the battery box 11 is connected to a pair of forks 12, each fork 12 having an elongate body 13, a forward load wheel 14, a rear load wheel 15, and a tip 16. The forward load wheel 14 and the rear load wheel 15 can be collectively referred to as load wheels 17.

Figure 1E:
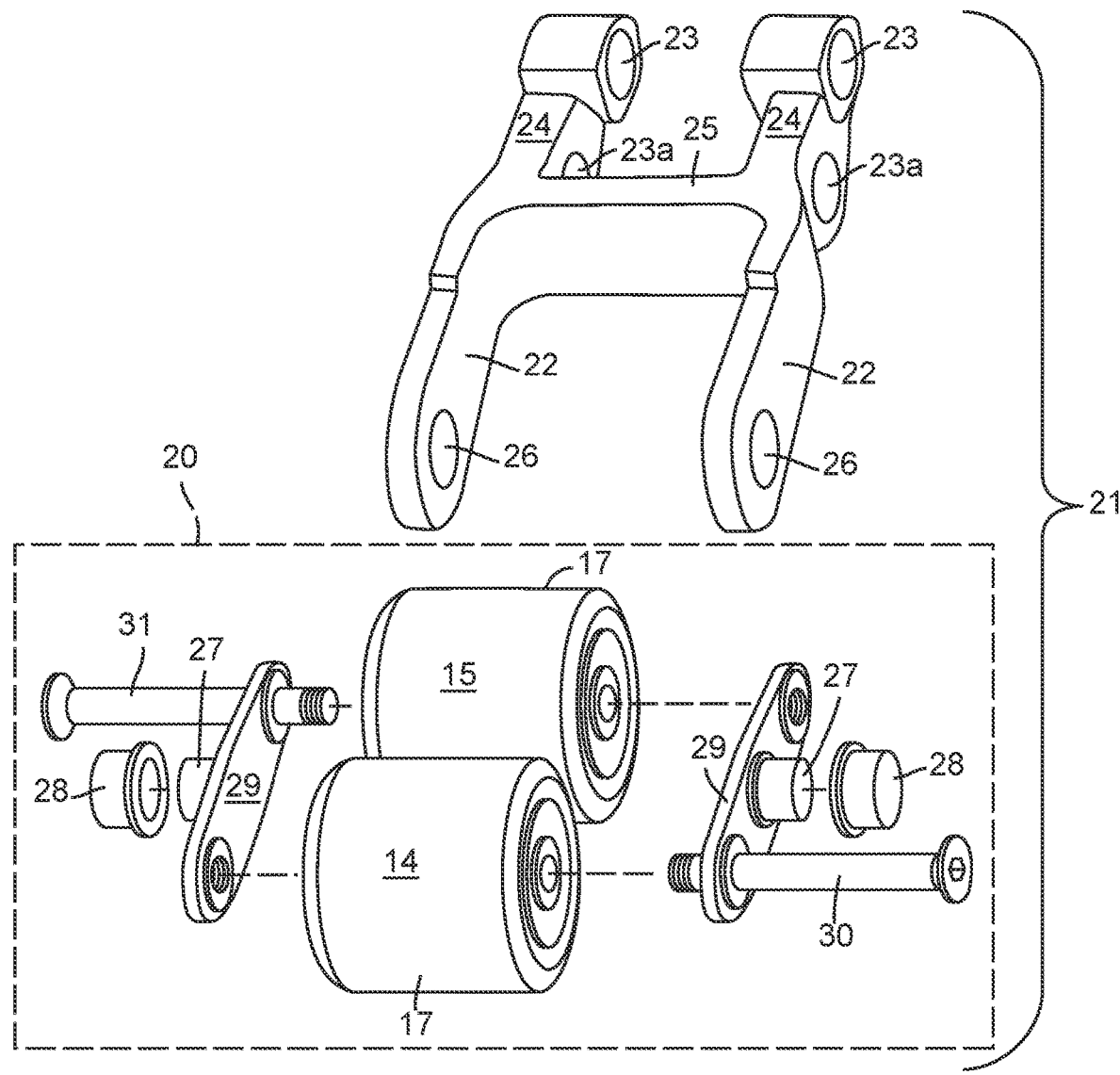
FIG. 1E is an isometric view of a load wheel unit of a prior-art pallet truck.
Figure 1F:
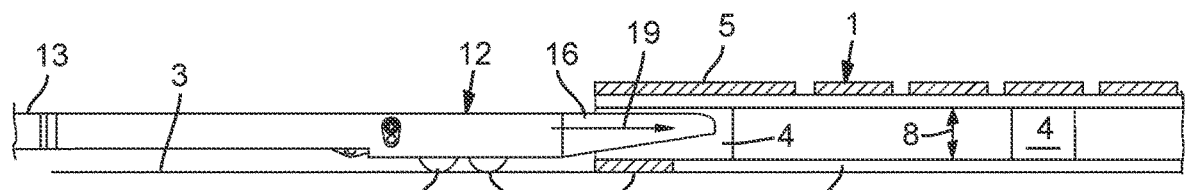
FIGS. 1F-1I are a series of side elevation views showing a progression of a fork approaching a closed-bottom pallet, encountering the closed-bottom pallet, negotiating a base board of the closed-bottom pallet, and deploying a load wheel extension mechanism to lift the closed-bottom pallet off of a supporting surface.
Figure 1G:
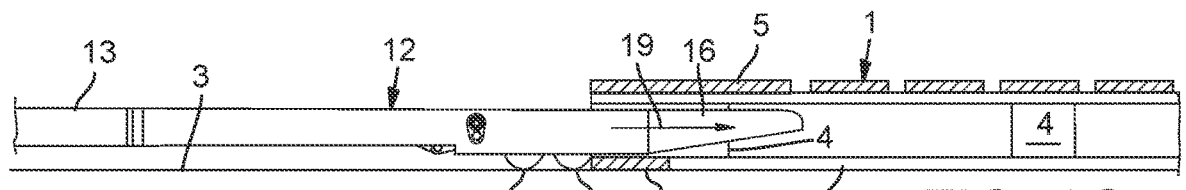
Figure 1H:
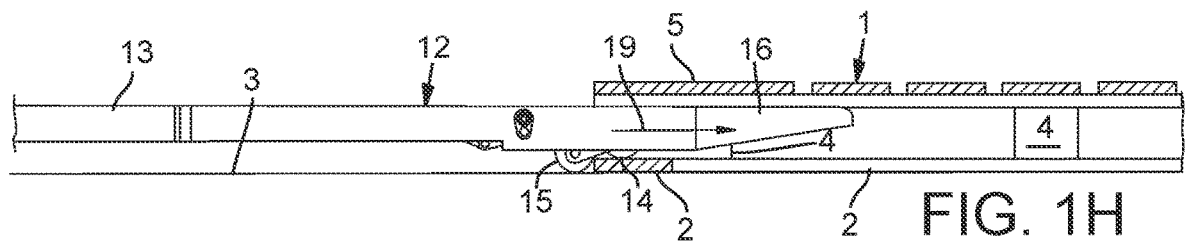
Figure 1I:
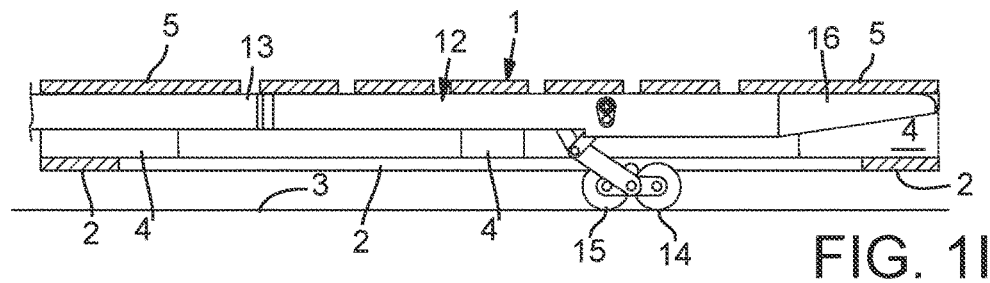

FIG. 1E is an isometric view of a load wheel unit 20 of a prior art pallet truck 9. FIGS. 1F-1I are a series of side elevation views showing a progression of a fork 12 approaching a closed-bottom pallet 1 in a forward direction 19, encountering the base board 2 of the closed-bottom pallet 1, negotiating the base board 2 of the closed-bottom pallet 1, and deploying a load wheel extension mechanism to lift the closed-bottom pallet 1 off of a supporting surface 3. With reference to FIGS. 1A, 1C, 1E, and 1F-1I, when engaging or disengaging closed pallets 1, the forward load wheel 14 and the rear load wheel 15 of the pallet truck 9 cross over the top of the base boards 2 of the closed pallet 1 to enter and exit pallet pockets 6. When a closed pallet 1 is empty, or has a light-weight palletized load (commonly meaning bearing a load of 25 kg or less), the forward load wheel 14 of the pallet truck 9 may lock upon contact with the closed pallet 1 and stop rotation instead of riding over the base boards 2 and into the pallet pockets 6 of the closed pallet 1. However, the rear load wheel 15 may continue to rotate so that the closed pallet 1 may be shunted or pushed horizontally across the surface 3. Similarly, the rear load wheel 15 may lock while the forward load wheel continues to roll during attempts to exit the pallet pockets 6. Such shunting is undesirable because it can damage the base board 2 and/or the surface 3 on which the closed pallet 1 sits and may move the pallet 1 to an undesired location. Also, failure to enter the pallet 1 prevents the pallet 1 from being retrieved, and failure to exit an empty pallet 1 renders the truck 9 useless with a pallet 1 trapped on the forks 12 until the pallet 1 is removed.

One challenge faced by pallet truck manufacturers is that customers often want varying fork configurations, such as forks with variable spreads, lengths, tips, and widths. Because forks are typically manufactured in standard sizes, changing fork parameters requires costly and time-consuming retooling to modify the battery box and/or fork design to produce a pallet truck conforming to individual customer specifications. In some situations, such redesigns can add up to six weeks of lead-time. In addition, stocking multiple lengths of forks may require a significant capital outlay for inventory. Some of these issues can be addressed by the development of a modular fork assembly with detachably connectable components that couples directly or indirectly to the battery box, chassis, or other part connected to the chassis.

Figure 2:
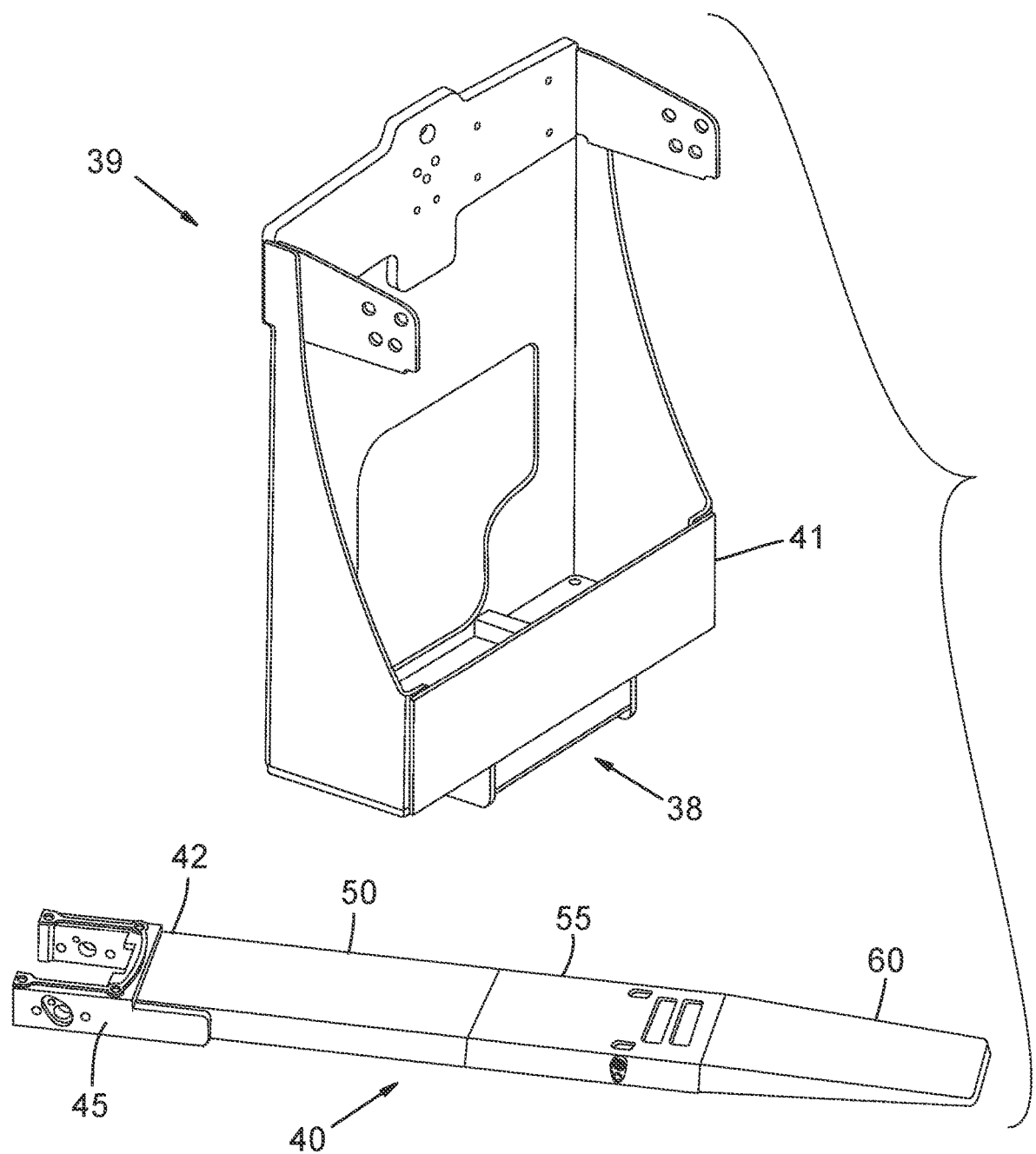
FIG. 2 illustrates a front left partly exploded isometric view of an example battery box and a fork assembly showing the fork assembly disassembled from the battery box, according one embodiment.

FIG. 2 illustrates a front left isometric view of an example of a fork and battery box assembly 39 with a modular fork assembly 40 disassembled from a battery box 41 of a pallet truck, such as one of the HYSTER W45ZHD2 or YALE MPB045ZH manufactured by the Hyster-Yale Group, 5200 Martin Luther King Junior Highway, Greenville, NC 27834. A typical fork and battery box assembly 39 includes one battery box 41 and multiple modular fork assemblies 40 (such as two modular fork assemblies 40), though only one modular fork assembly 40 is depicted in FIG. 2. The modular fork assemblies 40 may be coupled to the battery box 41 by welding or by locking. Locking a modular fork assembly 40 to the battery box 41, the torsion member 38, or both, means that the modular fork assembly 40 can also be unlocked from the battery box 41, the torsion member 38, or both.

The modular fork assembly 40 may be coupled to the battery box 41 through one or more intermediary couplers or interlocking mechanisms, such as an optional heel 45 shown in FIG. 2. The optional heel 45 can be connected to the elongate body 50, for example, by welding or other suitable attachment, such as later described. A proximal end 42 (also referred to as a heel end) of the elongate body 50 is the end closest to the battery box 41. As illustrated, the proximal end 42 of the modular fork assembly 40 is coupled to the heel 45, which is configured to be locked to the battery box 41 and/or the torsion member 38; however, the proximal end 42 of the modular fork assembly 40 may be welded or otherwise coupled directly to the battery box 41 and/or the torsion member 38 with or without employing a separate optional heel 45.

The battery box 41 is sized to fit a battery or battery array. When used in conjunction with a pallet truck, pallet jack, or other suitable forklift, the entire fork and battery box assembly 39 may be raised and lowered as a single unit, for example via a hydraulic cylinder actuated by hydraulic power from a hydraulic power source (not shown). The two modular fork assemblies 40 may be referred to as a right modular fork assembly and a left modular fork assembly, depending on the side of the battery box 41 to which they are coupled. These right and left modular fork assemblies may be identical such that one modular fork assembly may be swapped for the other.

Figure 3D:
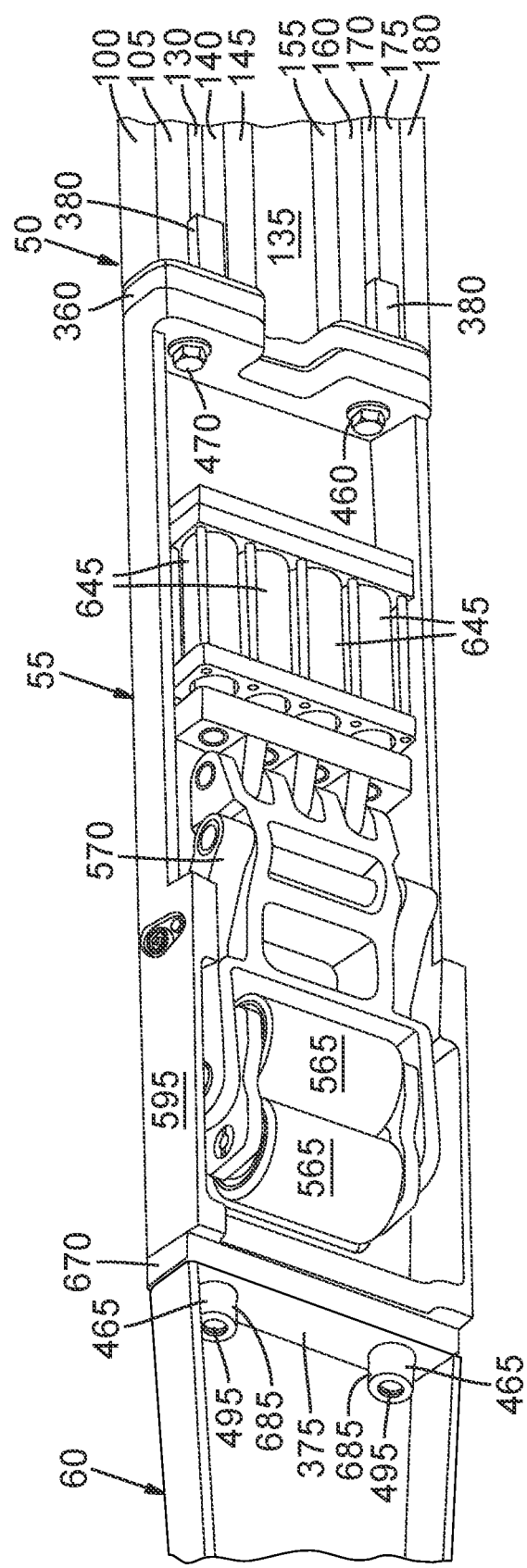
FIG. 3D illustrates a bottom right isometric view of a portion of the fork assembly, showing components of an embodiment of a first interlocking mechanism.
Figure 4A:
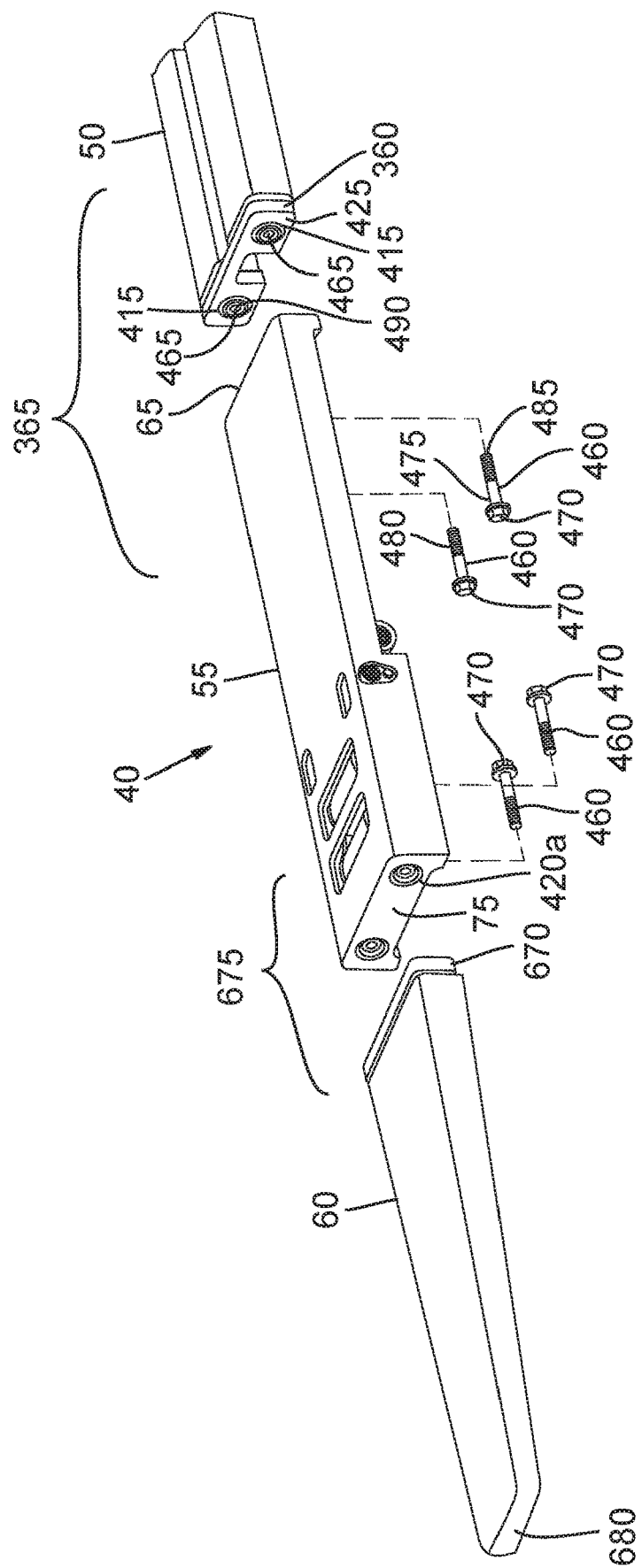
FIG. 4A illustrates a front right partly exploded isometric view of a portion of the fork assembly shown in FIG. 3A.
Figure 4B:
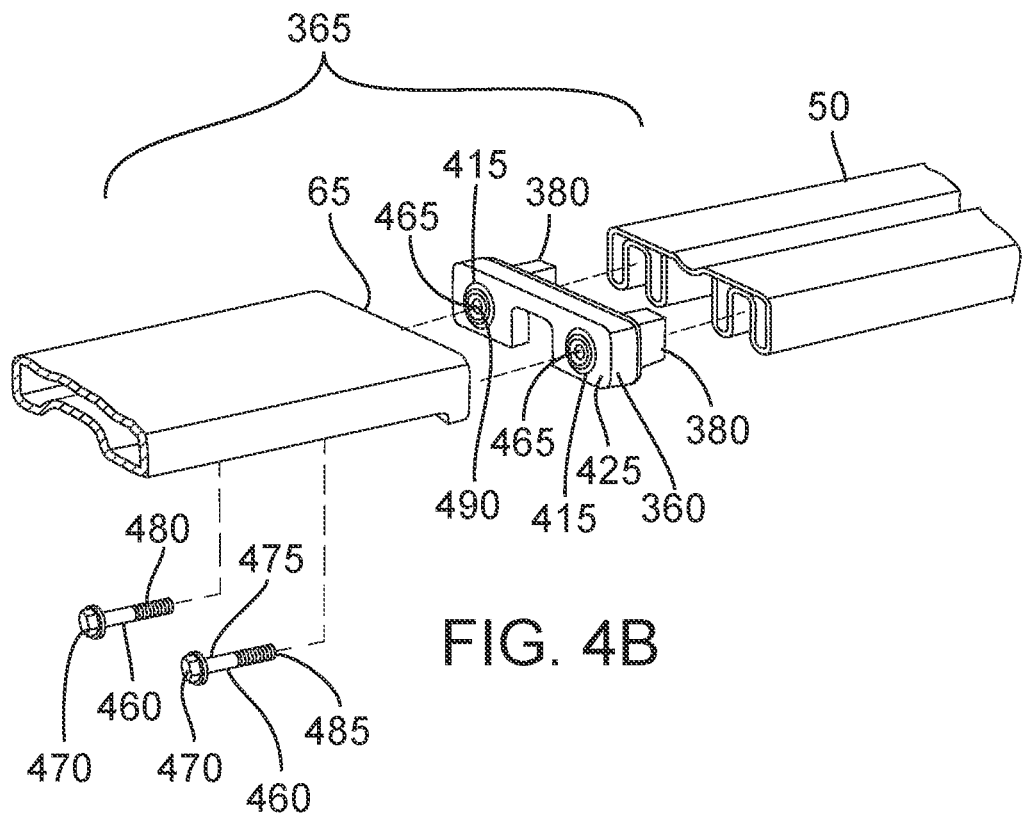
FIG. 4B illustrates a front right exploded isometric view of a portion of the fork assembly, showing components of an embodiment of a first interlocking mechanism.
Figure 4C:
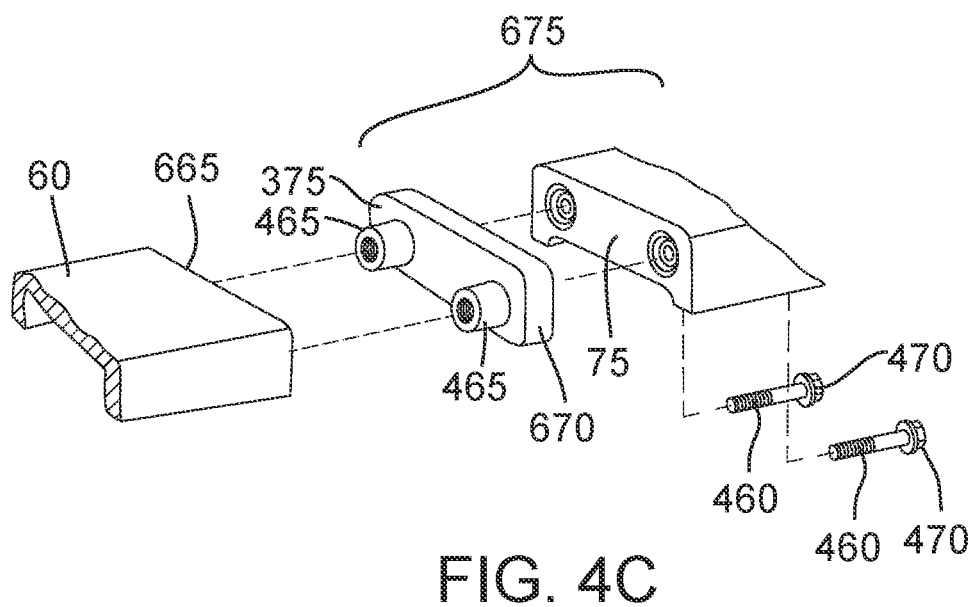
FIG. 4C illustrates a front right exploded isometric view of a portion of the fork assembly, showing components of an embodiment of a second interlocking mechanism.

FIG. 3A, FIG. 3B, and FIG. 3C (collectively FIG. 3) illustrate respective top plan, right side elevation, bottom, and bottom right isometric views of an example of a modular fork assembly 40. FIG. 4A illustrates a front right partly exploded isometric view of a portion of the modular fork assembly 40 shown in FIG. 3A; FIG. 4B illustrates a front right exploded isometric view of a portion of the modular fork assembly 40, showing components of an embodiment of a first interlocking mechanism 365; FIG. 4C illustrates a front right exploded isometric view of a portion of the modular fork assembly, showing components of an embodiment of a second interlocking mechanism 675; FIG. 4D illustrates a front right isometric view of an embodiment of an endcap 360; FIG. 4E illustrates a bottom rear right isometric view of an embodiment of the endcap 360; and FIG. 4F illustrates a rear left bottom isometric view of a body-facing end 65 of the load wheel module 55.

With reference to FIG. 3 and FIGS. 4A, 4B, 4C, 4D, 4E, and 4F (collectively FIG. 4) each modular fork assembly 40 includes multiple components. A fully assembled modular fork assembly 40 includes an elongate body 50, a load wheel module 55, and a fork tip 60 (also referred to as a fork toe). A proximal or body-facing end 65 of the load wheel module 55 can be detachably connected to a distal end 70 (opposite the proximal end 42) of the elongate body 50, the distal end 70 being furthest from the battery box 41. And, the fork tip 60 can be detachably connected to a distal or fork tip-facing end 75 of the load wheel module 55. The elongate body 50, the load wheel module 55, and the fork tip 60 may be randomly selected from an inventory of respective substantially identical elongate bodies 50, load wheel modules 55, and fork tips 60. To facilitate ease of storage and assembly, the elongate bodies 50 may have a first characterizing color; the load wheel modules 55 may have a second characterizing color; and the fork tips 60 may have a third characterizing color, wherein the first, second, and third characterizing colors are different.

For convenience and modularity, the optional heel 45, the elongate body 50, and the fork tip 60 may be identical for both the left and right modular fork assemblies 40 (e.g. the fork assemblies 40 coupled to the left and right sides of the battery box 41). Using identical components for both the left and right fork assemblies 40 increases the modularity of the system over a system in which the left and right forks are made with distinct, non-interchangeable components. However, distinct, non-identical exchangeable components may be used to create different left and right modular fork assemblies 40. For example, the elongate body 50 may be made in any desired length, detachably coupled to one of several different designs for the load wheel module 55, which is in turn detachably coupled to a desired fork tip 60 to create a customizable modular fork assembly 40 to accommodate a wide range of customer preferences.

Although a fork body of conventional cross-sectional construction can be employed, the elongate body 50 can alternatively be formed such that thinner and/or lighter materials may be used compared to existing fork bodies while providing excellent dimensional stability and reducing materials costs and/or weight. In some embodiments, the elongate body 50 may include no more than two longitudinal weldments, or no more than one longitudinal weldment. In some embodiments, the method further includes forming a longitudinal weldment to join the first longitudinal edge and the second longitudinal edge of the steel sheet; and, in particular embodiments, the longitudinal weldment may extend the full length of the elongate body portion.

Additionally, manufacturing processes that avoid the need to separately weld multiple parts together may be used, such as roll forming, additive manufacturing, or extrusion processes. One method of making the elongate body 50 for the modular fork assembly 40 includes using a rolling process to form a steel sheet into the elongate body 50, which may include an understructure 80 and a load-bearing upper structure 85. The rolling process may be a cold rolling process wherein the shape of the understructure is designed to be integrally strong so as to be substantially weldless or employ a few welds out of an abundance of caution. Alternatively a hot or warm rolling process may provide self-melding between components of the elongate body 50 that touch each other. The rolling process can be a continuous process that forms all the components of a cross section of the elongate body 50. Another method includes using an extrusion process to form the elongate body portion 50. The optional use of such processes to form the elongate body 50 reduces the assembly and welding costs typically associated with conventional fork manufacture. These and other features provide a competitive advantage and differentiator in an exceedingly crowded market.

Figure 5A:
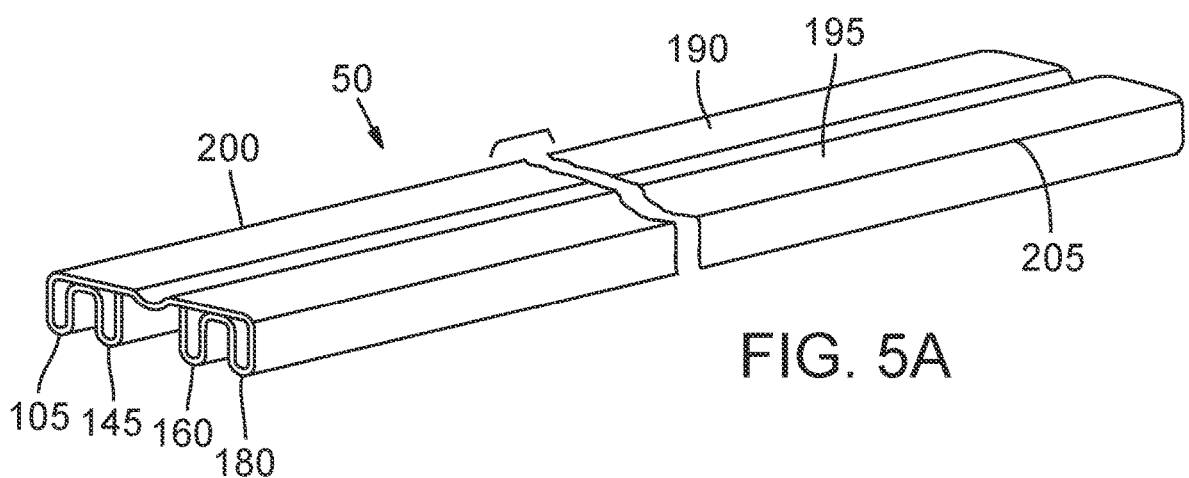
FIG. 5A illustrates a front right isometric view of an elongate body of the fork assembly shown in FIG. 3A.
Figure 5B:
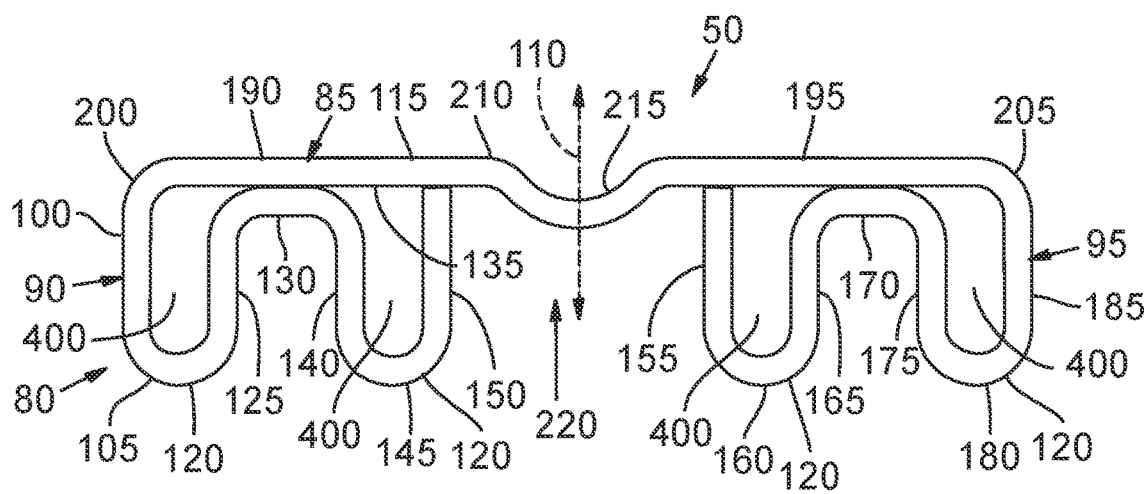
FIG. 5B illustrates a cross-sectional view of the elongate body shown in FIG. 5A.

FIG. 5A and FIG. 5B (collectively FIG. 5) illustrate a front right isometric view and a cross-sectional view, respectively, of an example of an elongate body 50 of a fork assembly 40. With reference to FIG. 5, the elongate body 50 may include an exemplary understructure 80 coupled to a load-bearing upper structure 85, which may form an upper surface 115 of the elongate body 50. The understructure 80 forms a structural element that resists one or more of flex, torsion, axial compression, and/or lateral deflection of the load-bearing upper structure 85. The understructure 80 may include a first truss 90 and a second truss 95. The first truss 90 may include a first strut 100 that extends downward from the outer edge of the load-bearing upper structure 85 in a generally orthogonal orientation with respect to the load-bearing upper structure 85. A first cross beam 105 is coupled to the first strut 100 and extends away from the first strut 100, for example, substantially orthogonally from the first strut 100 (toward a longitudinal midline 110 of the elongate body 50) to form a lower surface 120 of the elongated body 50. A second strut 125 may be coupled to the first cross beam 105 and may extend from the first cross beam 105 toward the load-bearing upper structure 85.

A second cross beam 130 may be coupled to the second strut 125 and may contact the lower surface 135 of the load-bearing upper structure 85. The second cross beam 130 may be optionally coupled to the load-bearing upper structure 85, for example, via spot welds or by being integrally formed with the load-bearing upper structure 85. A third strut 140 is coupled to the second cross beam 130 and extends from the second cross beam 130 away from the load-bearing upper structure 85. A third cross beam 145 is coupled to the third strut 140 and extends away from the third strut 140 (toward the midline 110 of the elongate body 50) to form another lower surface 120 of the elongate body 50. A fourth strut 150 extends from the third cross beam 145 towards the load-bearing upper structure 85 and may be coupled to the load-bearing upper structure 85.

The second truss 95 comprises a fifth strut 155 that extends downward from the load-bearing upper structure 85 and may be coupled to the load-bearing upper structure 85. A fourth cross beam 160 is coupled to the fifth strut 155 and extends away from the fifth strut 155, for example, substantially orthogonally from the fifth strut 204 (away from the longitudinal midline 110 of the elongate body 50) to form another lower surface 120 of the elongated body 50. A sixth strut 165 is coupled to the fourth cross beam 160 and extends from the fourth cross beam 165 towards the load-bearing upper structure 85.

A fifth cross beam 170 is coupled to the sixth strut 165 and contacts the lower surface 135 of the load-bearing upper structure 85. The fifth cross beam 170 is optionally coupled to the load-bearing upper structure 85, for example, via spot welds or by being integrally formed with the load-bearing upper structure 85. A seventh strut 175 is coupled to the fifth cross beam 170 and extends from the fifth cross beam 170 away from the load-bearing upper structure 85. A sixth cross beam 180 is coupled to the seventh strut 175 and extends away from the seventh strut 175 (away from the midline 110 of the elongate body 150) to form another lower surface 120 of the elongate body 50. An eighth strut 185 extends from the sixth cross beam 180 towards the load-bearing upper structure 85 and may be coupled to the load-bearing upper structure 85. The struts may be generally vertical, or one or more of the struts may be angled with respect to the plane(s) of first and second surface zones 190 and 195 of the load-bearing upper structure 85.

The load-bearing upper structure 85 and/or its upper surface 115 may include first and second surface zones 190 and 195 that may be positioned at least partly over the respective first and second trusses 90 and 95 of the understructure 80. The first and second surface zones 190 and 195 may, but need not, have identical dimensions, such as identical lengths and widths. The first and second surface zones 190 and 195 may comprise continuous flat surfaces that form part of the upper surface 115, or they may include features such as longitudinal grooves. Additionally, the first and second surface zones 190 and 195 may be coplanar or they may slope downward from their respective longitudinal edges 200 and 205 toward the midline 110. Also, the first and second surface zones 190 and 195 may be separated by a bridge 210 that spans at least a portion of the distance between the first and second trusses 90 and 95 of the understructure 80. The bridge 210 may also be coplanar with the first and second surface zones 190 and 195 or may include a stiffener or other feature such as a flute or medial furrow 215. The load-bearing upper structure 85 may be bilaterally symmetrical.

The understructure 80 may also be, but need not be, bilaterally symmetrical. The components of the first and second trusses 90 of the understructure 80 may form multiple U-bends. For example, in the embodiment depicted in FIG. 5, the first strut 100, the first cross beam 105, and the second strut 125 may form a U-bend; the third strut 140, the third cross beam 145, and the fourth strut 150 may form a U-bend; the fifth strut 155, the fourth cross beam 160, and the sixth strut 165 may form a U-bend; and the seventh strut 175, the sixth cross beam 180, and the eighth strut 185 may form a U-bend. These U-bends may have similar or different sizes. Additionally, the second strut 125, the second cross beam 130, and the third strut 140 may form an inverted U-bend; and the sixth strut 165, the fifth cross beam 170, and the seventh strut 175 may form an inverted U-bend. The inverted U-bends may have similar or different sizes with respect to each other or with respect to the non-inverted U-bends. One will appreciate that while the embodiment shown in FIG. 5 exhibits rounded edges (such as the edges of the U-bends or the edges of the load-bearing upper structure) that may facilitate rolling or extrusions process, these edges may be manufactured to form substantially transverse angles that may, or may not, be perpendicular.

One or more of the U-bends, the central space 220 under the bridge 210, or other features of the substructure 80 may form longitudinal channels to provide passage for a hydraulic line (not shown) that conveys hydraulic power from a hydraulic power source (not shown).

Figure 6A:
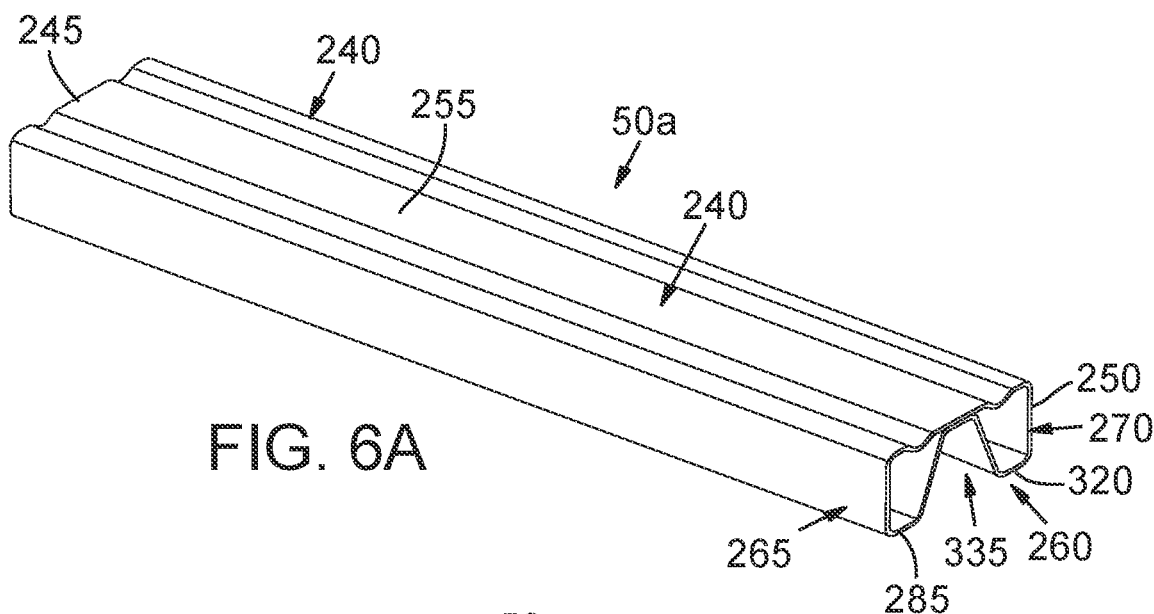
FIG. 6A illustrates a front left isometric view of an elongate body, according to an alternative embodiment.
Figure 6B:
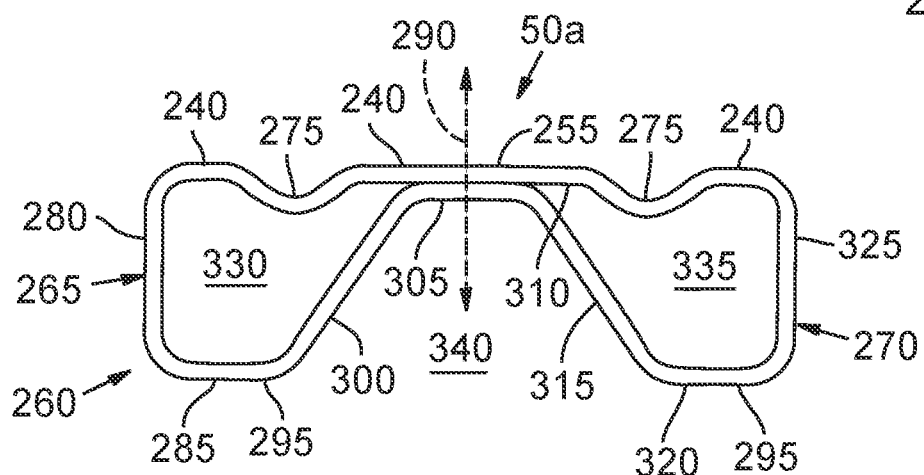
FIG. 6B illustrates a cross-sectional view of the elongate body shown in FIG. 6A.
Figure 6C:
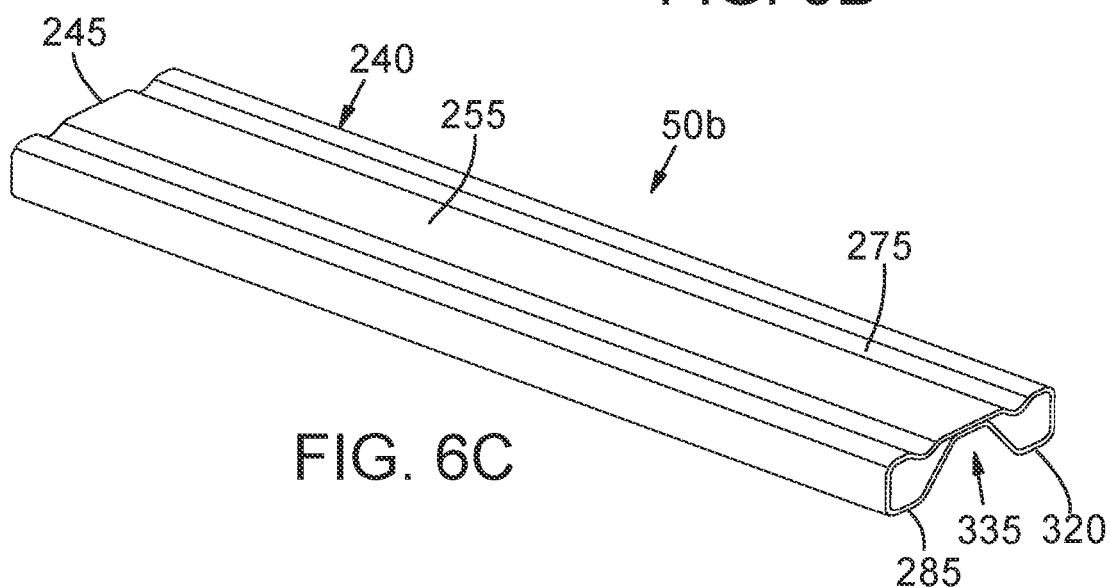
FIG. 6C illustrates a front left isometric view of an elongate body, according to another alternative embodiment.

FIGS. 6A and 6B (collectively FIG. 6) illustrate a front left isometric view and a cross-sectional view, respectively, of an elongate body 50a, according to an alternative embodiment; and FIG. 6C illustrates a front left isometric view of an elongate body 50b, according to another alternative embodiment. With reference to FIG. 6, the functions of the elongate body 50a and the elongate body 50b (collectively elongate body 50) are the same; however, their cross-sectional profiles are different. The elongate body 50a includes a load-bearing upper structure 240 extending longitudinally from a first end 245 to a second end 250. The load-bearing upper structure 240 comprises one or more surface zones 255, such as flat surfaces, and is coupled to a substructure 260 that may include a first truss 265 and a second truss 270 as discussed below. In some embodiments, the surface zone(s) 255 may be rigidly connected to one or more stiffeners 275, such as flutes. Stiffeners may be integrally formed with the surface zone(s) 255 to accomplish a rigid connection or may be welded or otherwise suitably secured to the flat surfaces. Stiffeners 275 may provide resistance against longitudinal bending of the flat surfaces, such as the surface zones 255. Alternate stiffeners include inverted flutes, fins 350 (see, e.g., FIG. 7), and other suitable structures that inhibit longitudinal bending of the flat surfaces. Stiffeners may protrude above the flat surfaces or may protrude below the flat surfaces.

The substructure 260 forms a structural element that resists one or more of flex, torsion, axial compression, and/or lateral deflection of the load-bearing upper structure 240. The first truss 265 includes a first strut 280 that extends downward from the outer edge of the load-bearing upper structure 240 in a generally orthogonal orientation with respect to the load-bearing upper structure 240. A first cross beam 285 is coupled to the first strut 280 and extends away from the first strut 280, for example, substantially orthogonally from the first strut 280 (toward the midline 290 of the elongate body 50) to form a lower surface 295 of the elongate body 50. A second strut 300 is coupled to the first cross beam 285 and extends from the first cross beam 285 towards the load-bearing upper structure 240. The second strut 300 may be non-perpendicular (e.g., positioned in a diagonal plane) with respect to the load-bearing upper structure 240 to enhance the stiffness and torsion-resistance of the elongate body 50.

A second cross beam 305 is coupled to the second strut 300 and may contact a lower surface 310 of the load-bearing upper structure 240. The second cross beam 305 can be coupled to the load-bearing upper structure 240, for example, via spot welds or by being integrally formed with the load-bearing upper structure 240. A third strut 315 is coupled to the second cross beam 305 and extends from the second cross beam 305 away from the load-bearing upper structure 240. The third strut 315 may be non-perpendicular (e.g., positioned in a diagonal plane) with respect to the load-bearing upper structure 240 to enhance the stiffness and torsion-resistance of the elongate body 50. A third cross beam 320 is coupled to the third strut 315 and extends away from the third strut 315 (away from the midline 290 of the elongate body 50) to form another lower surface 295 of the elongate body 50. A fourth strut 325 extends from the third cross beam 94 towards the load-bearing upper structure 240 and is coupled to the other outer edge of the load-bearing upper structure 240.

In some embodiments, the substructure 260 may be coupled to the load-bearing upper structure 240 via welding. The substructure 260 may be integrally formed with the load-bearing upper structure 240. Alternatively, the substructure 260 may be partially integrally formed with the load-bearing upper structure 240 and secured to the load-bearing upper structure 240 via welding or other suitable attachment. Likewise, elements of the substructure 260 may be integrally formed together, may be welded or otherwise suitably attached together, or may be coupled via a combination of integral formation and attachment such as welding.

The second cross beam 305 may be substantially parallel to the load-bearing upper structure 240, may contact and/or be secured to or formed as part of the lower surface 310 of the load-bearing upper structure 240, and may act as a second load-bearing member. Coupling the second cross beam 305 and the load-bearing upper structure 240 to one another, or forming them together, may reduce sliding between them when they are placed under load.

The load-bearing upper structure 240 and the first strut 280, the first cross beam 285, and the second strut 300 of the first truss 265 may form a side channel 330. The load-bearing upper structure 240 and the third strut 315, the third cross beam 320, and the fourth strut 325 of the second truss 270 may form a side channel 335. The first truss 265 and the second truss 270 are spaced apart to form a central channel 340 within the substructure 260 of the fork assembly 40. These channels may provide passage for a hydraulic line (not shown) that conveys hydraulic power from a hydraulic power source (not shown).

With reference to FIG. 6C, the functions of the elongate body 50b and the elongate body 50a (collectively elongate body 50) are the same; however, their cross-sectional profiles are different. The elongate body 50b of FIG. 6C is a squatter variation of the elongate body 50*a* shown in FIG. 6A. Accordingly, FIGS. 6A and 6C share many of the same reference numerals.

Figure 7:
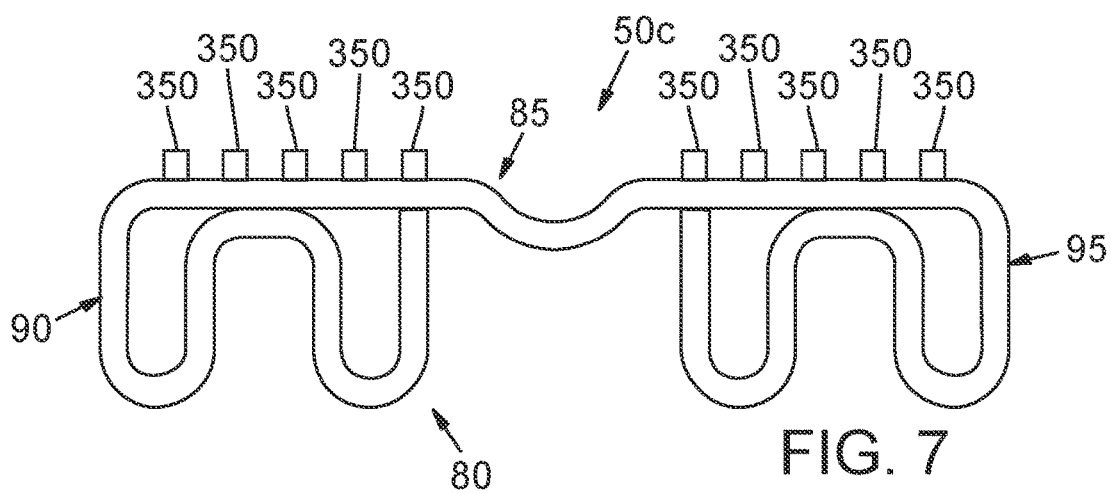
FIG. 7 illustrates a cross-sectional view of an elongate body portion, according to another alternative embodiment.

FIG. 7 illustrates a cross-sectional view of another alternative elongate body 50*c*. With reference to FIG. 7, the elongate body 50*c* and the elongate body 50 (collectively elongate body 50) are substantially identical with the exception of the stiffener fins 350. The plurality of the fins 350 may serve to form the upper-most surface of the load-bearing upper structure 85, and may support a load, such as a pallet, thereupon.

FIGS. 8A, 8B, and 8C (collectively FIG. 8) illustrate a front right bottom isometric view, a top front right isometric view, and a top front right enlarged isometric view of portions of the elongate body 50 of the modular fork assembly 40, wherein the elongate body 50 is attached to an embodiment of endcaps 360 that form part of a first interlocking mechanism 365 (FIG. 4) that is configured for detachable connection of the elongate body 50 to the load wheel module 55. With reference to FIGS. 3, 4, and 8, the endcaps 360 may be configured for welding or other means of permanent or nonpermanent attachment to the proximal and/or distal ends 42 and 70 of the elongate body 50. In one example, the endcap 360 may have an endcap body 385 (FIG. 4D) between an external side 370 and an internal side 375 (FIG. 4E) with respect to how the endcap 360 is positioned on the end of the elongate body 50, such that the internal side 375 is closest to the elongate body 50 and the external side 370 is farthest from the elongate body 50 and exposed outwardly when the endcap 360 is connected to the elongate body 50.

The endcap 360 may include a beveled edge 390 between a side surface 395 and the internal side 375. The beveled edge 390 may facilitate a snug fit between the endcap 360 and the proximal end 42 and/or distal end 70 of the elongate body 50. The beveled edge 390 may also provide adequate space or surface area to accommodate a superior weld between the endcap 360 and the elongate body 50.

The endcap 360 may include one or more external flanges 380 that extend from the internal side 375 and are configured to slide into one or more of the externally open channels formed in the understructure 80 and/or in the load-bearing upper structure 85. When welding is the desired means of permanent attachment, the flanges 380 may be configured to contact, and/or conform to the shape of, one or more exposed surfaces of the externally open channels, such as the exposed surfaces of the cross beams 130 and 170 or the lower surface 135 beneath the bridge 210.

The endcap 360 may also include one or more prongs (not shown) that extend from the internal side 375 and are configured to slide into one or more of the closed channels formed by the understructure 80 and/or formed by a combination of portions of the understructure 80 and the load-bearing upper structure 85, such as closed channels 400. The prongs may be configured to contact, and/or generally conform to the shape of, one or more of the surfaces of the closed channels 400, such as the interior surfaces of the struts 100, 125, 140, 165, and 175, such as the interior or exterior surfaces of struts 150 and 155, and/or such as the lower surface 135 within the channels 400. Each prong may include one or more tabs or bumps that are configured to mate with crimps or indentations within the interior surfaces of the channels 400 and may serve to hold or secure the endcaps 360 in place while they are welded or more permanently attached by other means to the elongate bodies 50.

The endcaps 360 may form part of the first interlocking mechanism and may include interlocking features that mate with interlocking features of alternative endcaps (not shown) or interlocking features configured into the body-facing end 65 of the load wheel module 55. One example of interlocking features includes one or more sheer-resistant features, such as protruding features 415 and respective mating receiving features 420 (FIG. 4F). In particular, one of the protruding feature 415 or the receiving feature 420 may be configured to permanently connect to the elongate body (or the endcap 360), and a different one of the protruding feature 415 or the receiving feature 420 may be configured to permanently connect to the load wheel module 55 (or an alternative endcap if one is employed for the load wheel module 55).

In one example, the protruding features 415 may protrude from an external face 425 of the external side 370 of the endcap 360 and may have any shape that is adequate for engagement with respective receiving features 420 configured in alternative endcaps or the interlocking features in the body-facing end 65 of the load wheel module 55. In particular, the protruding features 415 may have a sectional profile of any geometric shape. For example, the sectional profile of the protruding features 415 may be circular as shown in FIG. 8, or the sectional profile may be another shape such as elliptical, rectangular, square, triangular, hexagonal, or octagonal.

The protruding features 415 may have any width or diameter that is typically smaller than dimensions of the external face 425 of the external side 370 (such that the protruding features 415 does not extend above the load-bearing upper structure 85). A typical minimum width of a protruding feature 415 might be about 25 mm. The protruding features 415 may have any protruding height beyond the external face 425 of the external side 370 of the endcap 360 to the extent that the mated receiving feature 420 would not interfere with operation of the load wheel module 55. A typical minimum protruding height might be about 8 mm.

Similarly, the receiving features 420 may have a sectional profile of any geometric shape. For example, the sectional profile of the receiving features 420 may be circular as shown in FIG. 4F, or the sectional profile may be elliptical, rectangular, square, triangular, hexagonal, or octagonal. Moreover, the receiving features 420 may have any width or diameter that is typically smaller than dimensions of the external face 425 of the external side 370. A typical minimum width of a receiving feature 420 might be about 25 mm. The receiving features 420 may have any depth into the mated interlocking feature to the extent that the mated receiving feature 420 would not interfere with operation of the load wheel module 55. A typical minimum depth of receiving feature 420 might be about 8 mm.

Although FIG. 8 depicts only two mated sets of protruding and receiving features 415 and 420, additional sets, or only one, may be employed. For example, a set could additionally or alternatively be employed in proximity to one or more of the corners 435 of the external face 425 (and respective face 450) of the body-facing end 65 of the load wheel module 55. One will also appreciate that the endcap 360 may employ one or more of the receiving features 420 instead of the protruding features 415. Alternatively, the endcap 360 may employ a mix of one or more of the receiving features 420 and one or more of the protruding features 415. The mated endcaps or the interlocking features configured into the body-facing end 65 of the load wheel module 55 would be configured accordingly to mate with the alternative configurations.

With reference again to FIG. 4A, the first interlocking mechanism 365 may additionally or alternatively employ one or more fastener sets, such as male and female mated fasteners. Any suitable mated fastener set can be employed, such as threaded fasteners, unthreaded fasteners, or compression fasteners. The embodiment shown in FIG. 4 employs externally threaded fasteners 460 that are mated to one or more respective internally threaded receptacles 465. The externally threaded fasteners 460 may include a head 470, a shank 475, a thread 480, and a tip 485. The internally threaded receptacles 465 may include a head side 490, which is closest to the head 470 when the externally threaded fastener 460 is mated to the internally threaded receptacle 465, and a tip side 495, which is closest to the tip 485 when the externally threaded fastener 460 is mated to the internally threaded receptacle 465.

An example of externally threaded fasteners 460 includes 16-mm flange-head cap screws or bolts. One will appreciate that the diameter can be of any suitable size. However, a diameter large enough to aid in resistance to sheer between the detachably connected parts might be beneficial. In some embodiments, the externally threaded receptacles 465 have a minimum shank diameter of about 12 mm.

In the depicted embodiment, the endcap 360 includes multiple ones of the same set of fasteners in the same respective engagement arrangements, such that all of the internally threaded receptacles 465 are configured with their head sides 490 closest to the external face 425 of the endcap 360. However, one will appreciate that the endcap 360 could include one or more internally threaded receptacles 465 configured with their head sides 490 closest to the external face 425 and one or more internally threaded receptacles 465 configured with their tip sides 495 (hidden within the flange 480 in connection with the interlocking mechanism 360 but shown in FIG. 3D in connection with a second interlocking mechanism 675) closest to the face 425. Alternatively or additionally, the endcap 360 may be configured to include one or more different types of sets of mated fasteners. In the embodiment shown in FIG. 4E, the tip side 495 is entirely hidden within the flange 480, but the internally threaded receptacles 465 could be configured so that they form a tunnel all the way through the flanges 480.

In the example shown in FIG. 4, the sheer-resistant features are configured to incorporate one internally threaded receptacles 465. In particular, the protruding features 415 and the receiving features 420 each have holes to receive the externally threaded fastener 460. When threaded fasteners are employed, at least the protruding feature 415 or the receiving feature 420 that is intended to be closest to the tip 485 may be internally threaded (if a separate nut, for example, is not employed). In the embodiment shown, the protruding features 415 of the endcap 360 include the internally threaded receptacles 465 because the welding flanges 380 could be in the way of placing a nut or tightening the fastener head 470. One will appreciate that the design of the elongate body 50 or the endcap 360 can be modified to accommodate placement of the head 470 of the externally threaded fastener 460, in which circumstances the sheer-resistant feature, such as the receiving feature 420 in the body-facing end 65 of the load wheel module 55 could be configured to incorporate the internally threaded receptacles 465. However, if the fastener head 470 is to be closest to the body-facing end 65 of the load wheel module 55, then the shank holes 500 of the receiving feature 420 in the body-facing end 65 of the load wheel module 55 can be threaded or unthreaded.

Figure 9C:
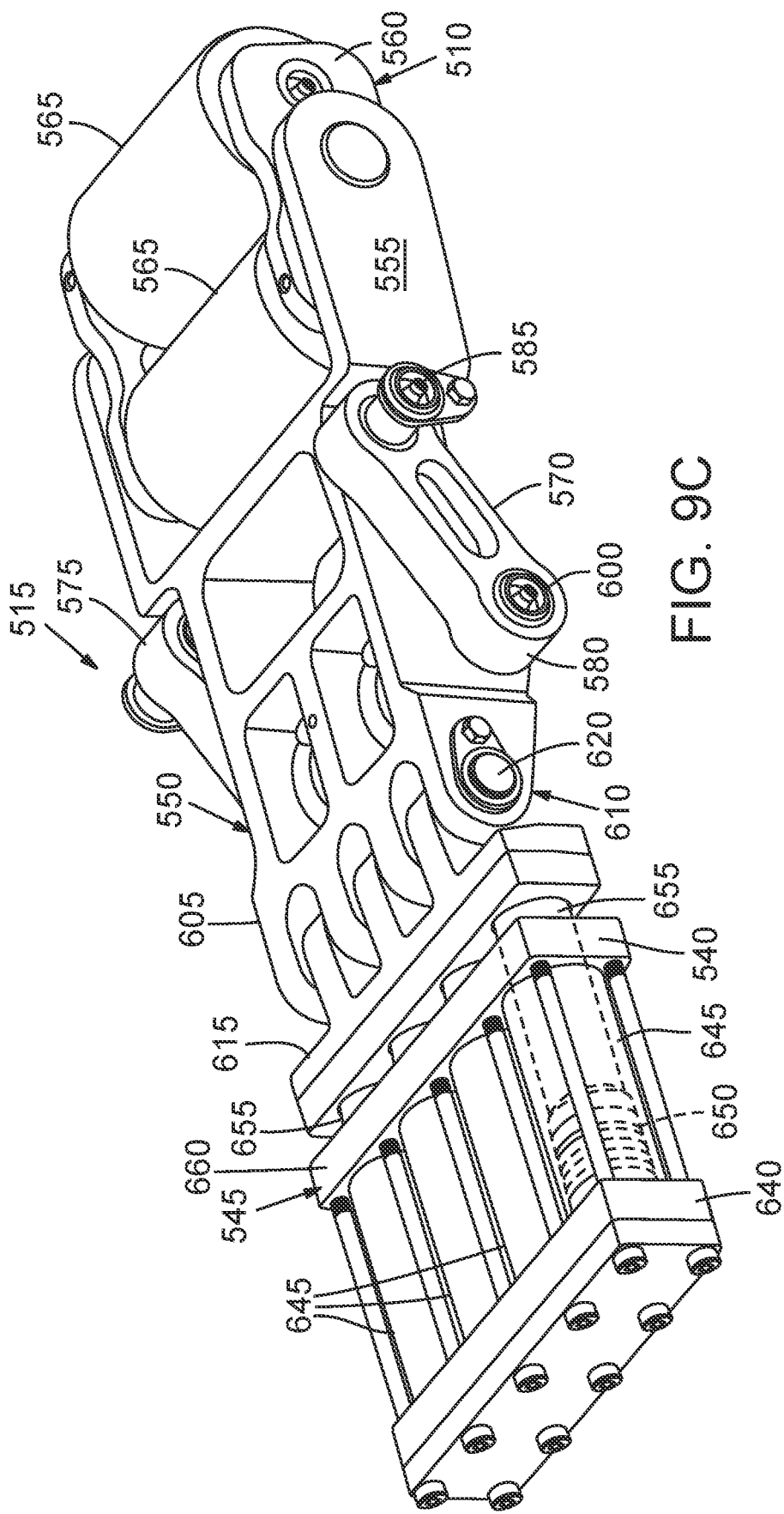
FIG. 9C illustrates a front right top isometric view of a wheel module substructure of a load wheel module, according to one embodiment.

FIG. 9A illustrates a front right bottom isometric view of a load wheel module 55 with a load wheel unit 510 in an undeployed position 440; FIG. 9B illustrates a front right bottom isometric view of the load wheel module 55 with a load wheel unit 510 in a deployed position 445; and FIG. 9C illustrates a front right top isometric view of a wheel module substructure 515. With reference to FIGS. 9A, 9B, and 9C (collectively FIG. 9), and additionally FIGS. 3 and 4, the load wheel module 55 includes a frame 520 that houses the wheel module substructure 515. The frame 520 includes a frame upper surface 525 and a frame lower surface 530. The frame upper surface 525 may be configured to support and provide sliding contact to a load, and the frame lower surface 530 may be configured to provide one or more points of contact with components of the wheel module substructure 515.

The frame 520 may have a body-facing end 65 and a fork tip-facing end 75 that may be substantially identical in shape or that may be different. For example, both of the body-facing end 65 and the fork tip-facing end 75 may be configured to include substantially identical interlocking mechanism components. In particular, the sheer-resistant features, such as the protruding features 415 or the receiving features 420 may be identically positioned on both of the body-facing end 65 and the fork tip-facing end 75. The wheel module assembly 55 depicted in FIG. 9 includes receiving features 420a configured into its fork tip-facing end 75. One will appreciate, however, that the body-facing end 65 and the fork tip-facing end 75 may have different types of sheer-resistant features in the same or different locations on each of the facing ends of the frame 520.

The frame 520 may also include an aperture 535 in both of the body-facing end 65 and the fork tip-facing end 75 if symmetry is desired for manufacturing. However, in some embodiments, only the body-facing end 65 of the frame 520 may include the aperture 535 to provide passage for a hydraulic line (not shown) that conveys hydraulic power from a hydraulic power source (not shown) to a hydraulic actuator 540 in the load wheel module 55. In other embodiments, the aperture 535 may provide passage for a mechanical link arm to facilitate lowering and raising a load wheel 565 via a suitable mechanical system coupled to the load wheel module 55, where the mechanical link arm receives a motive force from a power source located in a forklift truck body.

The wheel module substructure 515 may include a hydraulic actuator assembly 545 and a load wheel assembly 550 that is operatively connected to the frame 520. The load wheel assembly 550 includes a wheel carrier strut 555 (also called a wheel carrier frame) that is operatively connected to, and supports, the load wheel unit 510 that includes a wheel carrier 560 that supports one or more load wheels 565. In one example, the wheel carrier strut 555 has a U-shaped distal portion that is pivotally connected to the wheel carrier 560 on both sides of the load wheels 560.

The wheel module substructure 515 may be positioned within the frame 520 such that the hydraulic actuator assembly 545 is positioned closer to the body-facing end 65 of the load wheel module 55 and the load wheel assembly 550 is positioned closer to the fork tip-facing end 75 of the load wheel module 55. In particular, the hydraulic actuator 540 may be positioned closer to the body-facing end 65 and the load wheels 565 may be positioned closer to the fork tip-facing end 75.

The wheel carrier strut 555 is also operatively connected to the load wheel module frame 520 and to the hydraulic actuator assembly 545. In one example, the operative connection to the frame 520 may be implemented by one or more pivot bars 570 that may be pivotally connected at a bar frame end 575 to the frame 520 and at a bar strut end 580 to the wheel carrier strut 555. Part of a pivot mechanism 585 at the bar frame end 575 may be secured within a recess 590 in an exterior side surface 595 of the frame 520 so that the part of the pivot mechanism 585 will not catch when the modular fork assemblies 40 are slid into load structures that support the load. One will appreciate that other pivot mechanisms can additionally or alternatively be counter sunk into the components that they are pivoting. For example, although not depicted in this manner, part of the pivot mechanism 600 at the bar strut end 580 may be recessed into the pivot bar 570.

An actuator-facing end 605 of the wheel carrier strut 555 may be operatively connected to the hydraulic actuator assembly 545 via a pivot mechanism 610 at a strut-facing end 615 of the hydraulic actuator assembly 545. The pivot mechanism 610 may include a pivot 620 that extends through one or more strut teeth 625 at the actuator-facing end 605 of the wheel carrier strut 555 that are interweaved with one or more actuator assembly teeth 630 at the strut-facing end of the hydraulic actuator assembly 545.

The hydraulic actuator assembly 545 may include a hydraulic line input connector (also called a cap-end port) (not shown) operative for connecting the hydraulic actuator 540 to a hydraulic line (not shown) that transmits hydraulic fluid from a hydraulic power source (not shown). The hydraulic line input connector may supply a hydraulic manifold 640 that distributes hydraulic power from the hydraulic line into multiple hydraulic barrels (also called hydraulic cylinders) 645 that each include a piston 650 (shown in broken lines in FIG. 9C) that is operatively connected to a piston rod 655.

In some embodiments, the hydraulic actuator 540 may include from one to ten pistons 650. In some embodiments, the hydraulic actuator 540 includes at least two pistons 650. In some embodiments, the hydraulic actuator 540 may include from two to ten pistons 650. In some embodiments, the hydraulic actuator 540 includes at least three pistons 650. In some embodiments, the hydraulic actuator 540 may include from three to eight pistons 650. In some embodiments, the hydraulic actuator 540 may include from three to six pistons 650. FIG. 9C shows an example of a hydraulic actuator 540 that includes four hydraulic barrels 645, each of which includes a respective piston 650.

In one example, the piston 650 may have has a length within the range of about 0.50 inches to about 3 inches (or about 1.25 cm to about 7.75 cm) and a stroke length within the range of about 1 inch to about 3 inches (or about 2.50 cm to about 7.75 cm). In another example, the piston 650 may have a length within the range of about 1 inch to about 2 inches (or about 2.50 cm to about 5.25 cm) and a stroke length within the range of about 1.5 inches to about 2.5 inches (or about 3.75 cm to about 6.50 cm).

In one example, the hydraulic barrels 645 have a capability up to about 3,200 psi. In some embodiments, the hydraulic barrels 645 have a capability of greater than about 2,000 psi. In some embodiments, the hydraulic barrels 645 have a capability of greater than about 3,000 psi. In some embodiments, the hydraulic power from the hydraulic power source has a maximum pressure within the range of about 13,790 to about 27,580 kilopascals (about 2000 to about 4000 psi) at the hydraulic line input connector.

In some embodiments, the hydraulic actuator 540 is operable to provide maximum thrust within a range of about 15,000 pounds (or about 66,700 newtons) to about 30,000 pounds (or about 133,500 newtons). In some embodiments, the hydraulic actuator 540 is operable to provide greater than about 15,000 pounds (or greater than about 66,750 newtons) of thrust. In some embodiments, the hydraulic actuator 540 is operable to provide greater than about 20,000 pounds (or greater than about 89,000 newtons) of thrust.

The load wheel unit 510 may rest in an undeployed position 440 when the hydraulic actuator 540 is not actively pushing the piston rods 655 beyond a cylinder head 660 of the piston assembly. The load wheel unit 510 may be deployed into a deployed position 445 in response to a load wheel deployment signal that may be provided by an automated system or may be provided in response to a manually activated input, such as a switch or button. The load wheel deployment signal directly or indirectly causes hydraulic power to be propagated through a hydraulic line positioned within the elongate body 50 of the modular fork assembly 40. The hydraulic power may be in the form of a hydraulic fluid under pressure.

The hydraulic line delivers the hydraulic power through the hydraulic line input connector to the hydraulic manifold 640 that distributes the hydraulic power to the hydraulic barrels 645 of the hydraulic actuator 540. The hydraulic power pushes the pistons 650 of the hydraulic actuator 540 so that the piston rods 655 extend beyond the cylinder head 660 to push against the actuator-facing end 605 of the wheel carrier strut 555, causing the pivot bar 570 to force the load wheel unit 510 to assume a predetermined deployed position 445 in which the load wheel unit 510 is vertically spaced apart from the load wheel module frame 520. One will appreciate that the hydraulic line and hydraulic actuator assembly 545 can be replaced by a link rod that is actuated close to the proximal end 40 of the elongate body 50 and a mechanical system coupled to the load wheel module 55 and arranged to lower and raise the load wheel 565 in response to movement of the link rod. For example, a suitable mechanical system may be coupled to a load wheel module 55 with a link rod extending through an elongate body 50 of a fork assembly 40 to mechanically connect the mechanical system with a power source such that force from the power source is transmitted via the link rod to the mechanical system to lower and raise the load wheel 565.

With reference again to FIGS. 3 and 4, a second interlocking mechanism 675 can be configured to detachably connect the load wheel module 55 to the fork tip 60 or an endcap 670. The fork-tip facing end 75 of the load wheel module 55 can be configured to mate with the proximal end 665 of the fork tip 60 or the endcap 670. The endcap 670 may form part of the second interlocking mechanism 675. The endcap 670 may be substantially identical to, or different from, the endcap 360. Moreover, the second interlocking mechanism 675 may be substantially identical to, or different from, the first interlocking mechanism 365. In the embodiment shown in FIG. 3D, the internally threaded receptacle 465 may be configured as a ferrule 685 that protrudes from the internal side of the endcap 670. The tip side 495 of the internally threaded receptacle 465 may be open or closed.

All the alternatives described with respect to the first interlocking mechanism 365 may apply to the second interlocking mechanism 675. In one alternative embodiment, the fork-tip facing end 75 of the load wheel module 55 may be provided with the sheer-resistant protruding features 415, and the endcap 670 or the proximal end 665 of the fork tip 60 may be provided with the sheer-resistant receiving features 420.

The fork tip 60 has a distal end (also referred to as the toe end) 680 that is opposite the proximal end 665, i.e., the distal end 680 is furthest from the battery box 41. The distal end 680 of the fork tip 60 initially engages a pallet when the modular fork assembly 40 is directed to pick up a load. The fork tip 60 may taper in one or more dimensions from the proximal end 665 to the distal end 680 so that the perimeter of the distal end 680 is smaller than the perimeter of the proximal end 665. In one example, the fork tip 60 and/or the distal end 680 has a wedged shape. In another example, the distal end 680 has a curved shape.

A major advantage of the modularity of the modular fork assembly 40 is that any one of the modular components, such as the elongate body 50, the load wheel module 55, or the fork tip 60, can be readily replaced if they become bent or otherwise damaged. Such replacement can be achieved without metal cutting or welding. In some embodiments, only a simple tool such as a screwdriver or wrench may be utilized to effect the replacement. Moreover, these modular fork assemblies 40 and their components may be readily salvaged from a disabled vehicle and reused in a working vehicle or as replacement parts.

One approach that increases the success ratio of pallet engagement and disengagement involves offsetting the forward load wheels 14 of the different forks 12 along a longitudinal axis 18 of the pallet truck 9. This approach is disclosed in detail in U.S. Provisional Patent Application No. 62/609,235, entitled "Offset Load Rollers for a Pallet Truck", which is incorporated herein by reference.

Load wheels with torque-coupling assemblies may be used in conventional fork configurations or other suitable environments as well. This disclosure teaches additional or alternative means to increase the entry and exit potential with respect to pallet pockets 6 of closed pallets 1 that are empty or have a light-weight palletized load. For example, torque between the rear load wheel 15 and the forward load wheel 14 can be coupled so that if either of the rear load wheel 15 or the forward load wheel 14 meet resistance at a base board 2, then rotation of the other of the load wheels 17 will increase the ability of the inhibited load wheel 17 to move over the base board 2. In particular, if the forward load wheel 14 meets resistance when encountering the base board 2 while attempting to enter a pocket 6, then the continuous rotation of the rear load wheel 15 if a forward direction (caused by friction against the ground due to movement of the pallet truck 9) will cause rotation of the forward load wheel 14 if the torque is coupled between the load wheels 17. Similarly, if the rear load wheel 15 meets resistance when encountering a base board 2 while attempting to exit a pocket 6, then the continuous rotation of the forward load wheel 14 (in a reverse direction) will cause rotation of the rear load wheel 15 if the torque is coupled between the load wheels 17.

Figure 10A:
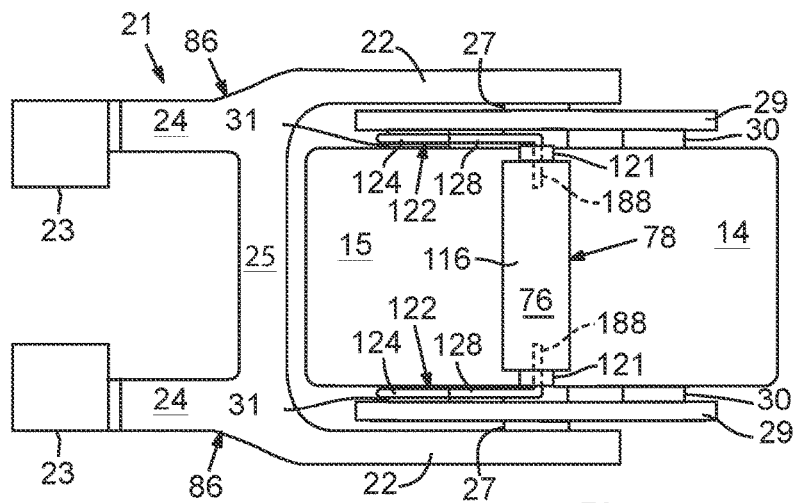
FIG. 10A is a top plan view of a load wheel assembly employing an embodiment of a torque-coupling assembly.
Figure 10B:
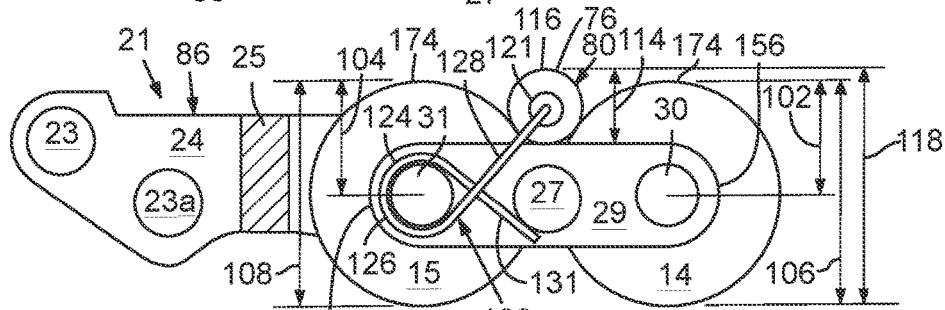
FIG. 10B is a side elevation view of the load wheel assembly of FIG. 10A with a wheel carrier strut and a portion of a wheel carrier bracket removed for clarity.

FIG. 10A is a top plan view of a load wheel assembly 21 employing an embodiment of a torque-coupling assembly 78, and FIG. 10B is a side elevation view of the load wheel assembly 21 of FIG. 10A with one of two wheel carrier struts 22 and a portion of a wheel-carrier bracket 86 removed for clarity. A torque coupler or torque-coupling assembly 78 can be implemented in many ways. One will appreciate that a torque-coupling assembly 78 can be implemented as any torque coupler known in the art, as well as any of the torque-coupling means for coupling torque described herein.

With reference to FIGS. 10A and 10B, the load wheel assembly 21 may include one or more wheel-carrier brackets 86 that operatively connect one or more of the load wheels 17 to the fork 12. The wheel-carrier bracket 86 may include one or more fork attachment pivot holes 23 or 23a that can be used to attach the wheel-carrier bracket 86 to the fork 12. The fork attachment pivot holes 23 may be positioned toward a proximal end of the wheel-carrier bracket 86 on separate bracket arms 24 connected by a bracket cross bar 25. The wheel-carrier struts 22 may extend forward from the bracket cross bar 25 on separate sides of the load wheels 17. In some embodiments, each wheel-carrier strut 22 may include an axle mount hole 26 (or other mounting means) adapted to receive a carrier axle 27 (with or without bushings 95, see FIG. 1E) of a wheel carrier 29 to facilitate rotatable connection between the wheel-carrier struts 22 and the wheel carriers 29. The wheel carriers 29 are also connected to a forward axle 30 and a rear axle 31 to permit rotation of the respective forward load wheel 14 and the rear load wheel 15. For purposes of discussion, the wheel carrier 29, the forward load wheel 14, the rear load wheel 15, the forward axle 30, the rear axle 31, and the torque-coupling assembly 78 can be grouped together as a load wheel unit 78.

Forks 12 tend to have a limited height dimension that is typically shorter than a spacer height 7 of the closed-bottom pallet 1 so that the forks 12 and their respective load wheel assemblies 21 can easily fit between the base boards 2 and the upper planks 5. The spacer height 7 may be slightly shorter than a pallet gap height 8 between the base boards 2 and the upper planks 5. Accordingly, the forward load wheel 14 has a forward wheel radius 102 that may be less than half the spacer height 7 or less than half the pallet gap height 8. Similarly, the rear load wheel 15 has a rear wheel radius 104 that may be less than half the spacer height 7 or less than half the pallet gap height 8. Additionally, the forward load wheel 14 has a forward wheel height 106 above the supporting surface 3 that may be shorter than the spacer height 7 or the pallet gap height 8. Similarly, the rear load wheel 15 has a rear wheel height 108 above the supporting surface 3 that may be shorter than the spacer height 7 or the pallet gap height 8.

Figure 17A:
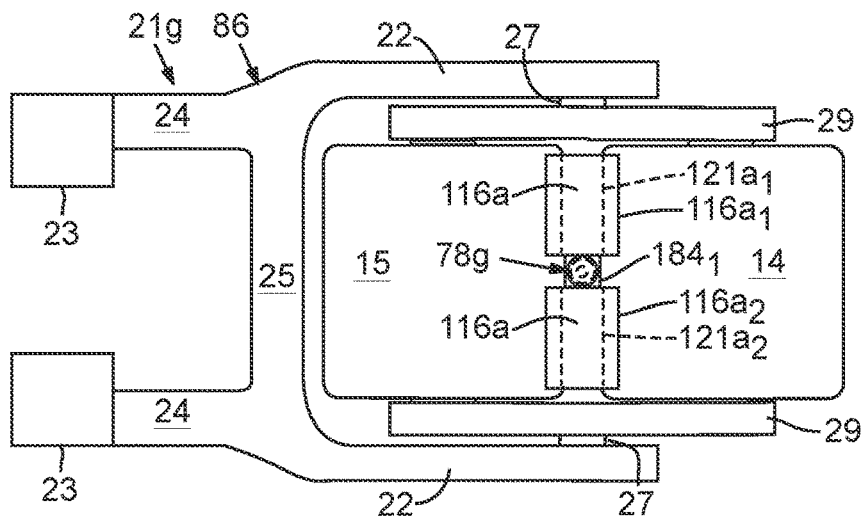
FIG. 17A is a top plan view of a load wheel assembly employing another alternative embodiment of a torque-coupling assembly.
Figure 17B:
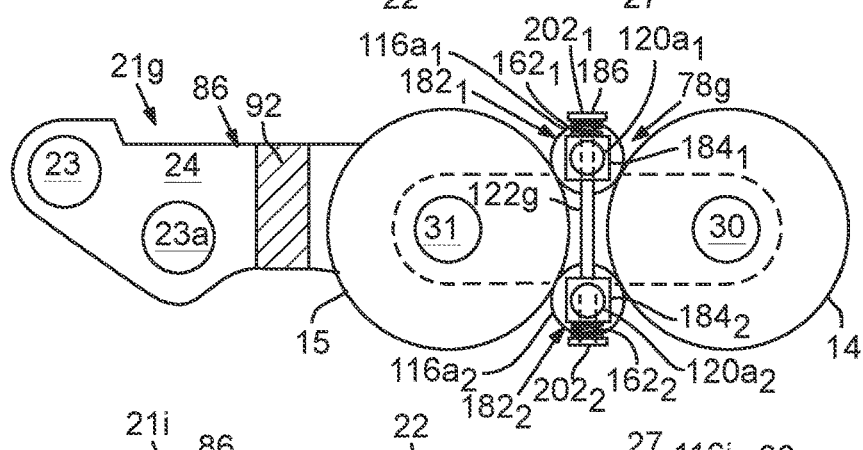
FIG. 17B is a side elevation view of the load wheel assembly of FIG. 17A with a wheel carrier strut and a portion of a wheel carrier bracket removed for clarity.

One will appreciate that the operative connection of the load wheels 17 to the fork can be implemented in a variety of alternative ways. For example, FIGS. 17A-17C and 17A-17C show one embodiment for connecting the load wheels 17 to the fork and are described later.

Neither the forward load wheel 14 nor the rear load wheel 15 is connected directly or indirectly to a motor, i.e., the load wheels 17 are non-motorized or unmotorized. More specifically, there is no mechanical linkage from a drive motor that causes rotation of the load wheels 17. Moreover, rotation of the load wheels 17 is caused by movement of the pallet truck 9 and contact of at least the forward load wheel 14 or the rear load wheel 15 with the supporting surface 3.

The torque-coupling assembly 78 shown in FIGS. 10A and 10B employs an idler wheel 116 (also called a coupling wheel) that may rotate about an idler axle 121 and that has an idler wheel surface 76 (also called a coupling wheel surface) that directly contacts both the forward load wheel 14 and the rear load wheel 15. The idler wheel 116 may utilize a tire that can have a pneumatic or a solid core, such as used in any conventional tire. The surface 76 of the idler wheel 116 and/or the core of the idler wheel 116 can be made from the same or different materials. In some embodiments, the surface 76 and/or the core of the idler wheel 116 can be made from a polymer, such as polyurethane. In other embodiments, the surface 76 and/or the core of the idler wheel 116 can be made from a metal, such as aluminum or steel. In some embodiments, the surface 76 of the idler wheel 116 may employ a non-smooth texture.

The idler wheel 116 may have a small idler wheel diameter 114 so as to provide some clearance with an upper wall interior surface of the fork 12. In particular, the idler wheel diameter 114 may be shorter than or equal to the forward wheel radius 102 and/or the rear wheel radius 104.

Moreover, the idler wheel 116 has an idler wheel height 118 above the supporting surface 3 that may be higher than or equal to the forward wheel height 106 or the rear wheel height 108, or the idler wheel height 118 may be shorter than or equal to the forward wheel height 106 or the rear wheel height 108. In some embodiments, the idler wheel height 118 may be within 5% of the forward wheel height 106 or the rear wheel height 108.

The amount of torque transferred by the torque-coupling assembly 78 is highly variable depending on materials used, surface finishes, and contamination from the environment. A suitable range for torque transfer may be from about 1 to 40 Newton meters (Nm) or may be from about 2 to 20 Newton meters (Nm). Generally, the amount of torque transferred by the torque-coupling assembly 78 is greater than or equal to 2 Nm. One will appreciate, however, that the amount torque transferred may be less than 2 Nm. One will also appreciate that the amount torque transferred may be greater than 40 Nm.

This torque-coupling assembly 78 also employs one or more or force-applying coupling assemblies or force-applying couplers 122. A force-applying coupler or force-applying coupling assembly 122 can be implemented in many ways. One will appreciate that a force-applying coupling assembly 122 can be implemented as any force-applying coupling assembly known in the art, as well as any of the force-applying coupling means for coupling force described herein. In many embodiments, such as any of the force-applying coupling assemblies 122 (with or without an additional letter designation), the force-applying coupling assembly 122 may fall into the subcategory of a resilient force-applying coupling assembly (or resilient force-applying coupler).

The force-applying coupler 122 shown in FIGS. 10A and 10B also constitutes a resilient force-applying coupler 122, employing a torsion spring 124. The torsion spring 124 can have a single loop 126 or can have a helical component. The torsion spring 124 may include an idler arm 128 that is directly or indirectly connected to the idler wheel 116 such as to the idler axle 121. The torsion spring 124 may also include a carrier arm 131 that is directly or indirectly connected to the wheel carrier 29, such to its carrier axle 27. In some embodiments, the idler arms 128 may have auxiliary projections 188 that insert into the idler axle 121 of the idler wheel 116 or that function as the axle 121 of the idler wheel 116. In some embodiments, the idler arms 128 may slide through an axle slot 138 in an idler axle 121b of an idler wheel 116b as shown in FIG. 12C. The slot 138 may prevent rotation of the idler axle 121 in embodiments in which the idler wheel 116 constitutes a roller with bearings over the idler axle 121.

In the embodiment shown in FIGS. 10A and 10B, the loop 126 of the torsion spring 124 is positioned around the rear axle 31 and the idler arm 128 crosses carrier arm 131 to provide force (such as tension) to hold the idler wheel 116 against the forward load wheel 14 and the rear load wheel 15. One will appreciate however that the loop 126 of the torsion spring 124 could be positioned about the forward axle 30 instead of the rear axle 31. Or, the loops of two torsion springs 124 could be positioned about both the forward axle 30 and the rear axle 31 to provide additional force (and/or a backup coupling) if desired. If torsion springs 124 are positioned on both sides (left and right) of the load wheels 14 and 15, then the loops 126 of both torsion springs 124 may be positioned about the same axle. In some embodiments, however, the loops 126 may be positioned about different axles. One will also appreciate that the force-applying coupling assembly 122, and more specifically the loops 126 of the torsion springs 124, can alternatively be positioned outside the wheel carrier 29, i.e. between the wheel carrier 29 and the strut 22, on an extension of the forward axle 30 or the rear axle 31. Such an axle extension could include a larger diameter rim to prevent the loop 126 from coming off the axle extension.

One advantage of employing a force-applying coupler 122 is that it can be adapted to apply enough force to couple the torque between the forward load wheel 14 and the rear load wheel 15 (e.g., ensure that there is sufficient friction between the forward load wheel 14 and the rear load wheel 15), and at the same time not create unnecessary drag on the movement of the forward load wheel 14 and the rear load wheel 15. Suitable force provided by the cumulative force-applying couplers 122 acting on the forward load wheel 14 and the rear load wheel 15 may be in the range of about 5 to 315 Newtons, or the force may be in the range of about 5 to 110 Newtons. Generally, the cumulative coupling force may be greater than or equal to about 5 Newtons. One will appreciate that the cumulative coupling force may be less than 5 Newtons. One will also appreciate that the cumulative coupling force may be greater than 315 Newtons. Additionally, one will appreciate that this cumulative force can be divided by the total number of springs in the total number of force-applying couplers 122 that are employed in any given torque-coupling assembly 78 to determine a desirable amount of force per force-applying coupler 122.

Figure 11A:
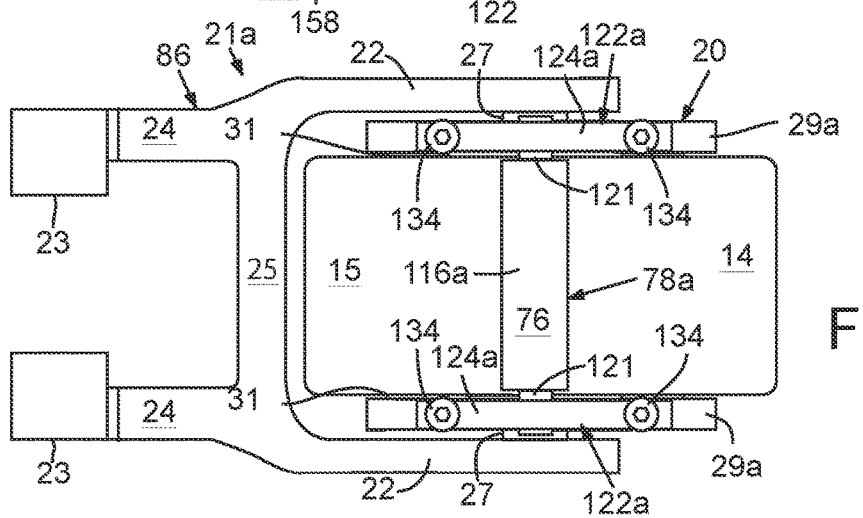
FIG. 11A is a top plan view of a load wheel assembly employing an alternative embodiment of a torque-coupling assembly.
Figure 11C:
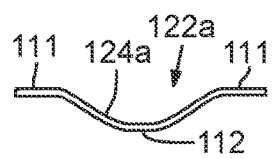
FIG. 11C shows a side elevation view of a leaf spring of FIG. 11B in one example of a relaxed shape when the leaf spring is not yet deployed over an idler axle and connected to a wheel carrier.
Figure 11B:
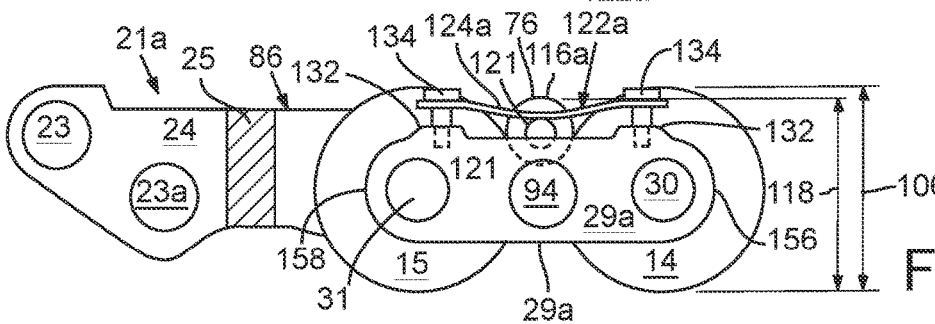
FIG. 11B is a side elevation view of the load wheel assembly of FIG. 11A with a wheel carrier strut and a portion of a wheel carrier bracket removed for clarity.

One will also appreciate that the force coupling (or resilient force coupling) of the idler wheel 116 to the load wheels 17 can be implemented in a variety of other ways. For example, FIG. 11A is a top plan view of a load wheel assembly 21a employing an alternative embodiment of a torque-coupling assembly 78a, and FIG. 11B is a side elevation view of the load wheel assembly 21a of FIG. 10A with one of the wheel-carrier struts 22 and a portion of the wheel-carrier bracket 86 removed for clarity. The alternative torque-coupling assembly 78a may employ an alternative force-applying coupler (or resilient force applying coupler) 122a that includes an alternative to the torsion spring 124 in the form of a spring plate or leaf spring 124a. The leaf spring 124a may include spring end tabs 111 that extend from a central curved portion 112 of the leaf spring 124a. The leaf spring 124a may be connected to optional bosses or ridges 132 of an alternative wheel carrier 29a by any suitable attachment means such as carrier bolts (or screws) 134. The idler wheel 116 may have a smaller idler wheel height 118 adapted to accommodate a downward curve of the leaf spring 124a that can provide force against the idler axle 121 so that the leaf spring 124a urges the idler wheel 116 against the forward load wheel 14 and the rear load wheel 15. FIG. 11C shows a side elevation view of a leaf spring 124a of FIG. 11B in one example of a relaxed shape when the leaf spring 124a is not yet deployed over the idler axle 121 and connected to the wheel carrier 29.

FIG. 12A is a top plan view of a load wheel assembly 21b employing another alternative embodiment of a torque-coupling assembly 78b, FIG. 12B is a side elevation view of the load wheel assembly 21b of FIG. 12A with a wheel carrier strut 22 and a portion of a wheel carrier bracket 86 removed for clarity, and FIG. 12C is a side elevation view of an idler wheel 116b of the torque-coupling assembly 78b. The alternative torque-coupling assembly 78b may employ an alternative force-applying coupler (or resilient force-applying coupler) 122b that includes an alternative spring 124b in the form of an inverted leaf spring or spring plate. The spring 124b may be held by spring brackets 136 that form pockets 137 on an alternative wheel carrier 29b at a position above or near the forward axle 30 and the rear axle 31, or the spring 124b may be connected to the wheel carrier 29b by any suitable attachment means such as carrier bolts (or screws).

The spring 124b may slide through an axle slot 138 in an idler axle 121b of the idler wheel 116b torque-coupling assembly 78b as shown in FIG. 12C, to provide force against the idler axle 121b so that the leaf spring urges the idler wheel 116b against the forward load wheel 14 and the rear load wheel 15. As previously noted, the slot 138 may prevent rotation of the idler axle 121b in embodiments in which the idler wheel 116b constitutes a roller with bearings over the idler axle 121b. Alternatively, the spring 124b may be positioned (not shown) above the idler axle 121b to provide downward force against the idler axle 121b so that the leaf spring urges the idler wheel 116b against the forward load wheel 14 and the rear load wheel 15. The idler wheel 116b may have an idler wheel height 118b adapted to accommodate the curve of the leaf spring (or the curve of the leaf spring may be adapted to idler wheel height 118b) to provide force against the idler axle 121b so that the leaf spring urges the idler wheel 116b against the forward load wheel 14 and the rear load wheel 15. Although not shown, bolts 134, screws, pins, or other fasteners can be employed to secure the spring 124b to the spring brackets 136 from above the spring brackets 136 into holes or slots toward the ends of the springs 124b.

FIG. 13A is a top plan view of a load wheel assembly 21c employing another alternative embodiment of a torque-coupling assembly 78c, and FIG. 13B is a side elevation view of the load wheel assembly 21c of FIG. 13A with a wheel carrier strut 22 and a portion of a wheel carrier bracket 86 removed for clarity. The alternative torque-coupling assembly 78c may employ an alternative force-applying coupler (or resilient force-applying coupler) 122c that includes a spring clip 124c generally in the form of a "U"-shaped clip, having a lower segment 141, a bend 142, and an upper segment 144. The lower segment 141 of the spring clip 124c may be a wire or a strip. The lower segment 141 of the spring clip 124c may be connected to a hole (not shown) on the top 172 of the wheel carrier 29c at a position above or near the forward axle 30 and the rear axle 31 by any suitable attachment means such as one or more carrier bolts 134 (or screws).

The upper segment 144 of the spring clip 124c may constitute a pre-loaded spring that is positioned (as shown in FIG. 13A) above the idler axle 121 to provide downward force against the idler axle 121 so that the spring clip 124c urges the idler wheel 116 against the forward load wheel 14 and the rear load wheel 15. Alternatively, the upper segment 144 may slide through an axle slot (not shown, but such as in FIG. 12C) in an idler axle 121 of the idler wheel 116 of the torque-coupling assembly 78c to provide force against the idler axle 121 so that the spring clip 124c urges the idler wheel 116 against the forward load wheel 14 and the rear load wheel 15. As noted previously, such a slot 138 may prevent rotation of the idler axle 121 in embodiments in which the idler wheel 116 constitutes a roller with bearings over the idler axle 121.

The idler wheel 116 may have an idler wheel height 118c adapted to accommodate the curve and upper segment of the spring clip 124c (or the curve of the spring clip 124c may be adapted to idler wheel height 118c) to provide force against the idler axle 121 so that the spring clip 124c urges the idler wheel 116 against the forward load wheel 14 and the rear load wheel 15. One will appreciate that the bolt 134 may be positioned closer to either the forward axle 30 or the rear axle 31 with the bend 142 positioned closer to the opposite axle. When the spring clips 124c are positioned at both sides of the idler wheel 121, the bends 142 can be facing the same direction or different directions. FIG. 13C shows a side elevation view of the spring clip 124c of FIG. 13B in one example of a relaxed shape when the spring clip 124c is not yet deployed about the ends 156 and 158 of the wheel carrier 29.

Figure 14A:
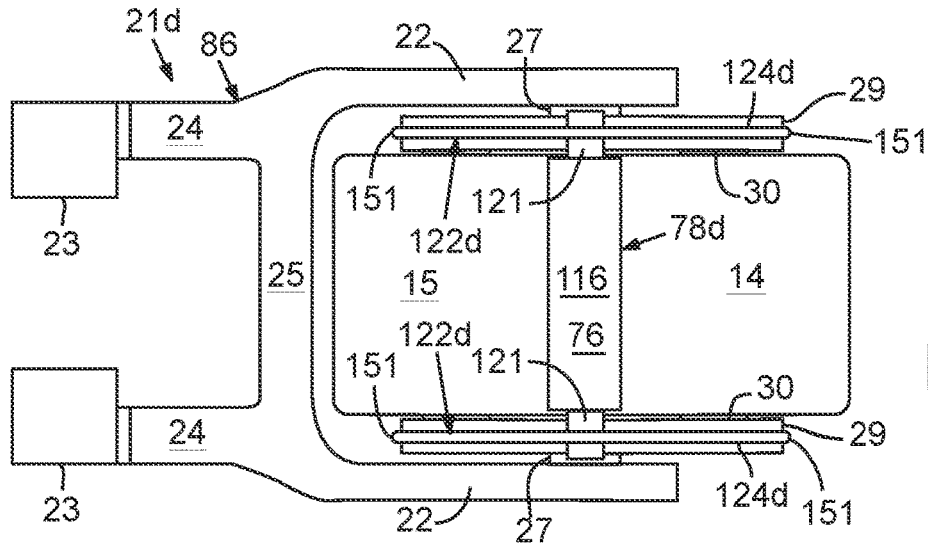
FIG. 14A is a top plan view of a load wheel assembly employing another alternative embodiment of a torque-coupling assembly.
Figure 14B:
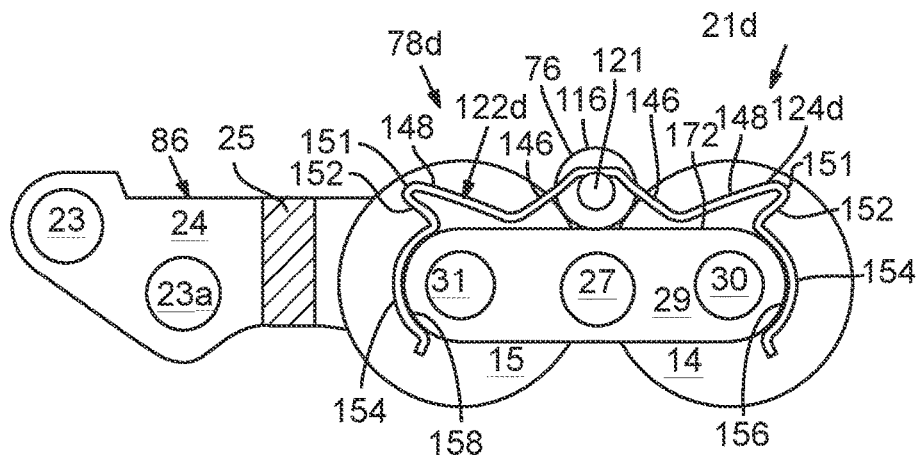
FIG. 14B is a side elevation view of the load wheel assembly of FIG. 14A with a wheel carrier strut and a portion of a wheel carrier bracket removed for clarity.

FIG. 14A is a top plan view of a load wheel assembly 21d employing another alternative embodiment of a torque-coupling assembly 78d, and FIG. 14B is a side elevation view of the load wheel assembly 21d of FIG. 14A with a wheel carrier strut 22 and a portion of a wheel carrier bracket 86 removed for clarity. The alternative torque-coupling assembly 78d may employ an alternative force-applying coupler (or resilient force-applying coupler) 122d that includes a tension clip 124d generally in the form of a "frog"-shaped clip, having a rounded upper back segment 146, two upper thigh segments 148, and a knee bend 151, two lower leg segments 152, and two foot segments 154.

The rounded upper back segment 146 of the tension clip 124d may be positioned (as shown in FIG. 14A) above the idler axle 121 to provide downward tension against the idler axle 121 so that the tension clip 124d urges the idler wheel 116c against the forward load wheel 14 and the rear load wheel 15. Alternatively, the rounded upper back segment 146 may slide through an axle slot (not shown, but such as shown in FIG. 12C) in an idler axle 121 of the idler wheel 116 of the torque-coupling assembly 78d to provide tension against the idler axle 121 so that the tension clip 124d urges the idler wheel 116 against the forward load wheel 14 and the rear load wheel 15. As noted previously, such a slot 138 may prevent rotation of the idler axle 121 in embodiments in which the idler wheel 116 constitutes a roller with bearings over the idler axle 121. The upper back segment may be flat instead of rounded and may have a length that is longer than the diameter of the idler axle 121 to allow some float of the idler wheel 116 in connection with its contact to the forward load wheel 14 and the rear load wheel 15.

Figure 14C:
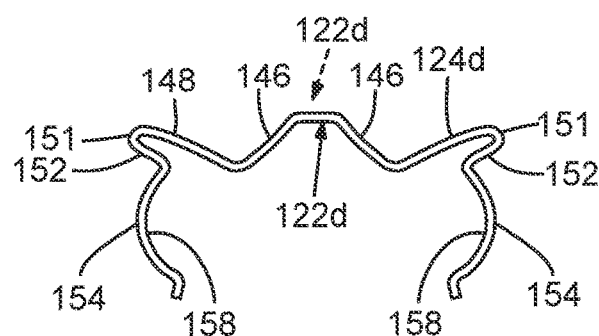
FIG. 14C shows a side elevation view of the torsion clip of FIG. 14B in one example of a relaxed shape when the torsion clip is not yet deployed about the ends of the wheel carrier.

The upper back segment 146 may adjoin an upper thigh segment 148 on each side that each reach an outward knee bend 151 that may be above and near the forward end 156 and the rear end 158 of the wheel carrier 29. From the knee bends 151, lower leg segments 152 project toward the wheel carrier 29 and are attached to foot segments 154 that at least partly wrap around and tensionally engage the ends 156 and 158. The tension clip 124d can be slipped onto the wheel carrier 29 without any additional fastener; however, the foot segments 154 or other parts of the tension clip 124d could be connected to the wheel carrier 29 by bolts or other fasteners. FIG. 14C shows a side elevation view of the tension clip 124d of FIG. 14B in one example of a relaxed shape when the tension clip 124d is not yet deployed about the ends 156 and 158 of the wheel carrier 29.

Figure 15A:
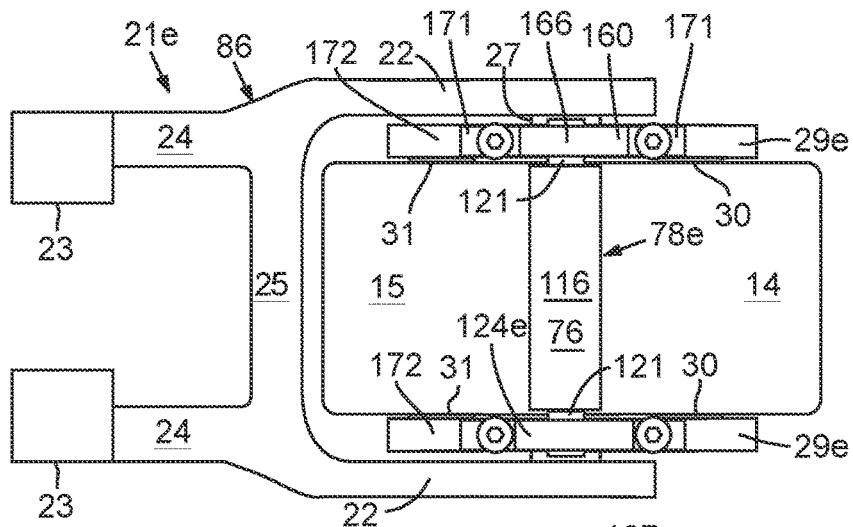
FIG. 15A is a top plan view of a load wheel assembly employing another alternative embodiment of a torque-coupling assembly.
Figure 15B:
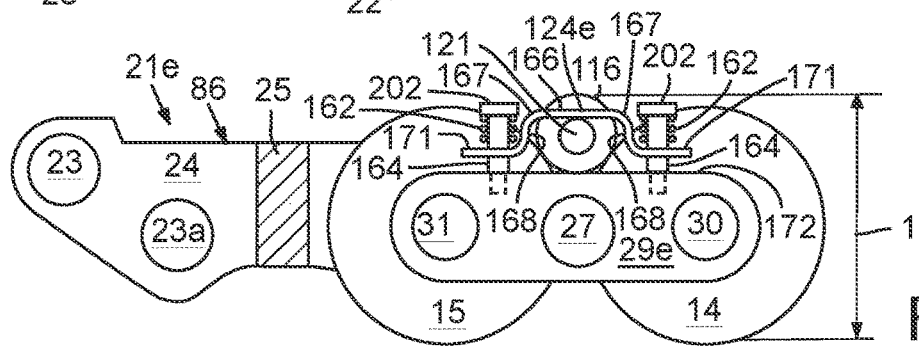
FIG. 15B is a side elevation view of the load wheel assembly of FIG. 15A with a wheel carrier strut and a portion of a wheel carrier bracket removed for clarity.

FIG. 15A is a top plan view of a load wheel assembly 21e employing another alternative embodiment of a torque-coupling assembly 78e, and FIG. 15B is a side elevation view of the load wheel assembly 21e of FIG. 15A with a wheel carrier strut 22 and a portion of a wheel carrier bracket 86 removed for clarity. The alternative torque-coupling assembly 78e may employ an alternative force-applying coupler (or resilient force-applying coupler) 122e that includes a tension plate 161, compression springs 162 and shoulder bolts 164. The tension plate 161 may have a straight upper back segment 166 between two bends 167 for vertical strut segments 168, which may terminate in plate tabs 171 that may be parallel (as shown) or angled (not shown) with respect to the top of an alternative wheel carrier 29e. The shoulder bolts 164 may extend through slots or holes (not shown) in the plate tabs 171 and be connected by a threaded portion (not shown) to threaded holes (not shown) in a surface at the top 172 of the wheel carrier 29e. The compression springs 162 may be positioned around shanks of the shoulder bolts 164 between bolt heads 202 and the plate tabs 171 to press the plate tabs toward the top 172 of the wheel carrier 29e. The pressure of the compression springs 162 against the plate tabs 171 causes the tension plate 161 against the idler axle 121, which causes the idler wheel 116 to press against the forward load wheel 14 and the rear load wheel 15. One or more of the length of the shoulder bolts 164, the strength of the compression springs 162, the diameter 114 of the idler wheel 116, and the diameter of the idler axle 121 can be adjusted to determine the idler wheel height 118e.

In an alternative embodiment, the upper back segment 166 may slide through an axle slot (not shown, but such as shown in FIG. 12C) in an idler axle 121 of the idler wheel 116 of the torque-coupling assembly 78e to provide tension against the idler axle 121 so that the force-applying coupler 122e urges the idler wheel 116 against the forward load wheel 14 and the rear load wheel 15. As noted previously, such a slot 138 may prevent rotation of the idler axle 121 in embodiments in which the idler wheel 116 constitutes a roller with bearings over the idler axle 121.

Figure 16A:
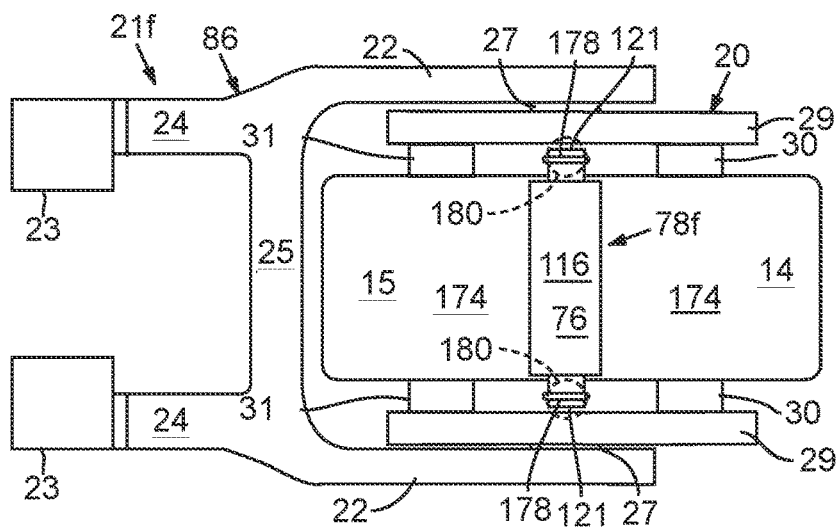
FIG. 16A is a top plan view of a load wheel assembly employing another alternative embodiment of a torque-coupling assembly.
Figure 16B:
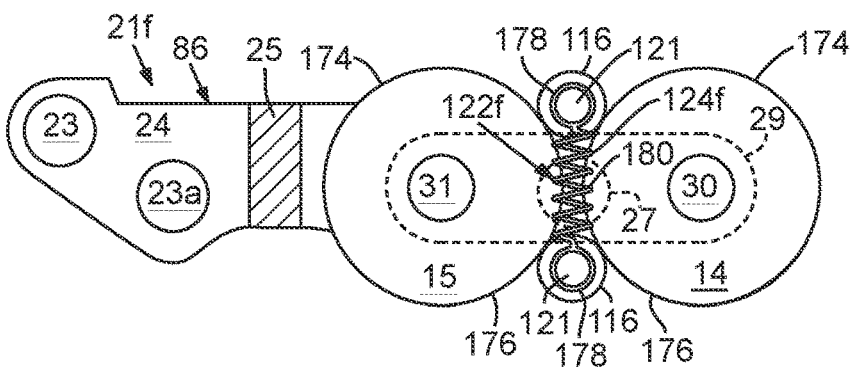
FIG. 16B is a side elevation view of the load wheel assembly of FIG. 16A with a wheel carrier strut and a portion of a wheel carrier bracket removed for clarity.

FIG. 16A is a top plan view of a load wheel assembly 21f employing another alternative embodiment of a torque-coupling assembly 78f, and FIG. 16B is a side elevation view of the load wheel assembly 21f of FIG. 16A with a wheel carrier strut 22 and a portion of a wheel carrier bracket 86 removed for clarity. The alternative torque-coupling assembly 78f employs both top and bottom idler wheels 116 that may be identical or different. Differences might include one or more of idler wheel diameter 114, idler axle diameter, and idler wheel surface textures, and idler wheel compositions, etc. One will appreciate that the torque-coupling assembly 78f is adapted so that the bottom of the bottom idler wheel 116 is at or above the bottom of the forward load wheel 14 and the rear load wheel 15. In many embodiments, the idler wheel diameter 114 and/or the spacing between the forward load wheel 14 and the rear load wheel 15 can be adjusted to determine the height of the bottom of the bottom idler wheel 116 from the supporting surface 3. The spacing might be partly controlled by the strength of an alternative force-applying coupler (or resilient force-applying coupler) 122f.

The alternative force-applying coupler 122f of the alternative torque-coupling assembly 78f may employ a tension spring 124f that tensions both the top and bottom idler wheels 116 against the upper surfaces 174 and lower surfaces 176 of the load wheels 14 and 15. The tension spring 124f may include axle loops 178 that partly or completely circle the idler axles 121 of the top and bottom idler wheels 116. The tension spring 124f also includes a spring section 181 that connects the axle loops 178 to tension the idler axles 121 of the top and bottom idler wheels 116 toward each other. This tension urges the top and bottom idler wheels 116 to contact the respective upper surfaces 174 and lower surfaces 176 of the load wheels 14 and 15 and couple the torque of the forward load wheel 14 and the rear load wheel 15. One or more of the strength of the spring section 181, the diameter 114 of the idler wheel 116, and the diameter of the idler axle 121 can be adjusted to determine the relative elevation of the idler wheel surfaces with respect to the surfaces of the forward load wheel 14 and the rear load wheel 15.

FIG. 17A is a top plan view of a load wheel assembly 21g employing another alternative embodiment of a torque-coupling assembly 78g, and FIG. 17B is a side elevation view of the load wheel assembly 21g of FIG. 17A with a wheel carrier strut 22 and a portion of a wheel carrier bracket 86 removed for clarity. The alternative torque-coupling assembly 78g may employs a pair of top and bottom idler wheels assemblies 121 that may be identical or different. Differences might include one or more of idler wheel width, idler wheel diameter 114, idler axle diameter, and idler wheel surface textures, etc.

Each idler wheel assembly 182 includes multiple idler wheels 116a, such as two idler wheels 116a, connected by a central axle block 184. A top idler wheel assembly $182_1$ of the alternative torque-coupling assembly 78g might include idler wheels $116a_1$ and $116a_2$ having respective idler axles $121a_1$ and $121a_2$ that are connected by a central axle block $184_1$, and a bottom idler wheel assembly $182_2$ of the alternative torque-coupling assembly 78g might include a first bottom idler wheel (not shown) and a second bottom idler wheel $116b_2$ having a respective first bottom idler axle (not shown) and a second bottom axle $121a_2$ that are connected by a central axle block $184_2$.

An alternative force-applying coupler (or resilient force-applying coupler) 122g of the alternative torque-coupling assembly 78g may employ a tension bolt 186 with top and bottom compressions springs $162_1$ and $162_2$ (collectively compression springs 162). The tension bolt 186 extends between the forward load wheel 14 and the rear load wheel 15 and through the central axle blocks $184_1$ and $184_2$. The compression springs 162 may be positioned around the shank of the tension bolt 186 between bolt heads $202_1$ and $202_2$ and the respective proximal surfaces of the central axle blocks $184_1$ and $184_2$ to press them toward each other.

The pressure of the compression springs 162 against the central axle blocks $184_1$ urges the idler axles $121a_2$ and $121b_2$ toward each other (and idler axle $121a_1$ toward the other bottom idler axle (not shown)), which causes the idler wheel $116a_2$ (and idler wheel $116a_1$) to press against the upper surfaces 174 of the forward load wheel 14 and the rear load wheel 15 and causes the idler wheel $116b_2$ (and the other lower idler wheel (not shown)) to press against the lower surfaces 176 of the forward load wheel 14 and the rear load wheel 15, thereby coupling the torque of the forward load wheel 14 and the rear load wheel 15. One or more of the strength of the compression springs 162, the diameter 114 of the idler wheels 116, and the diameter of the idler axles 121 can be adjusted to determine the relative elevation of the top and bottom idler wheel surfaces with respect to the respective top and bottom surfaces of the forward load wheel 14 and the rear load wheel 15. One will appreciate that the torque-coupling assembly 78g can be adapted so that the bottom of the bottom idler wheel $116a_2$ is at or above the bottom of the forward load wheel 14 and the rear load wheel 15.

Figure 18A:
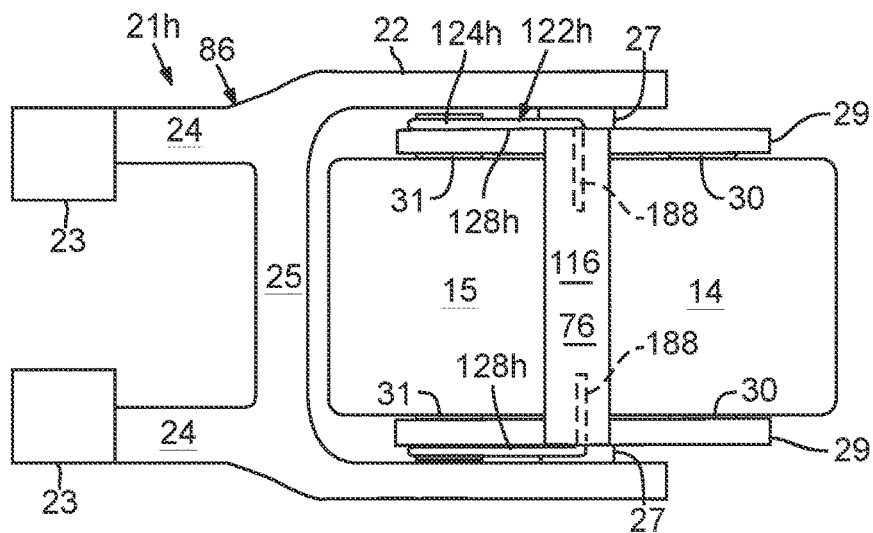
FIG. 18A is a top plan view of a load wheel assembly employing another alternative embodiment of a torque-coupling assembly with a force-applying coupling assembly positioned outside the wheel carrier.
Figure 18B:
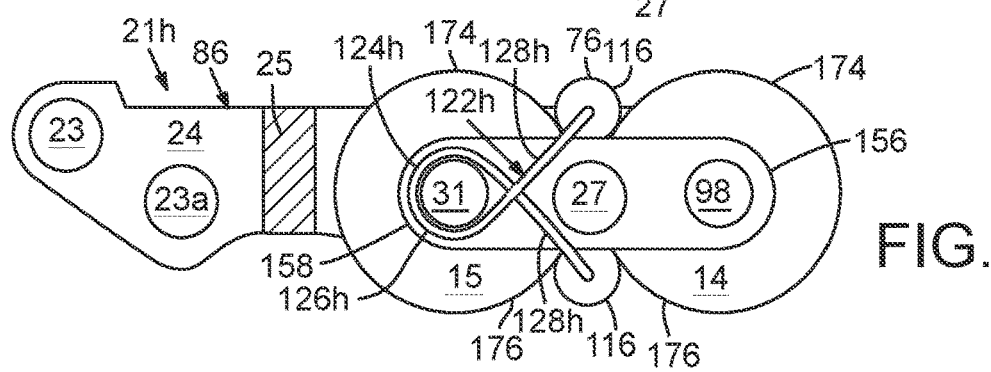
FIG. 18B is a side elevation view of the load wheel assembly of FIG. 18A with a wheel carrier strut and a portion of a wheel carrier bracket removed for clarity.
Figure 18C:
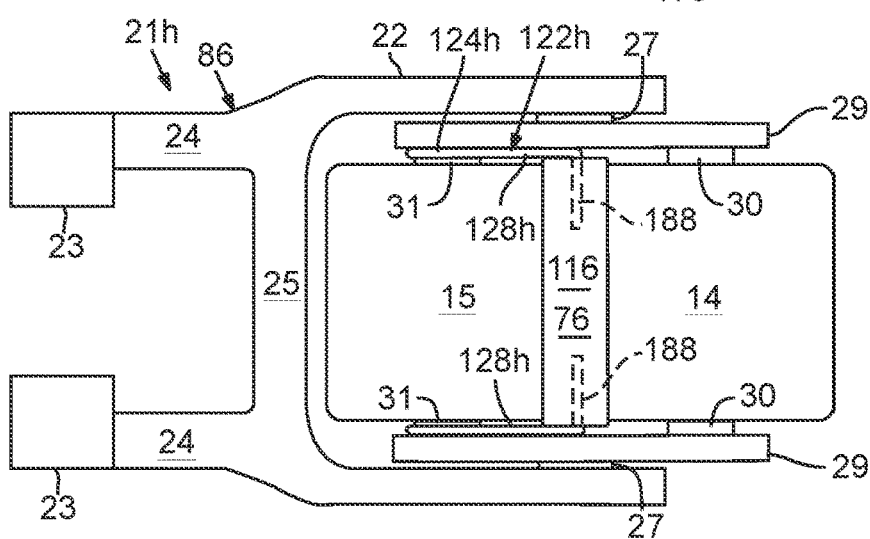
FIG. 18C is a top plan view of a load wheel assembly employing another alternative embodiment of a torque-coupling assembly with a force-applying coupling assembly positioned inside the wheel carrier.
Figure 18D:
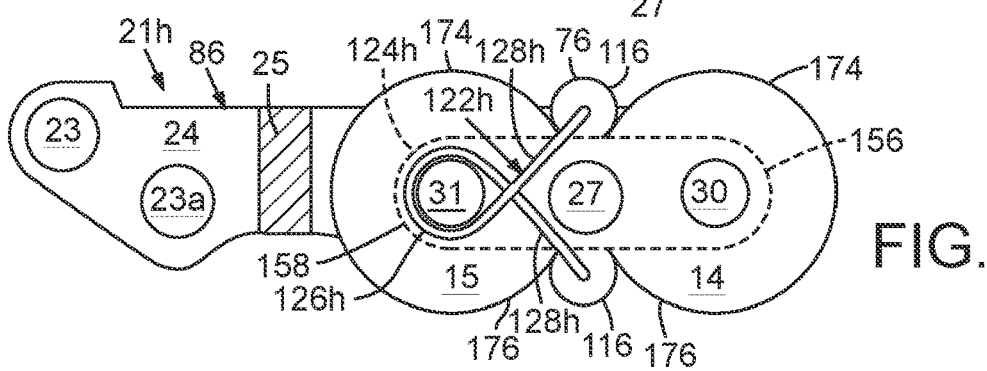
FIG. 18D is a side elevation view of the load wheel assembly of FIG. 18C with a wheel carrier strut and a portion of a wheel carrier bracket removed for clarity.

FIG. 18A is a top plan view of a load wheel assembly 78h employing another alternative embodiment of a torque-coupling assembly 78h with alternative force-applying coupler (or resilient force-applying coupler) 122h positioned outside the wheel carrier 29, and FIG. 18B is a side elevation view of the load wheel assembly 78h of FIG. 18A with a wheel carrier strut 22 and a portion of a wheel carrier bracket 86 removed for clarity. FIG. 18C is a top plan view of a load wheel assembly 78 employing alternative embodiment of a torque-coupling assembly 78*h* with a force-applying coupler positioned inside the wheel carrier 29, and FIG. 18D is a side elevation view of the load wheel assembly 78*h* of FIG. 18C with a wheel carrier strut 22 and a portion of a wheel carrier bracket 86 removed for clarity. The alternative torque-coupling assembly 78*h* employs top and bottom idler wheels 116 that may be identical or different. Differences might include one or more of idler wheel diameter 114, idler axle diameter, and idler wheel surface textures, etc.

The alternative force-applying coupler 122*h* may employ a torsion spring 124*h* that forces both the top and bottom idler wheels 116 against the upper surfaces 174 and lower surfaces 176 of the load wheels 14 and 15. The torsion spring 124*h* may include one or more axle loops 126*h* (a single loop or a helical component) that circle the one of the forward axle 30 of the forward load wheel 14 or the rear axle 31 of the rear load wheel 15.

In the embodiment shown in FIGS. 18A and 18B, the load wheel axle 30 or 31 or an extension of it, about which the torsion spring 124*h* is deployed, may extend out further beyond the wheel carrier 29 to provide greater support for the loop 126*h* of the torsion spring 124*h*. Such elongated load wheel axle 30 or 31 may extend to, or almost to, the wheel carrier 29 to prevent the torsion spring 124*h* from sliding off the load wheel axle 30 or 31. In the embodiment shown in FIGS. 18C and 18D, the torsion spring 124*h* is positioned between the wheel carrier 29 and the load wheel 15 (or 14) so the loop 126*h* of the torsion spring 124*h* cannot slide off of the load wheel axle 31 (or 30).

The torsion spring 124*h* may include two idler arms 128*h* that cross each other and are directly or indirectly connected to the separate idler wheels 116, such as to axles (not shown) of the idler wheels 116. Alternatively, the idler arms 128*h* may have auxiliary projections 188 that insert into the axles of the idler wheels 116 or that function as the axles of the idler wheels 116. In an alternative embodiment, the idler arms 128*h* may slide through an axle slot (not shown, but such as shown in FIG. 12C) in an idler axle (not shown, but such as shown in FIG. 12C) of the idler wheel 116 of the torque-coupling assembly 78*h* to provide force against the idler axle so that the force-applying coupler 122*h* urges the idler wheel 116 against the forward load wheel 14 and the rear load wheel 15. As noted previously, such a slot 138 may prevent rotation of the idler axle 121 in embodiments in which the idler wheel 116 constitutes a roller with bearings over the idler axle 121.

Typically, the torque-coupling assembly 78*h* employs a torsion spring 124*h* on each side of the wheel carrier 29. The torsion springs 124*h* can be employed around opposite sides of the same load wheel axle, or a first torsion spring 124*h* can be employed around the rear axle 31 one side of the wheel carrier 29 while a second torsion spring 124*h* can be employed around the forward axle 30 on the other side of the wheel carrier 29. One will appreciate that torsion springs 124*h* can be deployed around both the forward and rear axles 30 and 31 on both sides of the wheel carrier 29.

The torsion springs 124*h* urge the top and bottom idler wheels 116 toward each other so that they contact the respective the upper surfaces 174 and lower surfaces 176 of the load wheels 14 and 15 and couple the torque of the forward load wheel 14 and the rear load wheel 15. The strength of the torsion spring 124*h* and/or the diameter 114 of the idler wheel 116 can be adjusted to determine the relative elevation of the idler wheel surfaces with respect to the surfaces of the forward load wheel 14 and the rear load wheel 15. One will appreciate that the torque-coupling assembly 78*h* can be adapted so that the bottom of the bottom idler wheel 116 is at or above the bottom of the forward load wheel 14 and the rear load wheel 15.

Figure 19A:
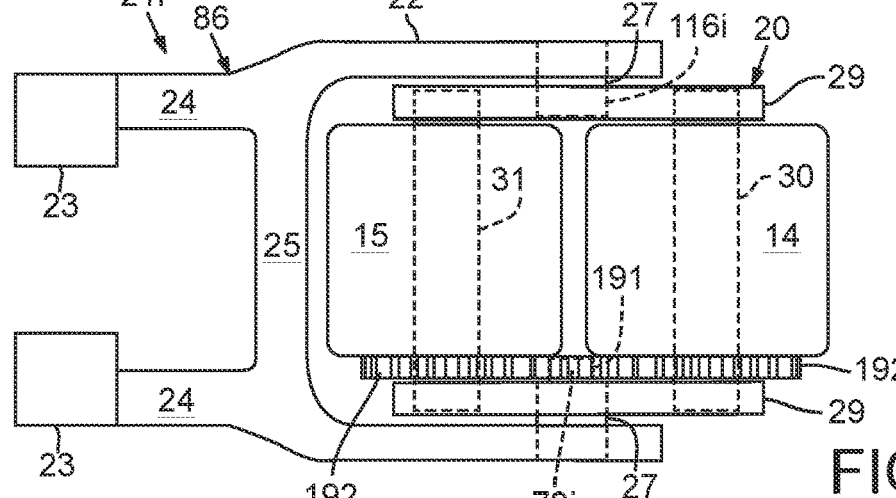
FIG. 19A is a top plan view of a load wheel assembly employing another alternative embodiment of a torque-coupling assembly.
Figure 19B:
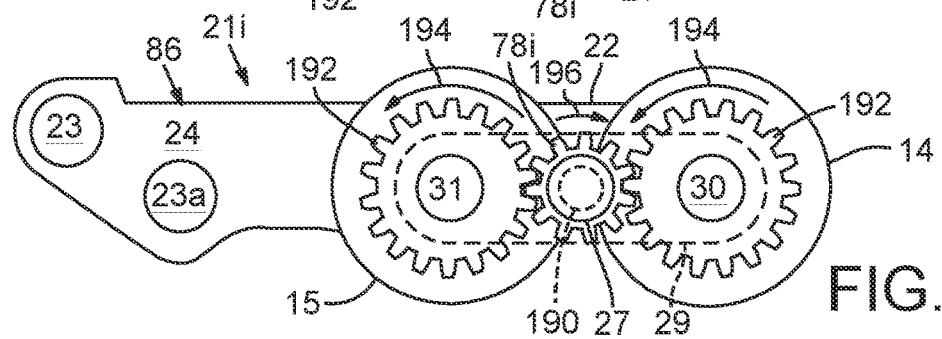
FIG. 19B is a side elevation view of the load wheel assembly of FIG. 19A with a wheel carrier strut and a portion of a wheel carrier bracket removed for clarity.

FIG. 19A is a top plan view of a load wheel assembly 78*i* employing another alternative embodiment of a torque-coupling assembly 78*i*, and FIG. 19B is a side elevation view of the load wheel assembly 78*i* of FIG. 19A with a wheel carrier strut 22 and a portion of a wheel carrier bracket 86 removed for clarity. The alternative torque-coupling assembly 78*i* employs an idler gear wheel 116*i* connected through bearings 191 to the wheel carrier 29. Alternatively, the torque-coupling assembly 78*i* employs idler gear wheels 116*i* connected through bearings 191 on opposite sides of the wheel carrier 29 and that may be identical or different. Differences might include the idler wheel gear diameter. Each idler gear wheel 116*i* interacts with one or more gears 192 that are fixed to the forward load wheel 14 and the rear load wheel 15 to transfer torque between them. Load wheel motion arrows 194 show the direction of rotation of the load wheels (and idler wheel motion arrow 196 shows the direction of motion of the idler gear wheel 116*i*) when the wheel carrier 29 moves backward. These arrows would be reversed when the wheel carrier 29 moves in the forward direction.

Figure 20A:
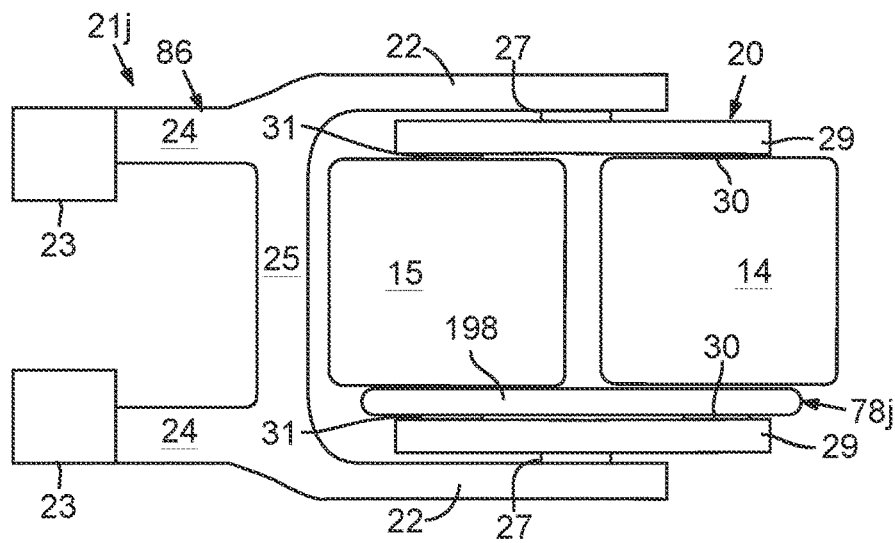
FIG. 20A is a top plan view of a load wheel assembly employing another alternative embodiment of a torque-coupling assembly.
Figure 20B:
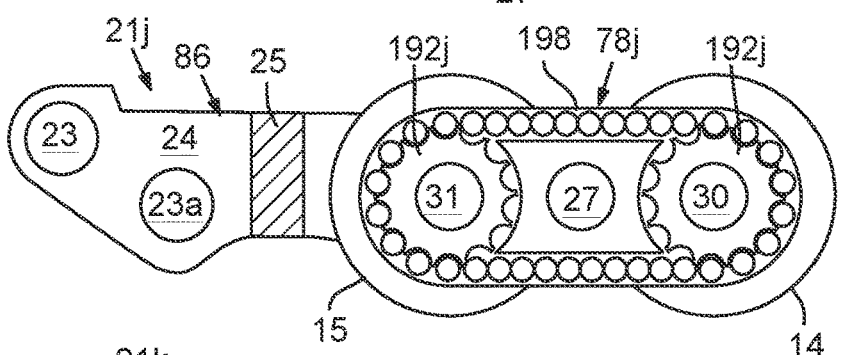
FIG. 20B is a side elevation view of the load wheel assembly of FIG. 20A with a wheel carrier strut and a portion of a wheel carrier bracket removed for clarity.

FIG. 20A is a top plan view of a load wheel assembly 78*j* employing another alternative embodiment of a torque-coupling assembly 78*j*, and FIG. 20B is a side elevation view of the load wheel assembly 78*j* of FIG. 20A with a wheel carrier strut 22 and a portion of a wheel carrier bracket 86 removed for clarity. The alternative torque-coupling assembly 78*j* employs a "raceway" 198 connected to the wheel carrier 29. Alternatively, the torque-coupling assembly 78*j* employs raceways 198, which may be identical or different, connected on opposite sides of the wheel carrier 29. Each raceway 198 interacts with one or more gears 192*j* that may be fixed to the forward load wheel 14 and the rear load wheel 15 to transfer torque between them.

This embodiment is based on the recirculating ball concept (also known as worm and sector or recirculating ball and nut), such as commonly used in steering systems and ball screws. However, in this embodiment, no screw is involved. The ball bearings are simply used to form the torque transfer device using a formed gear to push the balls along a raceway to the driven gear. The pushing force provides the torque transfer.

Figure 21A:
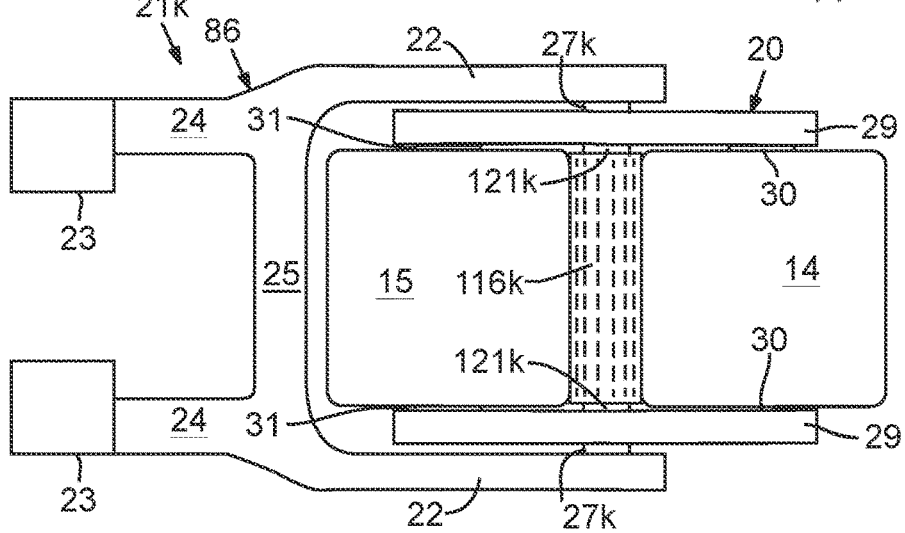
FIG. 21A is a top plan view of a load wheel assembly employing another alternative embodiment of a torque-coupling assembly.
Figure 21B:
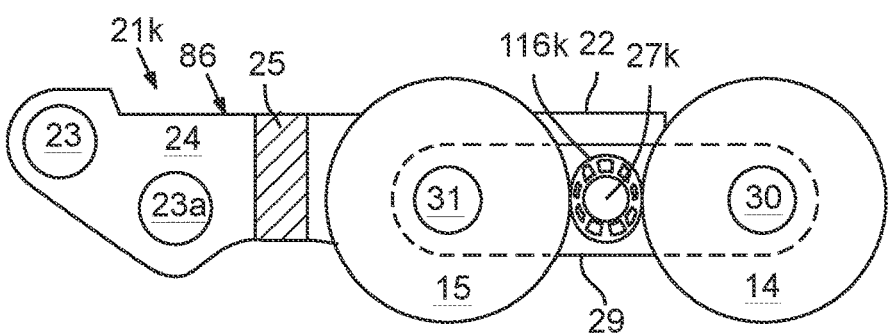
FIG. 21B is a side elevation view of the load wheel assembly of FIG. 21A with a wheel carrier strut and a portion of a wheel carrier bracket removed for clarity.

FIG. 21A is a top plan view of a load wheel assembly 78*k* employing another alternative embodiment of a torque-coupling assembly 78*k*, and FIG. 21B is a side elevation view of the load wheel assembly 78*k* of FIG. 21A with a wheel carrier strut 22 and a portion of a wheel carrier bracket 86 removed for clarity. The alternative torque-coupling assembly 78*k* employs an idler wheel 116*k* that has an idler wheel axle 121*k* that is aligned with the carrier axle 27*k*. Moreover, the carrier axle 27*k* and the idler wheel axle 121*k* may be a single component. One or both of the forward load wheel 14 and the rear load wheel 15 can be a smaller size than in the other embodiments, or the forward load wheel 14 and the rear load wheel 15 can be spaced further apart than in other embodiments to accommodate the diameter 114 of the idler wheel 116*k*. The diameter 114 of the idler wheel 116*k* and the material of the idler wheel 116*k* can be adapted to couple torque between the forward load wheel 14 and the rear load wheel 15. For example, the material of the idler wheel 116*k* may comprise an elastic material such as neoprene, polyurethane or Santoprene™ and may include longitudinal apertures 117*k* that facilitate the idler wheel 116*k* compressing when contacted by the surfaces of the load wheels 17. The stiffness of the material for the idler wheel 116*k* and the size and shape of the apertures 117*k* may be designed to increase or decrease the amount of pressure exerted by the idler wheel 116*k* on the forward load wheel 14 and the rear load wheel 15.

Figure 22A:
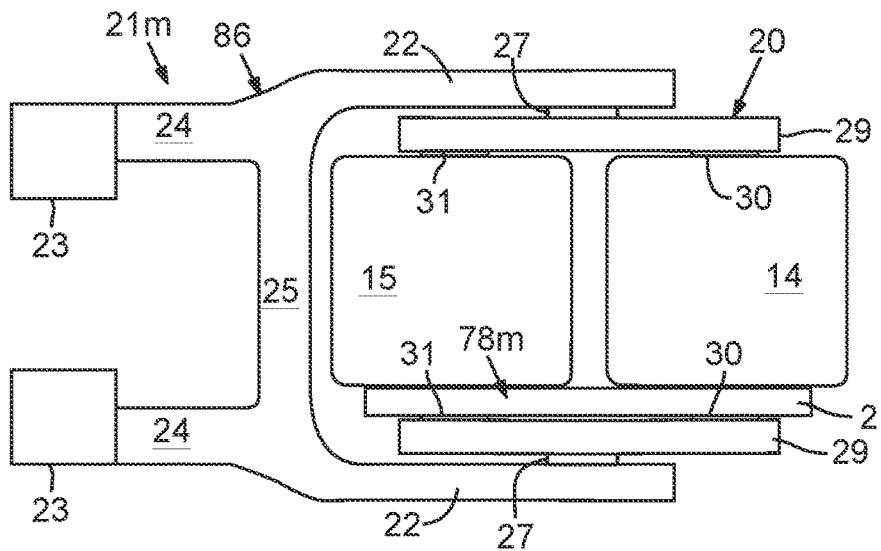
FIG. 22A is a top plan view of a load wheel assembly employing another alternative embodiment of a torque-coupling assembly.
Figure 22B:
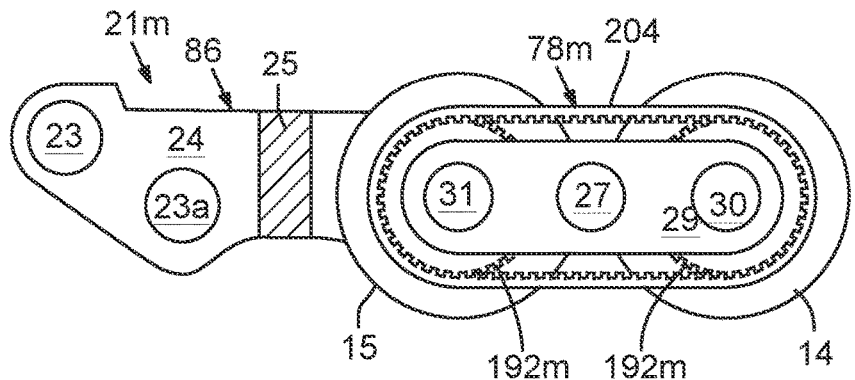
FIG. 22B is a side elevation view of the load wheel assembly of FIG. 22A with a wheel carrier strut and a portion of a wheel carrier bracket removed for clarity.

FIG. 22A is a top plan view of a load wheel assembly 78*m* employing another alternative embodiment of a torque-coupling assembly 78*m*, and FIG. 22B is a side elevation view of the load wheel assembly 78*m* of FIG. 22A with a wheel carrier strut 22 and a portion of a wheel carrier bracket 86 removed for clarity. The alternative torque-coupling assembly 78*m* employs one or more toothed belts 204 that may be on only one side of the wheel carrier 29 or on opposite sides of the wheel carrier 29. Each toothed belt 204 interacts with one or more gears or pulleys 192*m* that may be fixed to the forward load wheel 14 and the rear load wheel 15 to transfer torque between them.

Figure 22C:
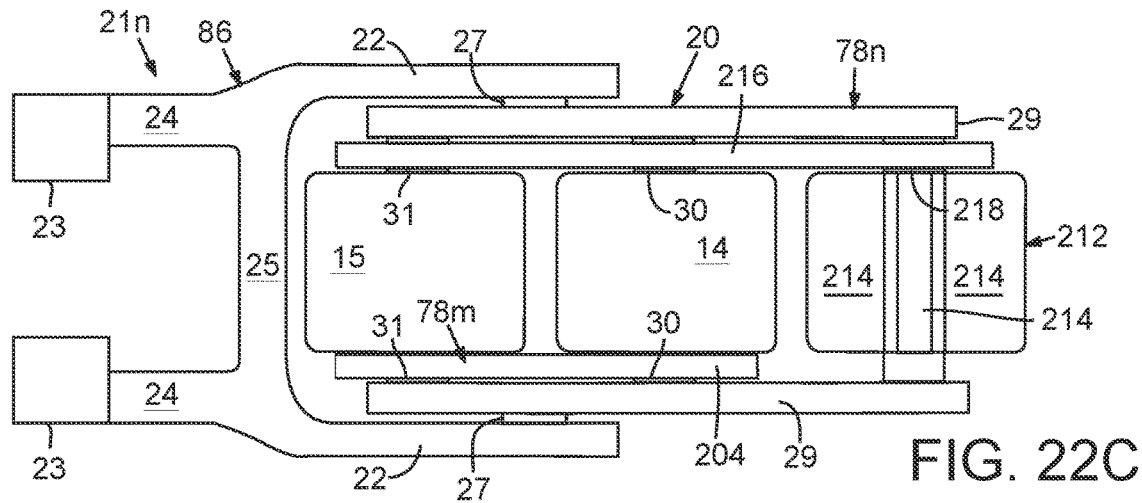
FIG. 22C is a top plan view of a load wheel assembly similar to that shown in FIG. 22A with an added lead-in roller in the form of a paddle wheel.
Figure 22D:
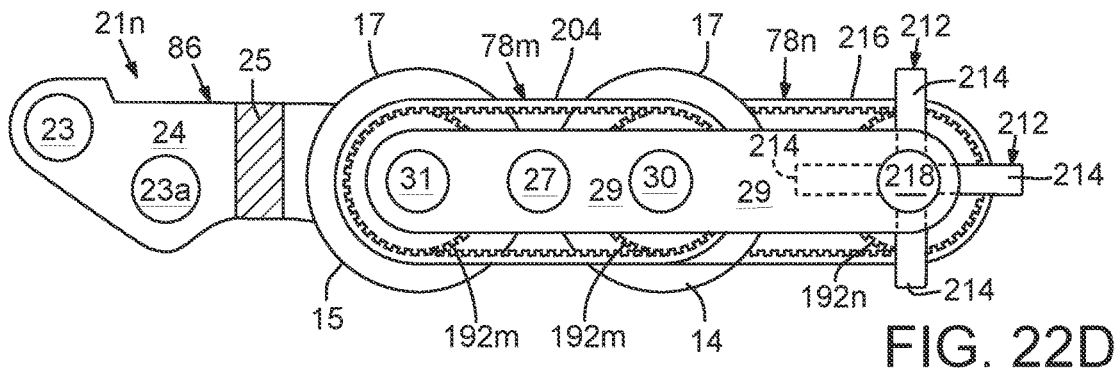
FIG. 22D is a first side elevation view of the load wheel assembly of FIG. 22D with a wheel carrier strut and a portion of a wheel carrier bracket removed for clarity.
Figure 22E:
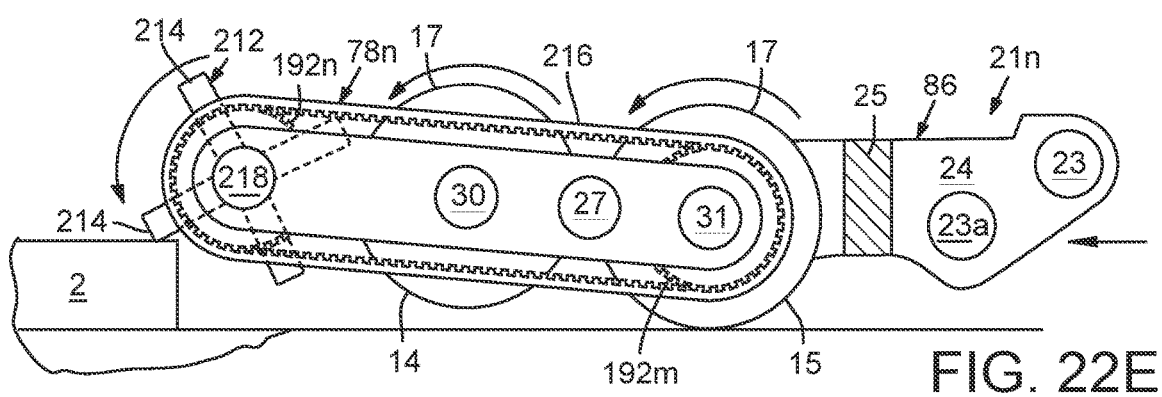
FIG. 22E is a second side elevation view of the load wheel assembly of FIG. 22D with a wheel carrier strut and a portion of a wheel carrier bracket removed for clarity.

FIG. 22C is a top plan view of a load wheel assembly 78*n* that is similar to that shown in FIG. 22A but additionally comprising a lead-in roller 212 in the form of a paddle wheel having multiple paddles 214. FIG. 22D is a first side elevation view of the load wheel assembly 78 with a wheel carrier strut 22 and a portion of a wheel carrier bracket 86 removed for clarity, and FIG. 22E is a second side elevation view of the load wheel assembly 78*n* with a wheel carrier strut 22 and a portion of a wheel carrier bracket 86 removed for clarity. FIGS. 22D and 22E are views from opposite sides of the load wheel assembly 78*n*.

The lead-in roller 212 is shown in the form of a paddle wheel having paddles 214; however, any type of wheel can be employed. By way of illustration and not limitation, the lead-in roller 212 may have, instead of paddles 214, other features on its surface, such ridges, bumps, or other surface texture to enable it to grip and climb over an obstacle, such as a base board 2, on the floor, rather than push it horizontally. As another example, the lead-in roller 212 may have a tacky outer surface, such as a rubber tire; alternatively, the entire lead-in roller may be made from a solid tacky material, such as rubber, a rubber-based compound, or a rubber-like material. The effective diameter of the lead-in roller 212 may be different from that of the load wheels 17. For example, the effective diameter of the lead-in roller 212 may be less than or equal to that of the load wheels 17, as the lead-in roller is preferably not load bearing like the load wheels 17; instead, the lead-in roller 212 is preferably meant to climb over an obstacle, such as a base board 2, on the floor but otherwise not contact a flat floor. To that end, the lead-in roller may have the same or different (larger or smaller) diameter as the load wheels 17 but positioned upward in a horizontally biased position relative to the load wheels 17. That may be accomplished, for example, by having bent wheel carriers 29 (e.g., right end up in FIG. 22D, left end up in FIG. 22E), instead of the straight ones illustrated in FIGS. 22D and 22E.

The lead-in roller 212 may be coupled to the torque of one or more of the load wheels 17 through a torque-coupling assembly 78*n*, which may employ, for example, a toothed belt 216 that interacts with a gear 192*n* connected to an axle 218 of the lead-in roller 212, as shown in FIGS. 22C-22E. One will appreciate that the torque-coupling assembly 78 may be employed to couple the lead-in roller 212 with only the rear load wheel 15, with only the forward load wheel 14, or with both of the rear load wheel 15 and the forward load wheel 14. One will further appreciate that the torque-coupling assembly 78*n* may be employed on only one side of the load wheel unit, as shown, or with both sides of the load wheel unit 78.

One will also appreciate that torque coupling between the lead-in roller 212 and one or both of the load wheels 17 can be implemented in any manner, such as by any of the force applying couplers 122*a*-122*h*. Other examples of mechanism to couple torque to the lead-in roller 212 include, for example, chain(s) and gears or untoothed belt(s). Similarly, the lead-in roller 212 may be utilized in conjunction with any other type of load wheel assembly, such as any of the load wheel assemblies 78-78*k*, or with load wheel assemblies that do not couple torque between their load wheels. Alternatively, the lead-in roller 212 may not be coupled to either of the load wheels 17.

Load wheels with torque-coupling assemblies may be used in conventional, non-modular, load wheel arrangements or other suitable environments as well.

While some of the examples have been illustrated or described with respect to providing functionality for a "walkie" or "rider" style pallet truck, some or all of the features may also be enabled for operation with other types of industrial vehicles including, but not limited to, reach trucks, three-wheel stand trucks, warehouse trucks, and counterbalanced trucks.

CONCLUSION

The terms and descriptions used above are set forth by way of illustration and example only and are not meant as limitations. Those skilled in the art will recognize that many variations, enhancements and modifications of the concepts described herein are possible without departing from the underlying principles of the invention. For example, skilled persons will appreciate that the subject matter of any sentence or paragraph can be combined with subject matter of some or all of the other sentences or paragraphs, except where such combinations are mutually exclusive. The scope of the invention should therefore be determined only by the following claims, claims presented in a continuation patent application, and equivalents to the foregoing claims.

The invention claimed is:

1. A fork assembly for a forked material-handling vehicle configured for lifting a pallet having one or more upper planks, the fork assembly comprising:
   a discrete elongate body having an elongate body upper surface;
   a discrete load wheel module having a load wheel frame and a load wheel module upper surface and one or more load wheels, wherein the load wheel module is configured for moving the one or more load wheels between an undeployed position and a deployed position, wherein the one or more load wheels in the undeployed position are at least partly surrounded by the load wheel frame, wherein the load wheel module is configured for fitting beneath the one or more upper planks of a pallet when the one or more load wheels are in the undeployed position, and wherein a majority of a wheel height of the one or more load wheels extends beyond the load wheel frame in the deployed position;
   a proximal interlocking mechanism detachably connecting the elongate body to the load wheel module;
   a discrete fork tip configured for fitting beneath the one or more upper planks of a pallet; and
   a distal interlocking mechanism detachably connecting the load wheel module to the fork tip, wherein the load wheel module is positioned between the elongate body and the fork tip, and wherein the elongate body upper surface and the load wheel module upper surface are substantially coplanar.

2. The fork assembly of claim 1, wherein the load wheel module is configured to house the majority of the wheel height of one or more load wheels within the load wheel frame when the one or more load wheels are in the undeployed position.

3. The fork assembly of claim 1, wherein the load wheel module is configured to extend the wheel height of the one or more load wheels beyond the load wheel frame when the one or more load wheels are in the deployed position.

4. The fork assembly of claim 1, wherein the pallet comprises a base board spaced apart from the one or more upper planks, and wherein the fork tip is configured to fit between the base board and the one or more upper planks of the pallet.

5. The fork assembly of claim 1, wherein the pallet comprises a base board spaced apart from the one or more upper planks, and wherein the load wheel module is configured to fit between the base board and the one or more upper planks of the pallet when the one or more load wheels in the undeployed position.

6. The fork assembly of claim 1, wherein at least one of the proximal interlocking mechanism and the distal interlocking mechanism employs mated shear-resistant features, including first and second sheer-resistant features.

7. The fork assembly of claim 6, wherein the sheer-resistant features are configured to receive a fastener.

8. The fork assembly of claim 1, wherein at least one of the proximal interlocking mechanism and the distal interlocking mechanism employs a mated internally threaded receptacle and an externally threaded fastener.

9. The fork assembly of claim 1, wherein the proximal interlocking mechanism employs a proximal internally threaded receptacle that is mated to a proximal externally threaded fastener, wherein one of the proximal internally threaded receptacle and the proximal externally threaded fastener is configured to connect to the elongate body, and wherein a different one of the proximal internally threaded receptacle and the proximal externally threaded fastener is configured to connect to the load wheel module.

10. The fork assembly of claim 1, wherein the proximal interlocking mechanism includes a proximal protruding feature that is mated to a proximal receiving feature, wherein one of the proximal protruding feature and the proximal receiving feature is connected to the elongate body, wherein a different one of the proximal protruding feature and the proximal receiving feature is connected to the load wheel module.

11. The fork assembly of claim 10, wherein both of the proximal protruding feature and the proximal receiving feature are configured to receive a proximal externally threaded fastener.

12. The fork assembly of claim 1, wherein the proximal interlocking mechanism includes a proximal endcap that is attached to the elongate body and includes a proximal sheer-resistant body feature that is mated to a proximal sheer-resistant module feature of the load wheel module.

13. The fork assembly of claim 12, wherein the proximal endcap is welded to the elongate body.

14. The fork assembly of claim 12, wherein the distal interlocking mechanism includes a distal endcap that is attached to the fork tip and includes a distal sheer-resistant attachment feature that is mated to a distal sheer-resistant module feature of the load wheel module, wherein the proximal and distal interlocking mechanisms are operatively identical.

15. The fork assembly of claim 12, wherein the distal interlocking mechanism includes a distal endcap that is attached to the fork tip and includes a distal sheer-resistant attachment feature that is mated to a distal sheer-resistant module feature of the load wheel module.

16. The fork assembly of claim 15, wherein the distal sheer-resistant attachment feature and the distal sheer-resistant module feature are adapted to receive a fastener.

17. The fork assembly of claim 1, wherein the elongate body has a first characterizing color, wherein the load wheel module has a second characterizing color, wherein the fork tip has a third characterizing color, and wherein the first, second, and third characterizing colors are different.

18. The fork assembly of claim 1, wherein the one or more load wheels comprise a forward load wheel and a non-motorized rear load wheel contained by a load wheel assembly, and wherein a non-motorized torque-coupling assembly is connected between the forward load wheel and the rear load wheel.

19. The fork assembly of claim 1, wherein the fork tip includes a proximal connection end for attachment closest to the load wheel module, wherein the proximal connection end has proximal end dimensions, wherein the fork tip includes a distal end having distal end dimensions, and wherein at least one of the tip distal end dimensions is smaller than a respective one of the proximal end dimensions.

20. The fork assembly of claim 1, wherein the load wheel module further comprises a hydraulic actuator contained within the load wheel frame and operatively connected to deploy the one or more load wheels hydraulically.

21. The fork assembly of claim 1, wherein the forked material-handling vehicle comprises a pallet truck.

22. The fork assembly of claim 1, wherein the load wheel module employs a pivotal connection between the load wheel frame and the one or more load wheels.

23. A pallet truck including a fork assembly configured for lifting a pallet having one or more upper planks, the pallet truck comprising:
 a steer wheel;
 a chassis operatively connected to the steer wheel; and
 two substantially parallel first and second fork assemblies operatively connected to and extending from the chassis and configured to hold a load for conveyance by the pallet truck as the pallet truck moves;
 wherein the first fork assembly comprises:
  a first discrete elongate body having a first elongate body upper surface;
  a first discrete load wheel module having a first load wheel frame and a first load wheel module upper surface and one or more first load wheels, wherein the first load wheel module is configured for moving the one or more first load wheels between an first undeployed position and a first deployed position, wherein the one or more first load wheels in the first undeployed position are at least partly surrounded by the first load wheel frame, wherein the first load wheel module is configured for fitting beneath the one or more upper planks of a pallet when the one or more first load wheels are in the first undeployed position, and wherein a first majority of a first wheel height of the one or more first load wheels extends beyond the first load wheel frame in the first deployed position;
  a first proximal interlocking mechanism detachably connecting the first elongate body to the first load wheel module;
  a discrete first fork tip configured for fitting beneath the one or more upper planks of a pallet; and a first distal interlocking mechanism detachably connecting the first load wheel module to the first fork tip, wherein the first load wheel module is positioned between the first elongate body and the first fork tip, and wherein the first elongate body upper surface and the first load wheel module upper surface are substantially coplanar; and wherein the second fork assembly comprises:
a second discrete elongate body having an second elongate body upper surface;
a second discrete load wheel module having a second load wheel frame and a second load wheel module upper surface and one or more second load wheels, wherein the second load wheel module is configured for moving the one or more second load wheels between an second undeployed position and a second deployed position, wherein the one or more second load wheels in the second undeployed position are at least partly surrounded by the second load wheel frame, wherein the second load wheel module is configured for fitting beneath the one or more upper planks of a pallet when the one or more second load wheels are in the second undeployed position, and wherein a second majority of a second wheel height of the one or more second load wheels extends beyond the second load wheel frame in the second deployed position;
a second proximal interlocking mechanism detachably connecting the second elongate body to the second load wheel module;
a discrete second fork tip configured for fitting beneath the one or more upper planks of a pallet; and
a second distal interlocking mechanism detachably connecting the second load wheel module to the second fork tip, wherein the second load wheel module is positioned between the second elongate body and the second fork tip, and wherein the second elongate body upper surface and the second load wheel module upper surface are substantially coplanar.

24. The pallet truck of claim 23, wherein the first load wheel module is configured to house the first majority of the first wheel height of one or more first load wheels within the first load wheel frame when the one or more first load wheels are in the first undeployed position.

25. The pallet truck of claim 23, wherein the first load wheel module is configured to extend the first wheel height of the one or more first load wheels beyond the first load wheel frame when the one or more first load wheels are in the first deployed position.

26. The pallet truck of claim 23, wherein the pallet comprises a base board spaced apart from the one or more upper planks, and wherein the first fork tip is configured to fit between the base board and the one or more upper planks of the pallet.

27. The pallet truck of claim 23, wherein the pallet comprises a base board spaced apart from the one or more upper planks, and wherein the first load wheel module is configured to fit between the base board and the one or more upper planks of the pallet when the one or more first load wheels in the first undeployed position.

28. The pallet truck of claim 23, wherein the first and second load wheel modules are interchangeable, wherein the first and second fork tips are interchangeable, wherein the first and second proximal interlocking mechanisms are interchangeable, and wherein the first and second distal interlocking mechanisms are interchangeable.

29. The pallet truck of claim 23, wherein the first and second fork assemblies are spaced-apart and have unobstructed distinct distal ends.

30. The pallet truck of claim 23, further comprising:
a hydraulic power source; and
a first hydraulic line positioned through the first elongate body, wherein the first hydraulic line transmits hydraulic fluid from the hydraulic power source to a first hydraulic actuator positioned completely within the first load wheel module.

31. The pallet truck of claim 23, wherein the first proximal interlocking mechanism includes a first endcap that is attached to the first elongate body and includes a first sheer-resistant body feature that is mated to a first sheer-resistant module feature of the first load wheel module.

32. The pallet truck of claim 23, wherein the first proximal interlocking mechanism includes a first protruding feature that is mated to a first receiving feature, wherein one of the first protruding feature and the first receiving feature is permanently connected to the first elongate body, wherein a different one of the first protruding feature and the first receiving feature is permanently connected to the first load wheel module.

33. The pallet truck of claim 23, wherein the first and second elongate bodies have a first characterizing color, wherein the first and second load wheel modules have a second characterizing color, wherein the first and second fork tips have a third characterizing color, and wherein the first, second, and third characterizing colors are different.

34. An inventory of parts for a forked material-handling vehicle configured for lifting a pallet having one or more upper planks, the inventory comprising:
multiple interchangeable elongate bodies having respective elongate body upper surfaces, wherein the multiple interchangeable elongate bodies include a first elongate body having a first elongate body upper surface and a second elongate body having a second elongate body upper surface;
multiple interchangeable load wheel modules having respective load wheel module upper surfaces, wherein the multiple interchangeable load wheel modules include a first load wheel module and a second load wheel module, wherein the first load wheel module has a first load wheel frame and a first load wheel module upper surface and one or more first load wheels, wherein the first load wheel module is configured for moving the one or more first load wheels between an first undeployed position and a first deployed position, wherein the one or more first load wheels in the first undeployed position are at least partly surrounded by the first load wheel frame, wherein the first load wheel module is configured for fitting beneath the one or more upper planks of a pallet when the one or more first load wheels are in the first undeployed position, wherein a first majority of a first wheel height of the one or more first load wheels extends beyond the first load wheel frame in the first deployed position, wherein the second load wheel module has a second load wheel frame and a second load wheel module upper surface and one or more second load wheels, wherein the second load wheel module is configured for moving the one or more second load wheels between an second undeployed position and a second deployed position, wherein the one or more second load wheels in the second undeployed position are at least partly surrounded by the second load wheel frame, wherein the second load wheel module is configured for fitting beneath the one or more upper planks of a pallet when the one or more second load wheels are in the second undeployed position, and wherein a second majority of a second wheel height of the one or more second load wheels extends beyond the second load wheel frame in the second deployed position;

multiple interchangeable proximal interlocking mechanism components configured for detachable connection of any one of the multiple interchangeable elongate bodies to any one of the multiple interchangeable load wheel modules such that the respective elongate body upper surface and the respective load wheel module upper surface are aligned to be substantially coplanar;

multiple interchangeable fork tips, including a first fork tip and a second fork tip, wherein the first fork tip and second for tip are configured for fitting beneath the one or more upper planks of a pallet; and multiple distal interlocking proximal mechanism components configured for detachable connection of any one of the multiple interchangeable fork tips to any one of the multiple interchangeable load wheel modules.

35. The inventory of parts of claim 34, wherein the multiple proximal or distal interchangeable interlocking mechanism components include mated shear-resistant features, including first sheer-resistant features and second sheer-resistant features.

36. The inventory of parts of claim 35, wherein the mated sheer-resistant features are configured to receive a fastener.

37. The inventory of parts of claim 34, wherein the multiple proximal or distal interchangeable interlocking mechanism components employ a mated internally threaded receptacle and an externally threaded fastener.

38. The inventory of parts of claim 34, wherein the multiple proximal or distal interchangeable interlocking mechanism components include a protruding feature that is mated to a receiving feature, wherein one of the protruding feature and the receiving feature is permanently connected to a respective elongate body, wherein a different one of the protruding feature and the receiving feature is permanently connected to the respective load wheel module.

39. The inventory of parts of claim 34, wherein the first and second elongate bodies have a first characterizing color, wherein the first and second load wheel modules have a second characterizing color, wherein the first and second fork tips have a third characterizing color, and wherein the first, second, and third characterizing colors are different.

40. The inventory of parts of claim 34, wherein the first and second elongate bodies have equal lengths, and wherein the multiple interchangeable elongate bodies further comprise multiple third elongate bodies having a different length than that of the first and second elongate bodies.

41. The inventory of parts of claim 34, wherein the first and second load wheel modules are of the same style, wherein the inventory of parts further comprises multiple third load wheel modules having a different style than that of the first and second load wheel modules.

42. The inventory of parts of claim 34, wherein the load wheel module further comprises a hydraulic actuator contained within the load wheel frame and operatively connected to deploy the one or more load wheels hydraulically.

\* \* \* \* \*

UNITED STATES PATENT AND TRADEMARK OFFICE
CERTIFICATE OF CORRECTION

| | |
|---|---|
| PATENT NO. | : 12,397,836 B2 |
| APPLICATION NO. | : 17/844886 |
| DATED | : August 26, 2025 |
| INVENTOR(S) | : White et al. |

It is certified that error appears in the above-identified patent and that said Letters Patent is hereby corrected as shown below:

In the Specification

In Column 7, Line 19, delete "according one" and insert --according to one-- therefor.

In Column 7, Line 21, delete "according one" and insert --according to one-- therefor.

In Column 15, Line 30, delete "extrusions process," and insert --extrusion process,-- therefor.

In Column 21, Line 44, delete "have has" and insert --have-- therefor.

In Column 25, Line 16, delete "amount torque" and insert --amount of torque-- therefor.

In Column 25, Line 18, delete "amount torque" and insert --amount of torque-- therefor.

In Column 25, Lines 20-21, delete "one or more or" and insert --one or more-- therefor.

In Column 25, Line 42, delete "such to" and insert --such as to-- therefor.

Signed and Sealed this
Fourth Day of November, 2025

John A. Squires
*Director of the United States Patent and Trademark Office*